United States Patent
Wei et al.

(10) Patent No.: US 9,586,138 B2
(45) Date of Patent: Mar. 7, 2017

(54) APPARATUS, SYSTEMS, AND METHODS FOR DETECTING PROJECTILE HITS ON A SURFACE

(71) Applicant: SZ DJI TECHNOLOGY CO., LTD, Shenzhen (CN)

(72) Inventors: Ji Dong Wei, Shenzhen (CN); Sheng Yang Chen, Shenzhen (CN); Tao Wang, Shenzhen (CN); Ji Yuan Ao, Shenzhen (CN); Yi Jun Guan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/683,115

(22) Filed: Apr. 9, 2015

(65) Prior Publication Data
US 2015/0321094 A1 Nov. 12, 2015

Related U.S. Application Data

(63) Continuation of application No. 14/279,021, filed on May 15, 2014, now Pat. No. 9,028,312, which is a continuation of application No. PCT/CN2014/076832, filed on May 6, 2014.

(51) Int. Cl.
*A63F 13/27* (2014.01)
*A63F 13/98* (2014.01)
*A63F 13/21* (2014.01)
*A63F 13/28* (2014.01)

(52) U.S. Cl.
CPC .............. *A63F 13/27* (2014.09); *A63F 13/02* (2013.01); *A63F 13/21* (2014.09); *A63F 13/28* (2014.09); *A63H 2200/00* (2013.01)

(58) Field of Classification Search
CPC ...................... A63F 13/10; A63F 2300/8017
See application file for complete search history.

(56) References Cited

U.S. PATENT DOCUMENTS

| | | |
|---|---|---|
| 5,554,816 A | 9/1996 | Skaggs et al. |
| 9,028,312 B1 | 5/2015 | Wei et al. |
| | (Continued) | |

FOREIGN PATENT DOCUMENTS

| | | |
|---|---|---|
| CN | 1587951 A | 3/2005 |
| CN | 203208654 U | 9/2013 |
| | (Continued) | |

OTHER PUBLICATIONS

International search report and written opinion dated Feb. 17, 2015 for PCT/CN2014/076832.

(Continued)

*Primary Examiner* — Omkar Deodhar
(74) *Attorney, Agent, or Firm* — Wilson Sonsini Goorich & Rosati

(57) ABSTRACT

A sensing apparatus may be provided capable of detecting a hit by a projectile, such as a BB pellet. The sensing apparatus may include a surface and accelerometer to detect the acceleration of the surface. A processor may determine whether a projectile hit has occurred. The sensing apparatus may be mounted onto a vehicle. The vehicle may be a robot capable of participating in a game. The robot game may occur within a facility.

29 Claims, 22 Drawing Sheets

(56) References Cited

U.S. PATENT DOCUMENTS

| | | | |
|---|---|---|---|
| 2005/0186884 A1* | 8/2005 | Evans | A63H 17/14 |
| | | | 446/456 |
| 2006/0189393 A1 | 8/2006 | Edery | |
| 2010/0184563 A1 | 7/2010 | Molyneux et al. | |
| 2010/0203933 A1 | 8/2010 | Eyzaguirre et al. | |

FOREIGN PATENT DOCUMENTS

| | | |
|---|---|---|
| JP | S58173400 A | 10/1983 |
| JP | S61109588 A | 5/1986 |
| JP | H07275504 A | 10/1995 |
| JP | H10127848 A | 5/1998 |
| JP | 2005110743 A | 4/2005 |
| JP | 2009213575 A | 9/2009 |
| JP | 2012215373 A | 11/2012 |
| JP | 2014025678 A | 2/2014 |
| WO | WO 2009/037677 A1 | 3/2009 |

OTHER PUBLICATIONS

Notice of allowance dated Mar. 20, 2015 for U.S. Appl. No. 14/279,021.

Office action dated Dec. 11, 2014 for U.S. Appl. No. 14/279,021.

* cited by examiner

APPARATUS, SYSTEMS, AND METHODS FOR DETECTING PROJECTILE HITS ON A SURFACE

CROSS-REFERENCE

This application is a continuation application of U.S. patent application Ser. No. 14/279,021, filed on May 15, 2014, which is a continuation application of International Application No. PCT/CN2014/076832, filed on May 6, 2014, the content of which are hereby incorporated by reference in their entirety.

BACKGROUND OF THE INVENTION

Virtual games, such as virtual shooting games, traditionally use photoelectric sensors to detect a signal emitted from a virtual shooting apparatus. For example, laser tag or similar games permit users to carry a virtual shooting apparatus that emits a light signal that is detected by a light sensor worn on another player. While laser tag does permit a user interactive virtual shooting game, it lacks some of the realism that comes with projectiles. Furthermore, the observation of light beams is poor and is not sufficiently realistic.

Other games, such as paintball, permit players to shoot one another using paint pellets that splatter upon hitting a target. However, in games such as paintball, no sensors are used to determine whether a target is hit, rather visual inspection is provided. This may provide a delay in real-time assessment of virtual status of players. For example, if multiple players are shooting one another simultaneously, it may be difficult to get an objective assessment of who was shot first, and how much damage was taken.

SUMMARY OF THE INVENTION

In some instances, it may be desirable to provide a sensing apparatus that may detect when the sensing apparatus is hit by an external projectile. The sensing apparatus may be provided on a vehicle, or any other type of movable object. A facility may be provided which may house or contain one or more vehicles. In some instances, the vehicles may be robots participating in a game where the robots may be shot by external projectiles. The robots may be capable of shooting external projectiles and virtual status of the robots may be assessed. An antagonistic game may be provided where robots may shoot one another. A need exists to provide apparatus, systems, and methods for detecting projectile hits on a surface.

An aspect of the invention is directed to a sensing apparatus comprising: a surface capable of being hit by an external projectile; an accelerometer configured to (a) detect an acceleration of the surface when the surface is being hit by the external projectile, and (b) generate a signal indicative of the acceleration; and a processor configured to receive the signal indicative of the acceleration and calculate a virtual feedback based on the signal indicative of the acceleration.

In some embodiments, the surface is configured to be carried on an unmanned vehicle. The unmanned vehicle may be an unmanned land-bound vehicle. The unmanned vehicle may be an unmanned aerial vehicle.

The external projectile may be a BB pellet.

Optionally, the surface is supported by a cover to be carried on an unmanned vehicle. The cover may support multiple surfaces, wherein the accelerations of the multiple surfaces can be detected with aid of multiple accelerometers.

The surface may be rigid. The surface may be formed from a non-deformable, non-metallic material. The surface may be formed of a single integral piece with the cover. Alternatively, the surface may be formed of a separate piece from the cover. In some implementations, the surface may be configured to be worn by a human.

The accelerometer may be a MEMS accelerometer. The accelerometer may be positioned on a side of the surface opposing the side that is capable of being hit by the external projectile. In other examples, the accelerometer may be position on a side of the surface that is capable of being hit by the external projectile. The accelerometer may be configured to detect the acceleration of the surface in a direction perpendicular to the surface when the surface is being hit by the external projectile.

In some instances, the virtual feedback does not include physical damage to the surface. The processor may be a micro-controlling unit (MCU). The processor may be provided on-board the movable object. Alternatively or additionally, the processor may be provided off-board the movable object. The processor may be further configured to determine that the surface was hit by the external projectile when the acceleration value is greater than a predetermined acceleration threshold value. The virtual feedback may be a virtual damage assessment. The processor may calculate the virtual damage assessment based on the acceleration value such that a greater acceleration corresponds to greater degree of virtual damage. The processor may subtract virtual life points from the movable object based on the calculated virtual damage assessment. The processor may be configured to determine the location of the surface that was hit by the external projectile.

Another aspect of the invention may include a vehicle operably coupled to the sensing apparatus as described above; comprising one or more propulsion units capable of effecting movement of the vehicle.

In some embodiments, the vehicle may be an unmanned vehicle. The vehicle may further comprise a shooting apparatus capable of expelling one or more projectiles. The projectiles may be BB pellets.

The vehicle may also comprise a receiver capable of receiving a signal from a remote controller used to effect the movement of the vehicle. The vehicle may weigh no more than 20 kg.

The vehicle may be capable of moving over land. The vehicle may be capable of moving over different types of terrain. The vehicle may be capable of moving through the air. The vehicle may be capable of moving through the water.

The vehicle may further comprise an imaging device capable of capturing images. The vehicle may further comprise a transmitter capable of transmitting the captured images to a remote device.

An aspect of the invention may be directed to a facility comprising a plurality of vehicles as described above. The facility may comprise a plurality of displays displaying images captured by the plurality of vehicles and/or information about the virtual status of the plurality of vehicles.

Another aspect of the invention may be directed to a method of operating a vehicle as described above, based on a command from a remote controller. The command may be entered by a user via the remote controller.

A method of calculating virtual feedback by an external projectile may be provided in accordance with an additional aspect of the invention. The method may comprise: receiving, from an accelerometer coupled to a surface, a signal indicative of an acceleration of the surface, wherein the surface is capable of being hit by the external projectile; and calculating, with aid of a processor, a virtual feedback based on the signal indicative of the acceleration.

Aspects of the invention may also include a sensing shell comprising: at least one surface having, attached thereto, an accelerometer that is configured to detect acceleration of the at least one surface when the surface is being hit by an external projectile having a volume less than 1 cm$^3$ or a weight less than 2 g.

The sensing shell may further comprise a plurality of surfaces, at least two of which are non-parallel, wherein said plurality of surfaces are configured to be mounted onto a movable object. Each individual surface may be operably linked to an accelerometer configured to detect an acceleration of the individual sensing surface in a direction perpendicular to the individual sensing surface. The plurality of surfaces may be configured to at least partially enclose a portion of the movable object.

In some embodiments, the accelerometer may generate a signal indicative of acceleration in the direction perpendicular to the surface. The sensing shell may further comprise a processor configured to receive the signal indicative of the acceleration and calculate a virtual damage assessment based on the signal indicative of acceleration. In some instances, the virtual damage does not include physical damage to the sensing surface. The sensing shell may also include, a transmitter capable of communicating with a processor configured to receive the signal indicative of the acceleration and calculate a virtual damage assessment based on the signal indicative of acceleration.

The external projectile may be a BB pellet.

The surface may be rigid. In some implementations, the surface is stretchable. The surface may be formed of a single integral piece with the rest of the sensing shell.

In some embodiments, the accelerometer is a MEMS accelerometer. The accelerometer may be positioned on a side of the surface opposing the side that is being hit by the external projectile. Optionally, the accelerometer may be positioned on a side that is being hit by the external projectile.

Aspects of the invention may include a vehicle operably coupled to the sensing shell as described above; and comprising one or more propulsion units capable of effecting movement of the vehicle.

The vehicle may be an unmanned vehicle. The vehicle may further comprise a shooting apparatus capable of expelling one or more projectiles. The projectiles may be BB pellets.

The vehicle may further comprise a receiver capable of receiving a signal from a remote controller used to effect the movement of the vehicle. The vehicle may further comprise a processor configured to provide an autopilot system that effects the movement of the vehicle. The vehicle may weigh no more than 20 kg. The vehicle may be capable of moving over land. The vehicle may be capable of moving over different types of terrain.

The vehicle may further comprise an imaging device capable of capturing images. The vehicle may further comprise a transmitter capable of transmitting the captured images to a remote device.

An aspect of the invention may be directed to a facility comprising a plurality of vehicles as described above. The facility may comprise a plurality of displays displaying images captured by the plurality of vehicles and/or information about the virtual status of the plurality of vehicles.

An additional aspect of the invention may be directed to method of operating a vehicle as described above based on a command from a remote controller. The command may be entered by a user via the remote controller.

In accordance with an aspect of the invention, a vehicle may be provided, said vehicle comprising: a shooting apparatus capable of expelling one or more projectiles; an outer surface capable of being hit by an external projectile; and an accelerometer configured to (a) detect an acceleration of the surface when the surface is being hit by the external projectile, and (b) generate a signal indicative of the acceleration for calculation of virtual feedback.

The vehicle may be an unmanned vehicle. The unmanned vehicle may be an unmanned land-bound vehicle. The unmanned vehicle may be an unmanned aerial vehicle.

The vehicle may further comprise a receiver capable of receiving a signal from a remote controller used to effect movement of the vehicle. The vehicle may further comprise a receiver capable of receiving a signal from a remote controller used to control the shooting apparatus position and/or the expelling of one or more projectiles. The vehicle may further comprise a processor configured to execute an autopilot system to effect movement of the vehicle and/or control of the shooting apparatus. The vehicle may further comprise a processor configured to determine a location of the vehicle that is hit when the surface is being hit by the external projectile. The virtual feedback may be virtual damage assessment. The vehicle may further comprise a processor configured to receive the signal indicative of the acceleration and calculate a virtual damage assessment based on the signal indicative of acceleration. The vehicle may further comprising a transmitter capable of communicating with a processor off-board the vehicle and configured to receive the signal indicative of the acceleration and calculate a virtual damage assessment based on the signal indicative of acceleration.

The vehicle may weigh no more than 20 kg. The vehicle may have a length of no more than 1.5 meters. The vehicle may be capable of moving over land. The vehicle may be capable of moving over different types of terrain.

The vehicle may further comprise an imaging device capable of capturing images. The vehicle may further comprise a transmitter capable of transmitting the captured images to a remote device. The projectiles and the external projectiles may be BB pellets.

The surface may be coupled to a cover that covers at least a portion of the vehicle. The cover may support multiple surfaces, wherein the acceleration of the multiple surfaces are detectable with aid of accelerometers. The surface may be rigid. In one example, the surface may be formed of a single integral piece with the cover. In another example, the surface may be formed of a separate piece from the cover. The vehicle may further comprise an additional surface on a same side of the vehicle as the surface, wherein the acceleration of the additional surface is detectable with aid of an accelerometer. The vehicle may further comprise an additional surface on a different side of the vehicle as the surface, wherein the acceleration of the additional surface s detectable with aid of an accelerometer.

The accelerometer may be a MEMS accelerometer. The accelerometer may be positioned on a side of the surface opposing the side that is capable of being hit by the external projectile.

A facility may be provided in accordance with an aspect of the invention. The facility may comprise a plurality of vehicles as described above. The facility may comprise a plurality of displays displaying images captured by the plurality of vehicles and/or information about the virtual feedback of the plurality of vehicles.

Further aspects of the invention may be directed to a method of detecting a hit by an external projectile on an object with multiple surfaces on different sides of the object, at least one surface on an individual side being coupled to an accelerometer, said method comprising: receiving, from the accelerometer coupled to at least one surface, a signal indicative of an acceleration of the at least one surface; and determining, with aid of a processor, that the object has been hit by an external projectile when (1) the accelerometer coupled to the at least one surface on one side provides the signal indicative of the acceleration that exceeds a predetermined acceleration threshold and (2) no accelerometers coupled to surfaces on any other side of the object provide signals indicative of the acceleration that exceed the predetermined acceleration threshold.

The method may further comprise determining, with aid of the processor, that the object has been in a collision when a plurality of accelerometers coupled to surfaces on different sides of the object provide signals indicative of acceleration that exceed the predetermined acceleration threshold.

The signal may be indicative of the acceleration of the surface in a direction perpendicular to the surface. The accelerometers may be MEMS accelerometers. The accelerometers may be positioned on sides of the surfaces opposing the sides that are capable of being hit by the external projectile. The method may further comprise the step of calculating a virtual damage assessment based on the acceleration. In some embodiments, the virtual damage assessment based on the acceleration is calculated such that a greater acceleration corresponds to greater degree of virtual damage.

The plurality of accelerometers may be on opposing sides of the object. The determination may be made that the object has been in a collision when the plurality of accelerometers coupled to surfaces on the opposing sides of the objects provide signals indicative of acceleration that exceed a predetermined threshold acceleration value. The plurality of accelerometers may provide accelerations that have symmetric peak acceleration signals.

The object may be an unmanned vehicle. The unmanned vehicle may be capable of moving over different types of terrain. The accelerometers may be coupled to surfaces disposed on the front, back and sides of the unmanned vehicle. Multiple accelerometers may be disposed on the left side of the unmanned vehicle and on the right side of the unmanned vehicle. The unmanned vehicle may comprise a receiver capable of receiving a signal from a remote controller used to effect movement of the unmanned vehicle.

Additionally, aspects of the invention may be directed to a method of detecting a hit by an external projectile on an object, said method comprising: receiving, from a plurality of accelerometers coupled to surfaces, signals indicative of accelerations of the surfaces; and determining, with aid of a processor, that the object has been hit by an external projectile when the signals from the accelerometers coupled to the surfaces of the object provide accelerations indicative of impact that exceed a predetermined acceleration threshold value when considered in combination.

In some instances, the signals may be indicative of accelerations of the surfaces on the same side of the object. In other instances, the signals may be indicative of accelerations of the surfaces in a direction perpendicular to the surfaces. The accelerometers may be MEMS accelerometers. The accelerometers may be positioned on sides of the surfaces opposing the sides that are capable of being hit by the external projectile. The sums of the accelerations indicative of impact from the sensors on the same side may be compared to the predetermined acceleration threshold value.

The method may further comprise calculating a virtual damage assessment based on the accelerations. The virtual damage assessment based on the accelerations may be calculated such that greater accelerations correspond to greater degree of virtual damage. The method may further comprise the step of calculating a location or range of locations of the external projectile hit relative to the accelerometers based on the relative accelerations of provided by the accelerometers.

The object may be an unmanned vehicle capable of self propulsion. The unmanned vehicle may be capable of moving over different types of terrain.

In some embodiments, the plurality of accelerometers may be disposed on the front, back and sides of the unmanned vehicle. The plurality of accelerometers may include multiple sensors disposed on the left side of the unmanned vehicle and on the right side of the unmanned vehicle.

The unmanned vehicle may comprise a receiver capable of receiving a signal from a remote controller used to effect movement of the unmanned vehicle.

A method of calculating a source of a hit by an external projectile on an object may be provided in accordance with an aspect of the invention. The method may comprise: receiving, from at least one accelerometer coupled to a surface, at least signal indicative of magnitude and direction of acceleration of the surface when the surface is being hit by an external projectile; and determining, with aid of a processor, a location of a potential source of the external projectile, based on the magnitude and the direction of the acceleration.

The location of the potential source of the external projectile may include the distance and direction of the potential source. The method may further comprise automatically aiming a shooting apparatus of the object to expel a projectile toward the location of the potential source of the external projectile. The automatic aiming of the shooting apparatus may occur without any human control or intervention.

The object may be a vehicle capable of self-propulsion.

An aspect of the invention may include a method for providing a robot game, said method comprising: providing a plurality of robots capable of moving from one location to another, each comprising a sensing apparatus capable of detecting when the robot is hit by an external projectile based on an acceleration of a part of the robot; and detecting signals, from the plurality of robots, generated in response to information from the sensing apparatus, and using said signals to keep track of relative virtual status between the plurality of robots.

The plurality of robots may each comprise a shooting apparatus capable of expelling one or more projectiles. The robots may be vehicles. The vehicles may be capable of moving over different types of terrain. The vehicles may be unmanned.

In some embodiments, the sensing apparatus may include a plurality of sensors that are disposed on the front, back and sides of the vehicle.

Optionally, a robot of the plurality of robots may comprise a receiver capable of receiving a signal from a remote controller used to effect movement of the robot. The receiver may be capable of receiving a signal from the remote controller to expel the one or more projectiles from the shooting apparatus. The robot may comprise a shooting apparatus capable of expelling one or more projectiles. The remote controller may accept user inputs to attempt to shoot other robots using the vehicle.

The part of the robot may be a surface of the robot. The sensing apparatus may include the surface and an accelerometer configured to detect acceleration of the surface in a direction orthogonal to the surface. The surface may be rigid. The surface may be supported by a cover for at least a portion of the robot. The surface may be integrally formed with the cover. Alternatively, the surface may be a separate piece from the cover. The accelerometer may be positioned on a side of the surface opposing the side that that capable of being hit by the external projectile.

In some implementations, at least one of the plurality of robots may be operating in an autopilot mode without human control.

The signals from the plurality of robots may be indicative of the virtual status for each of the plurality of robots. The signals from the plurality of robots may be indicative of the acceleration of the surface of the robot when the acceleration of the surface exceeds a predetermined threshold.

The method may further comprise calculating, a virtual damage assessments of each of the plurality of robots as the virtual status of each of the plurality of robots. Keeping track of the relative virtual status between the plurality of robots may include keeping track of virtual life points for each of the plurality of robots by subtracting virtual life points from the robot based on the virtual status for the robot. The method may further comprise preventing a robot from further participating in the robot game when the virtual life points for a robot is valued at zero or lower. The method may further comprise declaring a robot as a winner when the other robots of the plurality of robots have virtual life points valued at zero or lower.

An aspect of the invention may include a facility comprising the plurality of robots and within which the method as described above may occur.

In accordance with additional aspects of the invention, a facility for a robot game may be provided. The facility may comprise: an arena configured to contain a plurality of robots capable of moving from one location to another, each comprising an image capturing device and a sensing apparatus capable of detecting when the robot is hit by an external projectile based on an acceleration of a surface of the robot; and display terminals configured to display images captured from the image capturing devices of the robots and/or a virtual damage assessment of the robots based on signals from the robots generated in response to information from the sensing apparatus.

In some embodiments, the facility may be an open-air facility. In other embodiments, the facility may be an enclosed facility having a plurality of walls and a ceiling. The arena may include a barrier that prevents the plurality of robots from leaving the arena. The arena may include multiple types of terrain. The arena may include one or more objects that can obstruct a view of one robot relative to another robot.

Optionally, each of the robots may comprise a shooting apparatus capable of expelling one or more projectiles. The projectiles and the external projectile may be BB pellets.

The sensing apparatus may include the surface and an accelerometer configured to detect acceleration of the surface in a direction orthogonal to the surface. The surface may be rigid. The surface may be supported by a cover for at least a portion of the robot. The surface may be integrally formed with the cover. The surface may be a separate piece from the cover.

The accelerometer may be positioned on a side of the surface opposing the side that that capable of being hit by the external projectile. The accelerometer may be a MEMS accelerometer.

The display terminals may be provided outside the arena, wherein one or more remote operators of the robots can view the display terminals. In some instances, each of the plurality of robots may be in communication with an individualized display terminal capable of displaying information from the robot. The display terminals may include at least one display terminal configured to display relative positions between the robots.

An additional aspect of the invention may be directed to an arena for a robot game, said arena comprising: a boundary configured to contain a plurality of robots capable of moving from one location to another, each comprising a sensing apparatus capable of detecting when the robot is hit by an external projectile based on an acceleration of a surface of the robot; and at least one station located within the boundary for providing one or more essential supplies to at least one individual robot of the plurality of robots.

In some implementations, each robot may further comprise a shooting apparatus capable of expelling one or more projectiles.

Optionally, each robot may further comprise a camera capable of capturing an image. The arena may further comprise one or more cameras capable of capturing an image of the arena. The arena may also have one or more display terminals configured to display images captured from the cameras.

The boundary may be configured to prevent the plurality of robots from passing through the boundaries while the robot game is in operation. The boundary may be visually discernible. The boundary may include walls. The boundary may include a ceiling.

In some embodiments, the station may be visually discernible. Alternatively, the station may not be visually discernible. In some instances, the station may be static. In other instances, the station may change location during the course of the game. The one or more essential supplies may includes life points to be provided to the individual robot when the individual robot is located at the station. The one or more essential supplies may include an increase in a number of projectiles that the individual robot is capable of shooting, said increase provided when the individual robot is located at the station. The arena may further comprise at least one trap within the boundary. The arena may further include at least one turret within the boundary.

It shall be understood that different aspects of the invention can be appreciated individually, collectively, or in combination with each other. Various aspects of the invention described herein may be applied to any of the particular applications set forth below or for any other types of movable objects. Any description herein of robots, such as unmanned vehicles, may apply to and be used for any movable object, such as any vehicle. Additionally, the systems, devices, and methods disclosed herein in the context of any motion (e.g., land-bound motion) may also be applied in the context of other types of motion, such as movement in the air, in space, or in or on the water.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
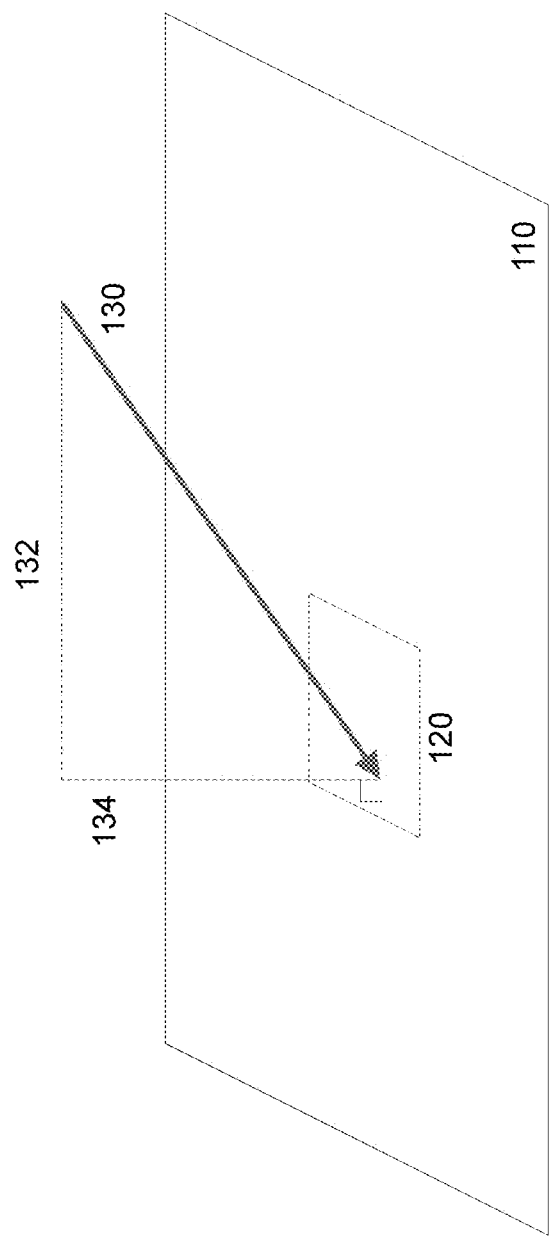
FIG. 1 shows an example of a surface having a sensor, capable of detecting an external projectile hitting the surface, in accordance with an embodiment of the invention.

The apparatus, systems, and methods of the present invention provide detection of a hit on a surface by an external projectile. The surface may be part of a sensing shell that may include a sensor to detect the hit on the surface. The sensing shell may have any shape or morphology. The sensing shell may optionally be carried on a vehicle, or other type of movable object. For instance, the sensing shell may be worn by a human. The sensing shell may detect whether the vehicle (or other type of movable object) was hit by a projectile. In some instances, an accelerometer may be used to detect the hit by the projectile. The accelerometer may optionally measure a degree of acceleration in a direction perpendicular to the surface that is hit. The projectile may be a BB pellet or similar type of small projectile.

A vehicle may be provided with a sensing apparatus provided therein. The sensing apparatus may include the sensing shell which may have one or more sides with one or more sensors capable of detecting a hit by a projectile. The sensing shell may at least partially enclose the vehicle. The sensing shell may include or be in communication with a processor that may receive signals from the one or more sensors and determine a virtual status of the vehicle based on the signals. In some examples, this may include a virtual damage assessment for the vehicle (which may be independent of whether any physical damage occurs on the vehicle). In some instances life points for the vehicle may be calculated based on the virtual status of the vehicle (e.g., subtracting virtual damage from the life of the vehicle).

The vehicles may be part of a communication system. The communication system may include one or more vehicles and one or more cameras. The cameras may be mounted on the vehicles and/or may be provided in the vehicles' environment. Optionally, a remote controller may be provided for the vehicle. The remote controller may control movement of the vehicle, a camera on a vehicle and/or a shooting apparatus on a vehicle. The vehicles may include sensing apparatuses that may detect when the vehicles are hit by a projectile. Data from the sensing apparatuses may be collected. In some instances, data pertaining to whether the vehicle was hit by a projectile may be displayed on a display device. The display devices may be viewed by operators of the vehicles or other individuals.

The vehicle may be part of a robot game. Any description of a robot may include any vehicle including a sensing apparatus. In one example, multiple robots may be capable of detecting when a projectile hits the robot with aid of the sensing apparatus. For example, the multiple robots may detect when they are hit based on a detected acceleration of a surface of the robot. In some instances, the robots may be equipped with shooting apparatuses, and the robots may shoot at one another, with the robot remaining the longest with life points winning the game. Other types of games with different goals may be provided. The robots may be controlled by users or may be operating in an autonomous mode.

A facility may be provided capable of containing multiple robots. The facility may include an arena where a game robot game may occur. The arena may have built in physical and/or virtual features that may aid in the game. In some instances, display units, such as screens, may be provided that may aid operators of the robots in playing the game.

Sensing Apparatus

FIG. 1 shows an example of a surface having a sensor, capable of detecting an external projectile hitting the surface, in accordance with an embodiment of the invention. A sensing apparatus may include a surface 110. The surface may be capable of being hit by an external projectile. The surface may be coupled to a sensor 120. The sensor may detect when the surface is hit by the external projectile and may generate a signal when the surface is hit by the external projectile. A path of a projectile 130 striking the surface is shown. The path may hit the surface at any angle, and may include components that are parallel 132 to a surface that is hit by the projectile, and/or orthogonal 134 to a surface that is hit by the projectile.

A surface 110 may be provided as part of a sensing apparatus. The surface may be a flat surface, or may include curves, bumps, edges, indentations, or have any other shape or morphology. The surface may be substantially smooth, or may be substantially rough. The surface may be a continuous surface. The surface may be formed from a single integral piece. Alternatively, the surface may include discontinuities or holes, or may be formed from multiple pieces that may be connected to one another. The surface may have any dimension. For example, the surface may have an area of approximately 1 $mm^2$, 5 $mm^2$, 10 $mm^2$, 20 $mm^2$, 30 $mm^2$, 50 $mm^2$, 75 $mm^2$, 1 $cm^2$, 1.5 $cm^2$, 2 $cm^2$, 3 $cm^2$, 4 $cm^2$, 5 $cm^2$, 7 $cm^2$, 10 $cm^2$, 15 $cm^2$, 20 $cm^2$, 25 $cm^2$, 30 $cm^2$, 40 $cm^2$, 50 $cm^2$, 70 $cm^2$, 100 $cm^2$, 120 $cm^2$, 150 $cm^2$, 175 $cm^2$, 200 $cm^2$, 250 $cm^2$, 300 $cm^2$, 400 $cm^2$, 500 $cm^2$, 750 $cm^2$, 1000 $cm^2$, 1500 $cm^2$, 2000 $cm^2$, 3000 $cm^2$, 5000 $cm^2$, 7500 $cm^2$, or 1 $m^2$. Surface area may have an area less than any of the values mentioned herein. The surface area may have an area greater than any of the values mentioned herein. The surface area may fall between any two of the values mentioned herein.

The surface may be formed from any material. The surface may be formed from a metallic material or non-metallic material. For example, the surface may be formed from a metal or metal alloy that may include aluminum, stainless steel, iron, silver, nickel, titanium, copper, brass, or any other material. In another example, the surface may be formed from a plastic or polymer, such as polyester (PES), polyethylene terephthalate (PET), glycol-modified polyethylene terephthalate (PETG), polyethylene (PE), high-density polyethylene (HDPE), polyvinyl chloride (PVC), polyvinylidene chloride (PVDC), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), or polyurethanes (PU). The surface may be formed from wood, rubber, resin, paper, cardboard, glass, graphite, carbon, or any other material. The surface may be formed from a single material or any combination of materials as described.

The surface may be formed from a material having any property. For example, the surface may be rigid. Alternatively, the surface may be semi-rigid or flexible. The surface may or may not be deformable. The surface may or may not be stretchable. The surface may or may not be malleable. The surface may be substantially inelastic or may be elastic. The surface may or may not be brittle. In some examples, the surface may have a Young's modulus of less than or equal to about 1, 3, 5, 7, 10, 12, 15, 20, 25, 30, 40, 50, 75, 100, 150, 200, 250, or 500 GPa. Alternatively, the surface may have a Young's modulus greater than any of the numbers described, or falling between any of the numbers described. The surface may or may not be electrically conductive. The surface may or may not be thermally conductive. The surface may or may not have antistatic properties.

The surface may be capable of being hit by an external projectile. The surface may be an exterior surface that may be exposed to ambient conditions. For example, the surface may be on an exterior of an object and may be open to environmental conditions. The surface may optionally not be shielded by any other surface.

A sensor 120 may be operably coupled to the surface 110. The sensor may be directly contacting the surface, or may indirectly contact the surface via another piece. The sensor may have a fixed position relative to the surface. The sensor may be rigidly connected to the surface. Preferably, little or no damping is provided between the sensor and the surface. In some instances, the surface may have a side that is capable of being hit by an external projectile. This may be an exterior side of the surface or sensing apparatus. This may be an out-ward facing side of the surface or sensing apparatus. The surface may have a side opposing the side that is capable of being hit by an external projectile. This may be an interior side of the surface or sensing apparatus. This may be an in-ward facing side of the surface or sensing apparatus. The sensor may be on a side of the surface that is capable of being hit by an external projectile. Alternatively, the sensor may be on a side opposing the side of the surface that is capable of being hit by the external projectile.

The sensor may be an accelerometer. The sensor may be capable of detecting an acceleration of the surface. The sensor may be capable of detecting a change in acceleration of the surface. Any description herein of an acceleration of the surface may also be applied to a change in acceleration of the surface and vice versa. The sensor may be a micro electro-mechanical systems (MEMS) accelerometer. A MEMS accelerometer may include a cantilever beam with a proof mass (a.k.a. seismic mass), which may deflect upon acceleration. The deflection may be measured to determine acceleration. The MEMS accelerometer can be easily installed at a hit region to detect changes in acceleration at the region and convert the detected change into an electrical signal. The sensor may be any type of MEMS sensor. The sensors may have light, thin, short, and/or small special qualities. The sensor may be small. The sensor may have a weight of less than or equal to 5 g, 3 g, 1 g, 500 mg, 100 mg, 50 mg, 10 mg, 5 mg, 1 mg, 0.5 mg, 0.1 mg, 0.05 mg, 0.01 mg, 0.005, or 0.001 mg. The sensor may have a greatest dimension (e.g., height, length, width, diagonal, diameter) of less than or equal to about 5 cm, 3 cm, 2 cm, 1.5 cm, 1 cm, 9 mm, 8 mm, 7 mm, 6 mm, 5 mm, 4 mm, 3 mm, 2 mm, 1 mm, 0.5 mm, 0.1 mm, 0.05 mm, 0.01 mm, 0.005 mm, or 0.001 mm.

An example of a path of a projectile 130 striking the surface 110 is provided. The projectile may hit the surface at any angle. The projectile may travel along a vector that may hit the surface at any angle. The force of impact may be directed along the path of the projectile. An acceleration vector may be provided along the path of the projectile. Other characteristics, such as velocity and/or position of the projectile may be provided along the path of the projectile.

The path of the projectile may have a component that is parallel 132 to the surface that is hit. The path of the projectile may have a component that is orthogonal 134 to the surface that is hit. If the path of the projectile hits the surface straight-on, the component that is parallel to the surface may have a value of zero. If the path of the projectile grazes the surface, the component that is orthogonal to the surface may be near zero or substantially zero. In some instances, the sensor may be an accelerometer that may measure acceleration of the surface. When a projectile strikes the surface, a measureable acceleration may be provided. The accelerometer may measure one or more components of the acceleration vector. In one instance, the accelerometer may be a MEMS accelerometer that has a Z-axis perpendicular to the surface. For example, the accelerometer may measure a component of the acceleration that is orthogonal/perpendicular 134 to the surface. The accelerometer may or may not measure a component of the acceleration that is parallel 132 to the surface. In some instances, multiple accelerometers may be provided that may measure different components of acceleration. For example, a single accelerometer may be provided that may measure the acceleration of the surface in a direction perpendicular to the surface when the projectile strikes the surface, or two accelerometers may be provided—one of which measure the acceleration a direction perpendicular to the surface and one parallel to the surface, or three accelerometers may be provided—one of which measures the acceleration in a direction perpendicular to the surface, and two of which measure accelerations in directions parallel to the surface and perpendicular to one another. Alternatively, a single accelerometer may be provided that may be capable of measuring acceleration in a single direction or multiple directions simultaneously.

The accelerometers may register a degree of acceleration (e.g., degree of acceleration change) or impact of the projectile. A direction from which the projectile came may or may not be measured.

Other types of sensors may be employed. The sensors may be acoustic vibration sensors, motion sensors, gyroscopes, magnetometers, vision-based sensors (e.g., cameras), lidar, piezoelectric sensors, heat sensors, or any other type of sensors. The sensors may be configured to detect displacement of the surface. The sensors may be configured to detect the presence of a projectile near the surface. The sensors may capture an image of the projectile at or near the surface and analyze the image. In some instances, pressure sensors, such as thin-film pressure sensors may be employed. Optionally, strain gauges may be employed. Electrical signals may be generated when a surface is hit by the projectile.

A sensor may have any sensitivity. A sensor may have a detection area. For example, a surface may have an area that when hit by the projectile, the sensor may detect the hit. In some instances, the sensor detection area may be greater than the size of the sensor. The sensor detection area may be greater than or equal to 1 mm$^2$, 3 mm$^2$, 5 mm$^2$, 10 mm$^2$, 15 mm$^2$, 20 mm$^2$, 30 mm$^2$, 40 mm$^2$, 50 mm$^2$, 60 mm$^2$, 70 mm$^2$, 80 mm$^2$, 90 mm$^2$, 1 cm$^2$, 1.2 cm$^2$, 1.5 cm$^2$, 2 cm$^2$, 2.5 cm$^2$, 3 cm$^2$, 4 cm$^2$, 5 cm$^2$, 6 cm$^2$, 7 cm$^2$, 8 cm$^2$, 9 cm$^2$, 10 cm$^2$, 20 cm$^2$, 30 cm$^2$, 50 cm$^2$, 100 cm$^2$, 200 cm$^2$, 500 cm$^2$, 1000 cm$^2$, 2000 cm$^2$, 5000 cm$^2$, or 1 m$^2$. The sensor detection area may be less than or equal to any of the areas described herein. The sensor detection area may fall within a range defined by any two values described herein.

A projectile may be an object that may be capable of striking a surface. The projectile may be free-traveling through a medium to get to the surface. For example, the projectile may fly through the air to strike the surface. In another example, the projectile may traverse water to get to the surface. The projectile may not be contacting any other object or surface when the projectile hits the surface.

The projectile may be a solid or semi-solid object. The projectile may be a liquid object. The projectile may have a mass and/or density. The mass and/or density of the projectile may be greater than the ambient environment. The projectile may be formed from a metal or metal alloy. Alternatively, the projectile may be formed from a plastic or polymer. The projectile may be formed from rubber or a resin. The projectile may be formed from ice or snow. The projectile may be formed from any material, including those described above for the surface. The projectile may have any material property, including those describe above for the surface. The projectile may have the same hardness as the surface material, less hardness than the surface material, or greater hardness than the surface material. In some embodiments, if the projectile were to strike the surface, the projectile would not leave a permanent dent or deformation.

In some alternative embodiments, the projectiles may be formed from a semi-solid material and/or a hard case about a liquid center. For example, the projectiles may include paintballs. When the projectile hits the surface the projectile may or may not come apart, splatter, or deform. The projectiles may or may not leave a visible mark on the surface. The projectiles may or may not leave a mark that may be detectable under certain spectral emissions (e.g., UV).

The projectiles may have any weight or dimension. For example, the projectiles may weigh less than or equal to about 0.1 mg, 0.5 mg, 1 mg, 5 mg, 10 mg, 20 mg, 30 mg, 50 mg, 100 mg, 200 mg, 500 mg, 1 g, 1.5 g, 2 g, 3 g, 5 g, 10 g, 20 g, 30 g, 50 g, 100 g, 200 g, 300 g, or 500 g. The sensors may be capable of detecting a projectile having a weight as described. The projectile may have a length, width, height, diagonal, or diameter of less than or equal to about 0.1 mm, 0.5 mm, 1 mm, 2 mm, 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, 9 cm, 10 cm, 15 cm, or 20 cm. The projectile may have a volume of less than or equal to about 0.1 mm$^3$, 0.5 mm$^3$, 1 mm$^3$, 2 mm$^3$, 3 mm$^3$, 4 mm$^3$, 5 mm$^3$, 6 mm$^3$, 7 mm$^3$, 8 mm$^3$, 9 mm$^3$, 10 mm$^3$, 50 mm$^3$, 100 mm$^3$, 200 mm$^3$, 300 mm$^3$, 500 mm$^3$, 1 cm$^3$, 2 cm$^3$, 3 cm$^3$, 4 cm$^3$, 5 cm$^3$, 6 cm$^3$, 7 cm$^3$, 8 cm$^3$, 9 cm$^3$, 10 cm$^3$, 15 cm$^3$, or 20 cm$^3$. The sensors may be capable of detecting a projectile having a longest dimension as described.

The projectiles may have any shape. For example, the projectiles may have a substantially spherical shape. The projectiles may have a rounded circular or oval/elliptical shape. In some instances, the projectiles may be bullet shaped. The projectiles may optionally have a pointed end and/or flat rear.

The projectiles may be a BB pellet or similar type of pellet. In other examples, the projectiles may be paintballs. In some instances, the projectiles may be shot pellets, ball bearings, plastic round shot, airsoft pellets, lead shots, marbles, potatoes or other produce, rubber shot or bullets, water shots, snow balls, or other types of projectiles.

Figure 2:
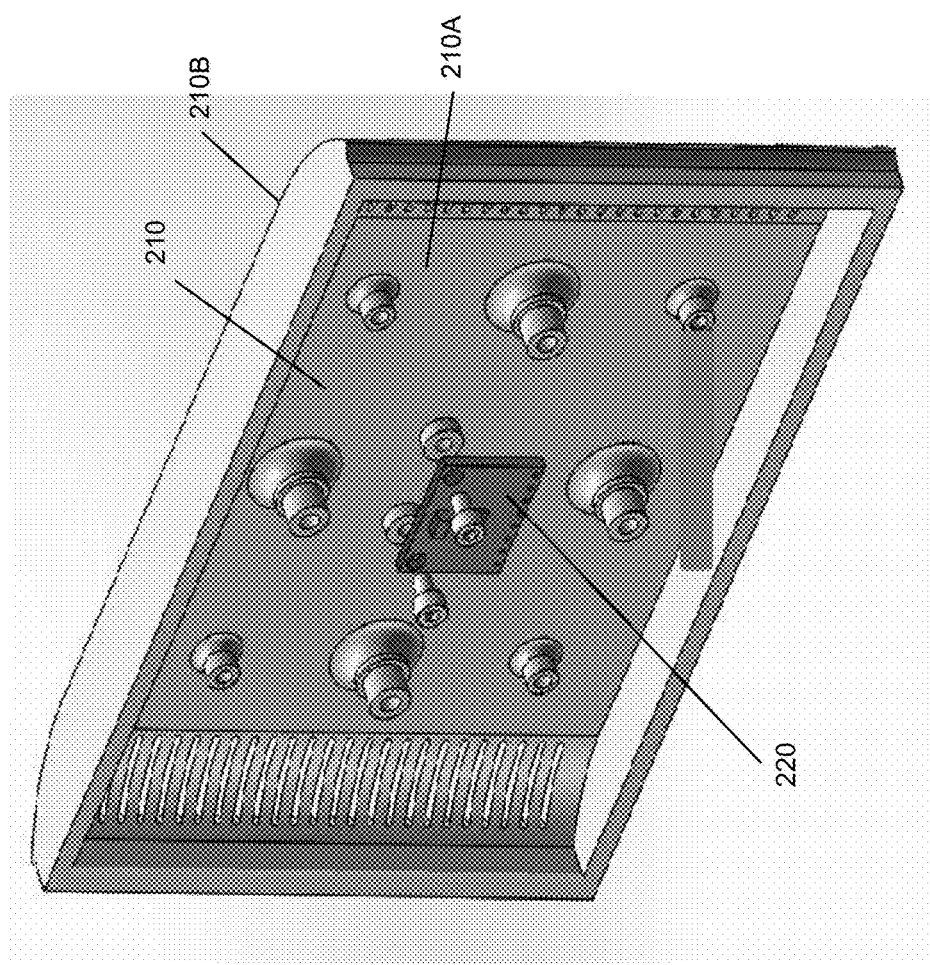
FIG. 2 shows another example of a surface with a sensor, capable of detecting an external projectile hitting the surface, in accordance with an embodiment of the invention.

FIG. 2 shows another example of a surface 210 with a sensor 220, capable of detecting an external projectile hitting the surface, in accordance with an embodiment of the invention.

The surface 210 may have any shape. In some instances, the surface may have an inner side 210A and an outer side 210B. In some embodiments, the outer side may be curved or may partially surround an in inner side or region. The outer side may be capable of being hit by an external projectile. The inner side may or may not be capable of being hit by an external projectile. The inner side may be partially or completely shielded from being hit by an external projectile by the outer side or other objects or components.

A sensor 220 may be coupled to the surface 210. In some instances, the sensor may be connected to an inner side 210A of the surface. This may reduce the likelihood that the sensor is hit by a projectile and/or damaged. Alternatively, the sensor may be positioned on the outer side 210B of the surface. The sensor may be screwed onto the surface or attached with any other type of fastener. In some instances, a surface may have one or more features or shapes. For example, protrusions, indentations, and/or holes may be provided. One or more fastener may be used to fasten a sensor to the surface by being inserted into a hole or indentation. The sensor may or may not be held flush against a surface. The sensor may be rigidly coupled to the surface.

As previously discussed, the sensor may be an accelerometer or any other type of sensor.

Figure 3:
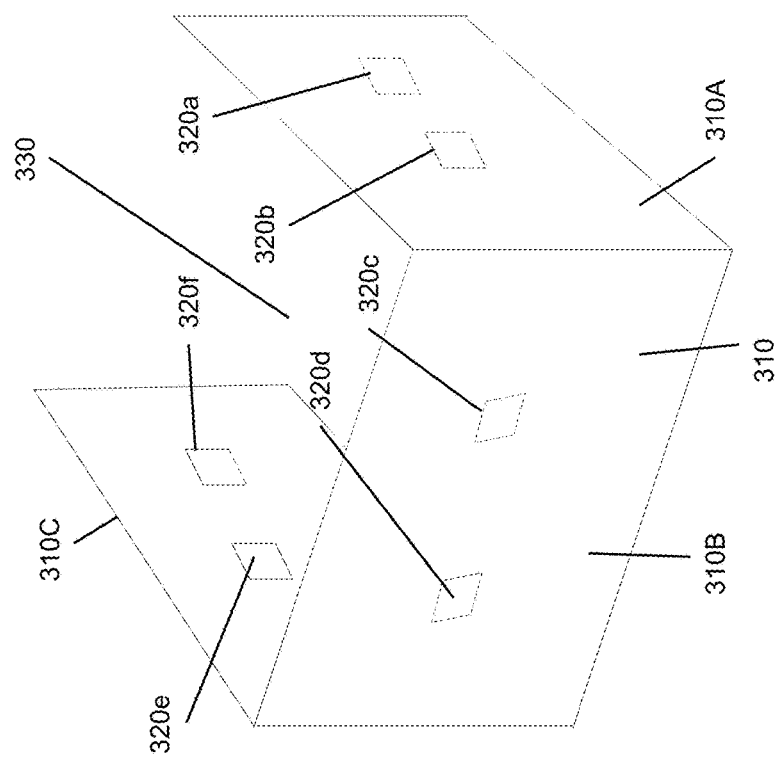
FIG. 3 shows an example of a sensing shell including multiple sides, capable of detecting an external projectile hitting the shell, in accordance with an embodiment of the invention.

FIG. 3 shows an example of a sensing shell 310 including multiple sides 310A, 310B, 310C, capable of detecting an external projectile hitting the shell, in accordance with an embodiment of the invention.

A sensing shell 310 may have a single side or multiple sides. In some instances, each side may have a single surface. Alternatively, each side may have multiple surfaces. A surface may include an entirety of a side. In some instances, a surface may include a portion of a side, such as a portion of a side where a projectile hit may be detectable.

Each of the sides may have differing dimensions, shapes, and/or morphology, or may have matching dimensions, shapes and/or morphology. One or more of the sides may be oriented substantially parallel to one another. One or more of the sides may be oriented substantially orthogonal to one another. The sides may be oriented at any angle relative to one another (e.g., about 5 degrees, 10 degrees, 15 degrees, 30 degrees, 45 degrees, 60 degrees, 75 degrees, 90 degrees, 105 degrees, 120 degrees, 135 degrees, 150 degrees, 165 degrees, or 175 degrees). The multiple sides may be multiple lateral sides (e.g., may be oriented substantially vertically). Alternatively, the multiple sides may include sides of other orientations, such as a top side, bottom side, or any type of angled side.

The sides of a sensing shell may be directly connected to one another. Alternatively, they may be discontinuous and need not contact one another. If sides of a sensing shell are directly connected to one another, they may be connected via an edge, curve, bridge, hinge, or any other connection. The sides of the sensing shell may or may not be movable relative to one another.

Multiple sides of the sensing shell may be formed from multiple pieces (e.g., each side may be a separate piece). Alternatively, multiple sides of the sensing shell may be formed from a single integral piece. For example, a single piece may be curved or shaped to encompass multiple sides of the sensing shell.

Optionally, multiple sides may be positioned to create an interior region 330. The multiple sides may substantially surround the interior region. The interior region may be partially or completely enclosed. The inner sides of the multiple sides may be oriented to face the interior region. The interior region may be substantially surrounded about 15 degrees, 30 degrees, 45 degrees, 60 degrees, 90 degrees, 120 degrees, 150 degrees, 180 degrees, 270 degrees, or 360 degrees laterally and/or vertically. The interior region may be substantially surrounded laterally around the region. The interior region may be substantially surrounded from the top and/or bottom.

One or more sensors 320a-f may be provided on the sensing shell 310. In some instances, the sensors may be provided on an inner side of the sensing shell. The sensors may be provided on the sides of the sensing shell that face an interior region 330. Alternatively, one or more sensors may be provided on the sides of the sensing shell facing away from the interior region. Alternatively, one or more sensor may be embedded into the shell or be operably coupled to the shell in any other manner. The sensors may detect an acceleration of the sides to which they are attached. The sensors may detect an acceleration of a surface proximate to their location. The sensors may be able to detect a projectile if the projectile strikes a surface within a proximity of a location of the sensor.

In some instances, a single sensor may be provided for a sensing shell. Alternatively, multiple sensors may be provided for a sensing shell. In some instances, a single sensor may be provided per side of a shell. Alternatively, multiple sensors may be provided for a side of a shell. The number of sensors may be selected based on the size of the shell and/or sensitivity of the sensor. The number of sensors per side may be selected so that if a projectile were to strike any portion of side, at least one of the sensors would be able to detect the projectile strike. The number of sensors may be selected so that if a projectile were to strike any portion of the side, at least one of the sensors would have a greater than 50% chance, 60%, chance, 70% chance, 80% chance, 90% chance, 95% chance, 97% chance, or 99% chance of detecting the hit.

The sensors may be positioned anywhere along a side of the sensing shell. For example, the sensors may be provided at the same height or varying heights. The sensors may be arranged in one or more rows or columns. The sensors may be arranged in staggered rows or as an array.

Figure 4:
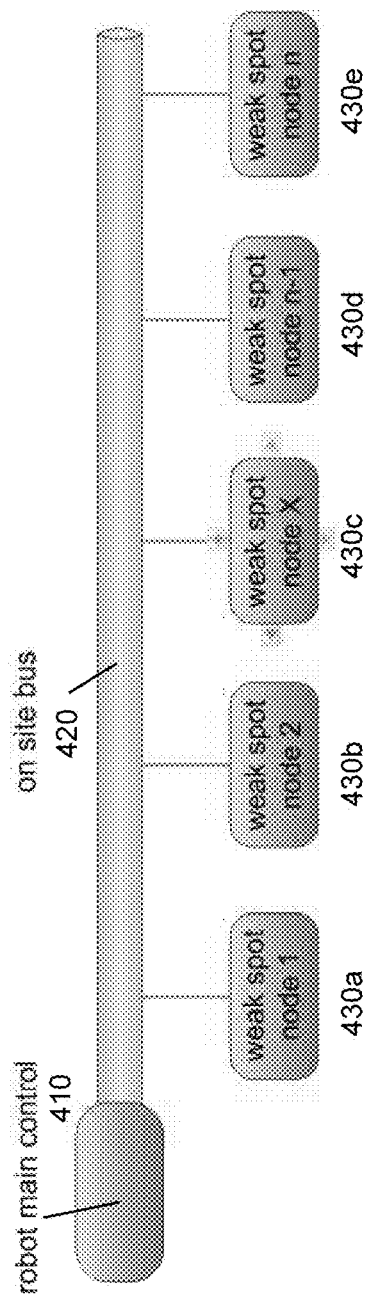
FIG. 4 shows a schematic of sensors of a sensing apparatus, in accordance with an embodiment of the invention.

FIG. 4 shows a schematic of sensors of a sensing apparatus, in accordance with an embodiment of the invention. A main control 410 may be in communication with an onsite bus 420 which may be in communication with one or more weak spot nodes 430a-e.

A main control 410 may include a processor and/or memory. The main control may operate with aid of one or more processors that may individually or collectively perform one or more steps as described herein. A memory may include non-transitory computer readable media, comprising code, logic or instructions to perform one or more steps. The processor may execute the one or more steps as provided by the non-transitory computer readable media. The main control may be a microcontroller (MCU). The MCU may be a small controller on a single integrated circuit containing a processor core, memory and/or programmable input/output peripherals. In some instances, a small amount of random access memory (RAM) may be provided on the chip. Optionally, the MCU may be designed for an embedded application, such as automatically controlling detection of the projectile hits. The MCU may provide low power consumption. In some instances, the MCU may operate at less than or equal to about 1 W, 500 mW, 200 mW, 100 mW, 70 mW, 50 mW, 30 mW, 20 mW, 15 mW, 10 mW, 9 mW, 8 mW, 7 mW, 6 mW, 5 mW, 4 mW, 3 mW, 2 mW, 1 mW, 500 µW, 200 µW, 100 µW, 50 µW, 20 µW, 10 µW, 5 µW, 2 µW, or 1 µW. In some instances, the main control may be a microprocessor.

The main control 410 may receive information regarding the one or more weak spot nodes 430a-e. A weak spot node may include one or more sensors that may be operably coupled to a surface. A surface may include a region where the sensor may be capable of detecting a hit by an external projectile. The sensor may be an accelerometer, such as a MEMS accelerometer, or any other type of sensor as described elsewhere herein. Optionally, the information may be conveyed via an on-site bus 420. The onsite bus may permit each of sensors of the weak spot nodes to communicate with the main control. Each of the sensors may be capable of simultaneously communicating with the main control. Alternatively, a sequential or switching mechanism may be used for communications.

The on-site bus 420 may include a physical connection between a sensor of the weak spot nodes 430*a-e* and the main control 410. A wired connection may be provided. The bus may be any type of communication bus, such as an electrical communication bus utilizing wire, optical communication bus utilizing optical fiber, or any other type of bus known in the art. The bus may use multi-drop or daisy chain topology. Parallel and/or serial bit connections may be used. As additional sensors are added, they may be plugged into or otherwise connected to the bus, or brought into communication with the bus in any other manner. Sensors may be removed, and may optionally be disconnected from the bus.

In some instances, the sensor may communicate with the main controller via wireless communications. A physical connection may or may not be used between the sensors of the weak spot nodes and the main controller. The wireless communications may be direct wireless communications between the sensors. The wireless communications may occur simultaneously, or may occur serially and/or via switching mechanism.

The main control may be supported by a same physical object (e.g., vehicle, robot, stationary item, wearable object of live being) as the weak spot nodes. For example, the main control may or may not be part of a sensing shell having the weak spot nodes. The main control may or may not be on-board a vehicle that also has the weak spot nodes. In some instances, the main control may be off-board the vehicle.

The main control 310 may receive information from the sensors. The main control may determine whether the information from the sensors is indicative of a projectile strike. In some examples, the sensors are accelerometers. The accelerometers may provide a signal indicative of the amount of acceleration of a surface. The amount of acceleration may be in a direction perpendicular to the surface, or may be in any other direction or combinations of directions. The main control may act according to sensor data sent back by the weak spot nodes and may determine a virtual damage assessment.

The information from the sensors may be used to determine a virtual status for an object. Virtual feedback about the virtual status may be provided by the sensors. The virtual status may refer to a level of life points associated with an object. The virtual status may refer to virtual damage assessment for the object. For example, when a projectile strikes the object, virtual damage may be assessed for the object. The virtual damage may be independent of any actual physical damage on the object. For example, a projectile may cause virtual damage on the object when the projectile strikes the surface beyond a predetermined amount of force or acceleration. This may be determined regardless of whether the surface is physically damaged or not. Virtual damage may be independent of real-world physical damage. A virtual damage may result in the deduction of life points from the object. Thus, in some instances, when an object is hit by a projectile and the hit is detected by the sensor, the main control may calculate an amount of life points to deduct. In other instances, being hit by a projectile may result in added life to an object. For example, when an object is hit by a projectile and the hit is detected by the sensor, the main control may calculate an amount of life points to add. In some instances, the number of life points to add or subtract may correlate to the amount of detected acceleration. For example, a greater detected acceleration may result in a greater number of life points to add or subtract as compared to a smaller detected acceleration. The virtual status may also refer to a state of the object. For example, the state may refer to "alive" or "dead" states for the object. Other examples may include "alive", "dead", "frozen", "sleeping", "active", "protected", or other states of the object which may become pertinent in robot games as described elsewhere herein. The main control may make any calculations pertaining to a virtual status of the object.

Figure 5:
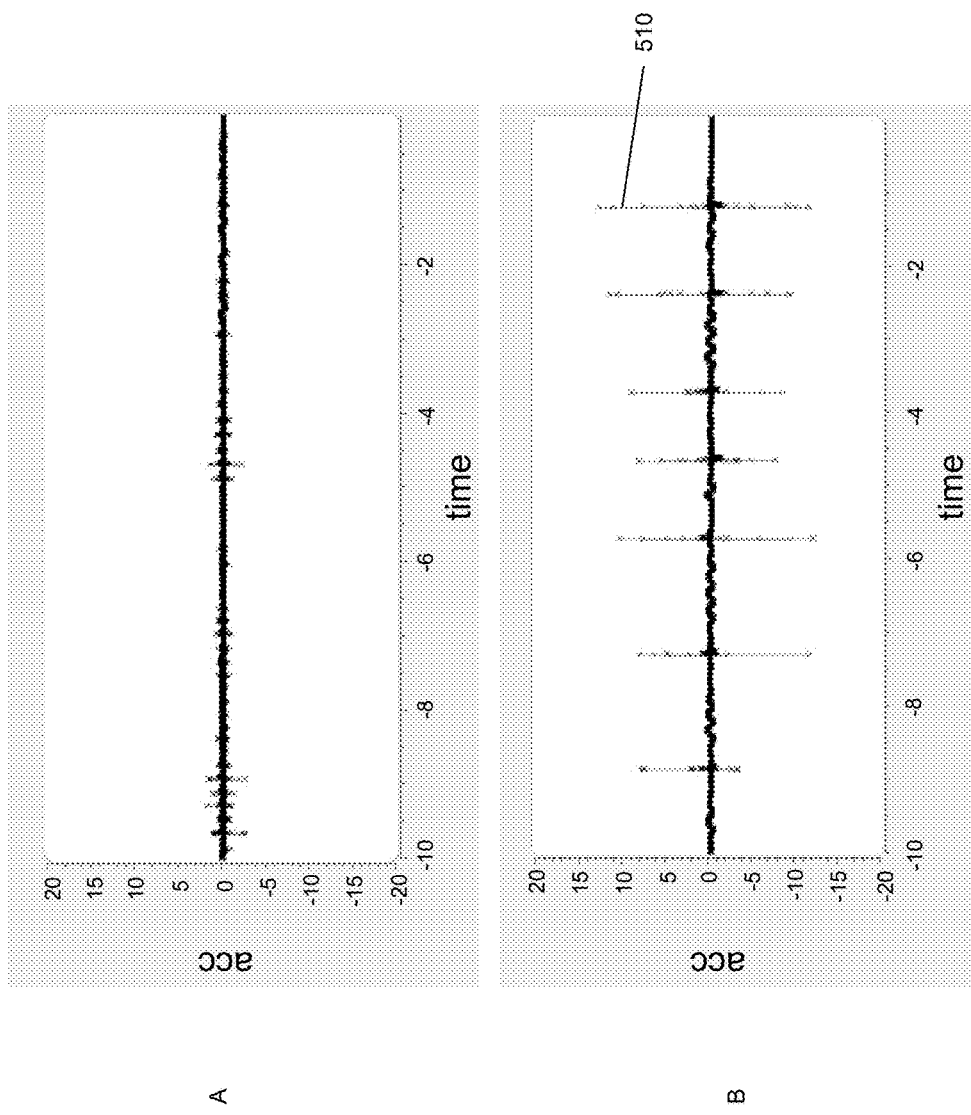
FIG. 5 shows an example of signals that may be captured by sensors of a sensing apparatus, in accordance with embodiments of the invention.

FIG. 5 shows an example of signals that may be captured by sensors of a sensing apparatus, in accordance with embodiments of the invention. FIG. 5A shows an example of a time versus Z acceleration graph produced by the sensor. This may be provided while an object that the sensor is mounted on is stationary or moving. FIG. 5B shows a time versus Z acceleration graph produced by a sensor when it is hit by a projectile. The Z acceleration may refer to acceleration in a direction perpendicular to the surface that is hit by the projectile. When the surface is hit by a projectile, one or more spikes 510 in acceleration may be provided. If the spike in acceleration exceeds a predetermined threshold value, it may be determined that the surface was hit by the projectile.

The predetermined threshold value may be pre-fixed. In some instances, the predetermined threshold value may be altered by the user. For example, a user may 'tune' the sensitivity of the sensor. For example, the user may lower the predetermined threshold value to make the sensor more sensitive (e.g., more likely to detect a projectile that may be weak or small), or increase the predetermined threshold value to make the sensor less sensitive (e.g., only likely to decrease a projectile that hits with great force or is greater mass).

In other embodiments, the acceleration reaction may be analyzed for any parameters. For example, in addition to maximum threshold or in the place of maximum threshold, the width of the acceleration spike, shape of the acceleration spike, any 'echo' spikes, or any other characteristics may be analyzed.

The acceleration values can be gathered in real time. In some instances, a microcontroller unit (MCU) may obtain acceleration values from the sensors in real time. The MCU or any other type of controller described herein may be used to determine whether the acceleration value exceeds the predetermined threshold.

In some instances, other signals may be captured by sensors of a sensing apparatus. They may be compared with predetermined values or profiles to determine whether a surface is hit by a projectile. For example, if the displacement of the surface exceeds a predetermined threshold, it may be determined that a projectile hit has occurred.

Figure 6:
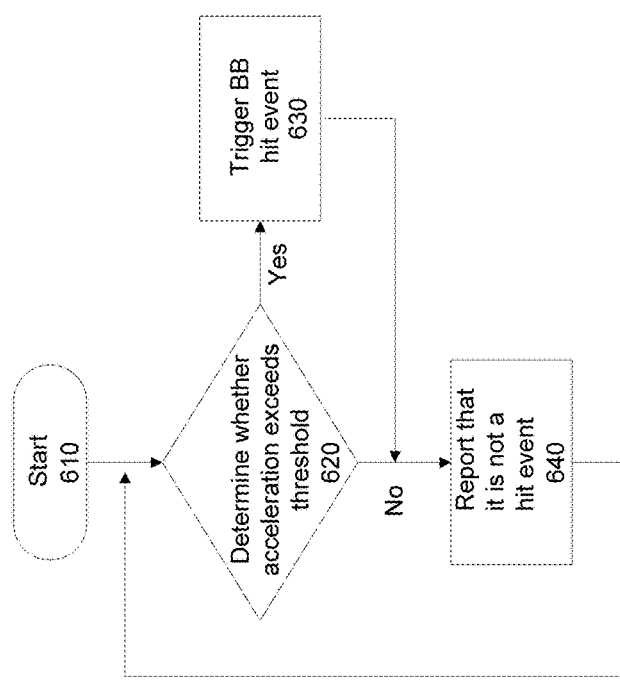
FIG. 6 shows an example of a flow process for determining whether a surface is hit by an external projectile, in accordance with embodiments of the invention.

FIG. 6 shows an example of a flow process for determining whether a surface is hit by an external projectile, in accordance with embodiments of the invention. The flow process may be performed by a MCU in accordance with an embodiment of the invention. The MCU may be a main control that may be used to determine whether a hit by a projectile has occurred. The MCU may perform the steps described below with the aid of one or more processors in accordance with non-transitory computer readable media.

A start 610 may be provided. In some instances, the start may occur when an object is powered on. The object may have a sensing apparatus mounted thereon. In some instances, the objects may be vehicles or other types of robots. In some instances, the start condition may occur when power is provided to the sensing apparatus. The sensing apparatus may be on an object that is powered on, or may have its own power source that may be powered on.

A determination may be made whether an acceleration exceeds a threshold value 620. In some instances, the acceleration may be the acceleration of a surface that is part of the sensing apparatus. The acceleration may be measured using one or more accelerometers. In some instances, the acceleration may be measured in a direction perpendicular to the surface, or in any other direction or combinations of directions described. The threshold value may be an amount of acceleration (e.g., acceleration threshold value). The threshold value may be predetermined value. The threshold value may or may not be changeable.

If the acceleration does exceed the threshold value, an indication may be made that a projectile may have hit the surface 630. In some instances, a definitive indication may be made that the projectile has hit the surface. In other instances, additional processing may occur to confirm whether a hit event has occurred. If the additional processing does not confirm a hit event, then a report may be made that a hit event has not occurred. If the additional processing does confirm a hit event, then a report may be made that a hit event has occurred.

If the acceleration does not exceed the threshold value, an indication may be made that no hit event has occurred 640.

Any other conditions described herein may be analyzed to determine whether a hit has occurred.

Vehicles with Projectile Sensors

A sensing apparatus or shell, as previously described may be provided on an object. The object may be a movable object, such as a vehicle. The object may be a robot. Optionally, the object may be a stationary object, such as a turret. In other examples, the sensing apparatus or shell may be provided on a live being. A live being may be an example of a movable object. The sensing apparatus or shell may be worn by the live being. The sensing apparatus may be secured to the object (living or non-living). Optionally, the sensing apparatus may be built into the object. Any description herein of one type of object or sensing apparatus on one type of object may be applied to any other type of object and vice versa.

Figure 7:
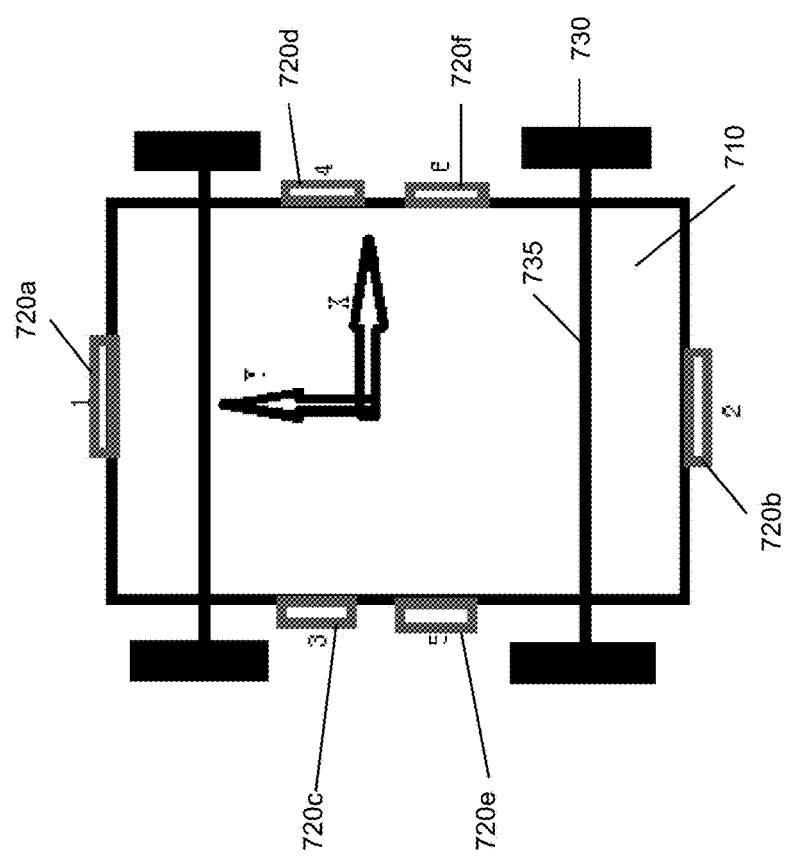
FIG. 7 shows an example of a vehicle with a sensing apparatus, in accordance with embodiments of the invention.

FIG. 7 shows an example of a vehicle with a sensing apparatus, in accordance with embodiments of the invention. A vehicle may have a vehicle body 710 upon which one or more sensing spots 720a-f may be provided. A vehicle may be capable of being self-propelled. For example, the vehicle may have a wheel 730 and/or axle 735 as part of a propulsion unit for the vehicle.

A vehicle may be provided with a vehicle body 710 and/or a propulsion unit 730. The vehicle may be self-propelled. The vehicle may be a land-bound vehicle, airborne vehicle, water-bound vehicle, and/or space vehicle, or any combination thereof. The vehicle may be capable of traveling over land, underground, underwater, on the water's surface, in the air, or in space. Any description herein or depiction of a land-bound vehicle may apply to any other type of vehicle, and vice versa. In some instances, the vehicles may have the form factors of cars, carts, tractors, trucks, buses, vans, motorcycles, tanks, bulldozers, tricycles, or any other shapes.

The vehicle may have any type of propulsion unit 730. The propulsion unit may include wheels, treads, legs, rotors, propellers, jets, burners, or any other type of propulsion unit. The propulsion unit may be coupled to an actuator, such as a motor. In one example, an electric motor may be provided. In some instances, an engine, such as an internal combustion engine, may be provided on-board the vehicle. Alternatively, no engines may be required. The propulsion unit may be powered by a power source. In one example, the power source may be an energy storage unit, such as a battery.

A vehicle may be able to move in various directions. A vehicle may move forward and backwards. A vehicle may be able to turn. In some instances, a vehicle may be capable of moving laterally. A vehicle may or may not be capable of moving up and down. An orientation of a vehicle may be adjustable. In some instances, a vehicle may be capable of changing orientation about one axis of rotation, two axes of rotation, or three axes of rotation. Any of the movements described herein may occur independently and/or simultaneously.

The vehicle may be operated by a user. The user may be on-board the vehicle. In some instances, the user may be riding the vehicle and/or may be within a vehicle housing. Alternatively, the user may be off-board the vehicle. The user may control operation of the vehicle via a remote controller. The vehicle may have a receiver capable of receiving commands from the remote controller. In some instances, the vehicle may be sized so that a user can not be on-board the vehicle. The vehicle may be sized so that the user can not fit within the vehicle or ride the vehicle while the vehicle is in motion. Alternatively, the vehicle may be sized or shaped to accept an on-board user. An on-board user may control the vehicle via one or more direct interface with the vehicle. For example, a control panel or dashboard may be provided that the user may use to control the vehicle. In some instances, a touchscreen, mouse, trackball, steering wheel or joystick may be provided on-board the vehicle that the user may use to control the vehicle.

In other examples, the vehicle may be autonomous and need not be operated by a user. The vehicle may have one or more processor on-board. The processor may be capable of operating in an autopilot mode. In some instances, one or more non-transitory computer readable media may be provided comprising code, logic, and/or instructions for operation of one or more component of the vehicle (e.g., piloting the vehicle). One or more pre-programmed instructions may be provided on-board the device that may dictate autonomous activity of the vehicle. In some instances, the pre-programmed instructions directing the autonomous activity may be provided from off-board the vehicle and may be communicated to the vehicle. The pre-programmed instructions may remain status, or a user may be able to change the programmed instructions. In some instances, pre-programmed instructions may be stored on-board the vehicle, but may be updated with new instructions from off-board the vehicle. Such updates may be made periodically, in response to an event (e.g., when the vehicle is turned on, when a user enters a command to update), or continuously in real-time. The autonomous vehicle may or may not be sized to accept a human occupant.

In some implementations, the vehicle may be operated entirely via user commands. In other instances, the vehicle may operate entirely on an autonomous basis. In some instances, a user may select whether to operate in an autonomous mode or direct control mode, and may switch between the modes. The user may permit operation in an autonomous mode and be able to take direct control at any time. In some instances, during an autonomous mode, all functions of the vehicle may be operating in the autonomous mode. In other instances, a user may select some functions to operate in an autonomous mode while other functions occur via direct control. For example, one or more of the following functions may be selected to be in direct control mode or autonomous mode: steering of the vehicle, propulsion of the vehicle, aiming a shooting apparatus of a vehicle, shooting one or more projectiles, aiming a camera, changing a camera mode, picking up an item, dropping an item, and so forth.

In one example, the vehicle may weigh no more than 0.1 g, 1 g, 5 g, 10 g, 50 g, 75 g, 100 g, 200 g, 300 g, 400 g, 500 g, 600 g, 750 g, 1 kg, 1.2 kg, 1.5 kg, 2 kg, 2.5 kg, 3 kg, 5 kg, 7 kg, 10 kg, 20 kg, 50 kg, 100 kg, 500 kg, 1000 kg, or 2000 kg. The vehicle may have a greatest dimension (e.g., length, width, height, diagonal, diameter) of no more than about 1 mm, 5 mm, 1 cm, 1.5 cm, 2 cm, 3 cm, 5 cm, 7 cm, 10 cm, 15 cm, 20 cm, 25 cm, 30 cm, 35 cm, 40 cm, 45 cm, 50 cm, 60 cm, 70 cm, 80 cm, 1 m, 1.1 m, 1.2 m, 1.5 m, 2 m, 2.5 m, 3 m, or 5 m. The vehicle may have a footprint (e.g., lateral cross-sectional area) of no more than about 1 $mm^2$, 5 $mm^2$, 1 $cm^2$, 1.5 $cm^2$, 2 $cm^2$, 3 $cm^2$, 5 $cm^2$, 7 $cm^2$, 10 $cm^2$, 15 $cm^2$, 20 $cm^2$, 25 $cm^2$, 30 $cm^2$, 35 $cm^2$, 40 $cm^2$, 45 $cm^2$, 50 $cm^2$, 60 $cm^2$, 70 $cm^2$, 80 $cm^2$, 1 $m^2$, 1.1 $m^2$, 1.2 $m^2$, 1.5 $m^2$, 2 $m^2$, 2.5 $m^2$, 3 $m^2$, 5 $m^2$, 10 $m^2$, 15 $m^2$, or 20 $m^2$. The vehicle may have dimensions, such as those described elsewhere herein for any movable object. The human being may be able to pick up and carry the vehicle. The human being may be able to carry the object using one or more two hands.

One or more sensing spots 120a-f may be provided on a vehicle. A sensing spot may include a surface and a sensor. The surface may be capable of being hit by a projectile. The sensor may be an accelerometer or any other type of sensor as described elsewhere herein. The sensor may be a MEMS sensor. The sensing spots may form a sensing apparatus, as described elsewhere herein. The sensing spots may form or be part of a sensing shell, as described elsewhere herein. The sensing spots may or may not be provided on a continuous piece, or may be provided on different distinct piece. The sensing spots may be integrated or attached to a housing of a vehicle. The sensing spots may alternatively be provided independently of a housing of a vehicle, or a vehicle may not have a housing.

A sensing spot may be capable of detecting an acceleration of a surface. The sensing spot may be used to determine whether the surface is hit by an external projectile.

The sensing spots may be provided on a single side of the vehicle or multiple sides of the vehicle. In some examples, one or more sensing spots may be provided on the front 720a of the vehicle, rear 720b of the vehicle, left side 720c, 720e of the vehicle, right side 720d, 720f of the vehicle, top of the vehicle, and/or bottom of the vehicle. Any number of sensing spots (e.g., zero, one, two, three, four or more) may be provided on one or more of the sides described. They may be distributed evenly or clustered on the vehicle. They may be distributed in one or more row, one or more columns, staggered rows or columns, arrays, or randomly.

In some instances, the sensors may be arranged so that larger sides of the vehicle may have more sensors, while smaller sides of the vehicle may have fewer sensors. A number of sensors per side of the vehicle may be selected to provide a desired area of coverage. In some instances, a density of sensing spots (number of sensing spots per square unit of area) may be substantially the same for different sides or regions of the vehicle. Alternatively, they may be different. In some instances, it may be desirable to increase a number of sensing spots or provide a greater density of sensing spots when a higher degree of sensitive is desired. For example, it may be determined that a vehicle may be more likely hit on a particular side or region. A greater sensitivity of hit detection may be desired for that side or region.

The orientation of the sensing spots may vary depending on their location on the vehicle. For example, the sensing spots may be oriented so that an outer side of the surface (that may be hit by a projectile) is facing outward from the vehicle. Optionally, a sensor may detect an acceleration of the surface in a direction perpendicular to the orientation of the outer side of the surface. In one example, a sensor on the front of the vehicle 720a may be oriented so that outer surface is facing forward (e.g., in the positive Y-direction) and the acceleration may be measured along the Y-axis. In another example, a sensor on the left side of the vehicle 720c may be oriented so that the outer surface is facing left (e.g., in the negative X-direction) and the acceleration may be measured along the X-axis. The surfaces of the sensing spots may be substantially rigid. Alternatively, they may have any other material properties as described elsewhere herein.

In some instances, information from a single sensing spot may be used to determine whether a vehicle was hit by a projectile. In other instances, information from multiple sensing spots may be used to determine whether a vehicle was hit by a projectile. Information from a single sensing spot or multiple sensing spots may be used to determine a virtual status of the vehicle. A main control on-board or off-board the vehicle may be used to determine a virtual status of the vehicle. In some instances, the virtual status of the vehicle may include determining virtual damage for the vehicle. The virtual status of the vehicle may include determining an updated number of life points for the vehicle.

In order to assess a virtual status of a vehicle, multiple sensing spots may be used, as shown in FIG. 7. The sensing spots may be on multiple sides of the vehicle. In some embodiments, the vehicle may have a sensing apparatus. The sensing apparatus may be one or more sensing shells. The sensing apparatus may encompass multiple sides of the vehicle. This may include opposing sides of the vehicle (e.g., front and back, left and right side, or top and bottom side). This may include adjacent sides of the vehicle (e.g., front and left, front and right, front and top, front and bottom, rear and left, rear and right, rear and top, rear and bottom). The sides may be oriented substantially parallel to one another. Alternatively, the sides may be oriented substantially orthogonal to one another. Optionally, the sides may be oriented at any other angle relative to one another, such as any angle values described elsewhere herein. In some instances, the sensing apparatus may include one, two, three, four, five, six or more sides upon which sensing spots may be provided. The sensing spots may be oriented to detect accelerations relative to one another. For example sensing spots may be arranged that may detect accelerations in opposite directions from one another (e.g., front sensing spot 720a and rear sensing spot 720b). In some embodiments, the sensing spots may be symmetrically arranged. Alternatively, they need not be symmetrical. In some instances, the sensing spots on a side may have one or sensing spots on an opposing side. The sensing spots may or may not have sensing spots on an adjacent side.

The sensing spots may be in communication with a main control. For example, sensors from the sensing spots may send signals indicative of a sensed condition to the main control. The sensors may send signal indicative of acceleration of a surface to the main control. The main control will determine a virtual status based on the sensed conditions.

Differences from signals may be used to filter out common-mode signals, which may aid in preventing collisions from causing single sensor errors. For example, when the vehicles are moving, there may be collision events. For example, the vehicle may collide with another object. The vehicle may collide with a stationary object or a moving object, such as another vehicle. In some instances, the vehicles may brake or stop suddenly. Signals from multiple sensors may be taken into account to prevent or reduce the likelihood that a collision will be mistaken for a projectile hit. Systems and methods provided herein may be able to differentiate a collision from a projectile hit. This may include differentiating a projectile hit versus a hit by another vehicle, wall, structure, or object. This may also include differentiating a projectile hit by a small projectile, such as those described elsewhere herein, from a larger object that may or may not be moving.

Sensors that are on different sides may collect collision data. For example, sensors on opposing sides (e.g., front and back, or left and ride, or top and bottom) may register a collision. In one instance, sensors on the front 720a and back 720b of the vehicle may detect an acceleration caused by a collision in the Y-direction. When there is a collision in the Y direction, both sensors on the front and back will provide a signal indicative of a sensed event. For example, both sensors on opposing sides may provide a signal that exceeds a predetermined threshold, such as an acceleration that exceeds a predetermined acceleration threshold. When the vehicle is hit by a projectile and is not undergoing a collision, only a single sensor may provide a signal that exceeds a predetermined threshold, such as an acceleration that exceeds a predetermined acceleration threshold. For instance, if the vehicle is hit in the front, the front sensor 720a may register a change in acceleration in the Y-direction, while the rear sensor 720b does not register the change in the acceleration in the Y-direction, or does not register a change in acceleration in the Y-direction that exceeds a predetermined threshold. Similarly, if the vehicle is hit on the left side by a projectile, a left sensor 720c may register the acceleration that exceeds the predetermined threshold, while the right sensor 720d does not. However, if the vehicle is in a collision where it is hit by a large object or another vehicle on its left side, both sensors on both sides can register the change in acceleration.

In some embodiments, when sensors provide indication of peak acceleration signals that are substantially identical or exceed a predetermined acceleration threshold, a main control may determine a collision has taken place. The sensors may provide information that these acceleration peaks occurred substantially simultaneously. For instance, in order to be a collision, the acceleration peaks may be provided within a predetermined time threshold. The predetermined time threshold may be less than or equal to 2 seconds, 1 second, 750 ms, 600 ms, 500 ms, 450 ms, 400 ms, 350 ms, 300 ms, 250 ms, 200 ms, 150 ms, 100 ms, 80 ms, 70 ms, 60 ms, 50 ms, 40 ms, 30 ms, 20 ms, 15 ms, 10 ms, 8 ms, 7 ms, 6 ms, 5 ms, 4 ms, 3 ms, 2 ms, 1.5 ms, 1 ms, 0.5 ms, or 0.1 ms. If the acceleration peaks from the sensors on the opposing sides fall within the predetermined time threshold, they may be indicative of a collision rather than separate projectile hits.

In some instances, the signals from sensing spots on opposing sides may be considered for differentiating collisions from projectile hits. In some instances, signals from sensing spots detecting acceleration in parallel directions (e.g., along the same axis) may be considered for differentiating collisions from projectile hits. Optionally, signals from sensing spots on any different sides may be considered for differentiating projectile hits from collisions. These signals may be indicative of accelerations in parallel directions, orthogonal directions, or any combination of directions.

A projectile hit may be detected if a sensor on a side, and sensors from no other sides (e.g., or opposing sides) register an acceleration that exceeds a predetermined threshold and/or does not occur within the predetermined time frame. A collision may be detected if sensors from multiple sides (e.g., opposing sides) register an acceleration that exceeds a predetermined acceleration occurs within the predetermined time frame. The main control may make a determination of whether a hit a collision occurred. The main control may update the virtual status based on the assessment. For example, greater virtual damage may be provided for a projectile hit than a collision, or vice versa. In some examples, no virtual damage may be provided for a collision. The vehicle may react differently to different types of virtual status. For example, if a vehicle undergoes a collision, it may be frozen or prevented from moving for a predetermined period of time, while if a vehicle is hit by a projectile its life points may be reduced.

Figure 8:
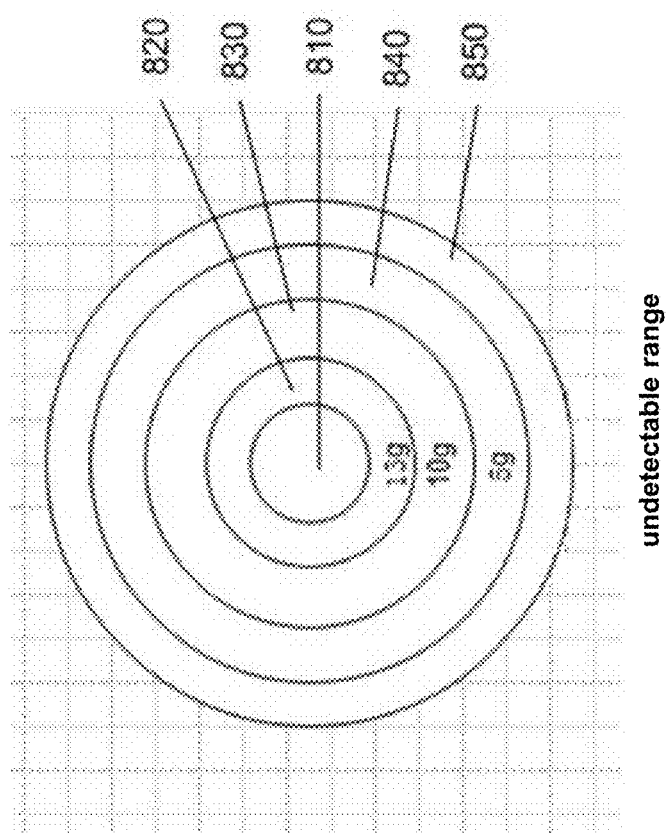
FIG. 8 shows an example of how proximity of a projectile hit to a sensor on a sensing shell may affect detection of the hit in accordance with an embodiment of the invention.

FIG. 8 shows an example of how proximity of a projectile hit to a sensor on a sensing shell may affect detection of the hit in accordance with an embodiment of the invention.

In some instances, a surface may be provided. The surface may be built into a shell or cover of the vehicle. The surface may be part of a housing of a vehicle, may be attached to a housing of a vehicle, or may be arranged in any other manner on a vehicle. A sensor may be coupled to the surface. In some instances, the surface may have multiple detectable ranges.

For example, a central region 810 may be indicative of a region most easily detected by the sensor. For example, an accelerometer may be attached to or coupled to the surface. The central region may be a region that may most easily detect an acceleration peak on the surface when the projectile hits the central region. This may be a region directly where the sensor is coupled. For example, this may be a region that includes a surface right over the sensor. Other regions may surround the central region. For example, a secondary region 820, tertiary region 830, fourth region 840, and/or fifth region 850 may be provided, progressively further from the central region that best detects the hit. An undetectable range may be provided beyond the detectable regions.

In one example, if a projectile hits a region, the central region 810 may detect the acceleration value as 14 g. Acceleration values further from the central region will be smaller. The decrease of acceleration and the distance from the central region may be directly proportional. In one example, a secondary region 820 may detect 13 g of acceleration, a tertiary region 830 may detect 10 g of acceleration, a fourth region 840 may detect 5 g of acceleration, and fifth region 850 may detect less than 5 grams of acceleration. Beyond the fifth region, no acceleration may be detected. An acceleration threshold may be determined in order to detect a projectile hit. For example, a user may specify that any acceleration less than 5 g may be invalid and may not be determined to be a projectile hit. The threshold value is provided by way of example only. Other examples of threshold values may include, but are not limited to less than or to 0.1 g, 0.5 g, 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 22 g, 25 g, 30 g, 35 g, 40 g, 45 g, 50 g, 60 g, 70 g, 80 g, 90 g, or 100 g. The threshold values may be greater than or equal to any of the values described herein. The threshold values may fall between any two of the values described herein. Similarly, any of the regions may detect any of the values described herein. The central region may detect a hit having any of the values described herein, and any of the regions getting progressively further from the central region may detect any of the values described herein.

The threshold value may be fixed or may be variable. In some instances, the acceleration threshold value may be tuned. This may be tuned to provide a desired degree of sensitivity. In some instances, the desired degree of sensitivity may be varied depending on a game that is being played using the vehicle. In some instances, the degree of sensitivity may be varied depending on one or more characteristics of the projectiles being used. For example, if the projectiles being used are small or light, a higher degree of sensitivity may be desired to detect a hit by the projectile. If larger or heavier projectiles are being used, or they are being shot with greater velocity, a lesser degree of sensitivity may be needed to detect a hit by the projectile.

Figure 9:
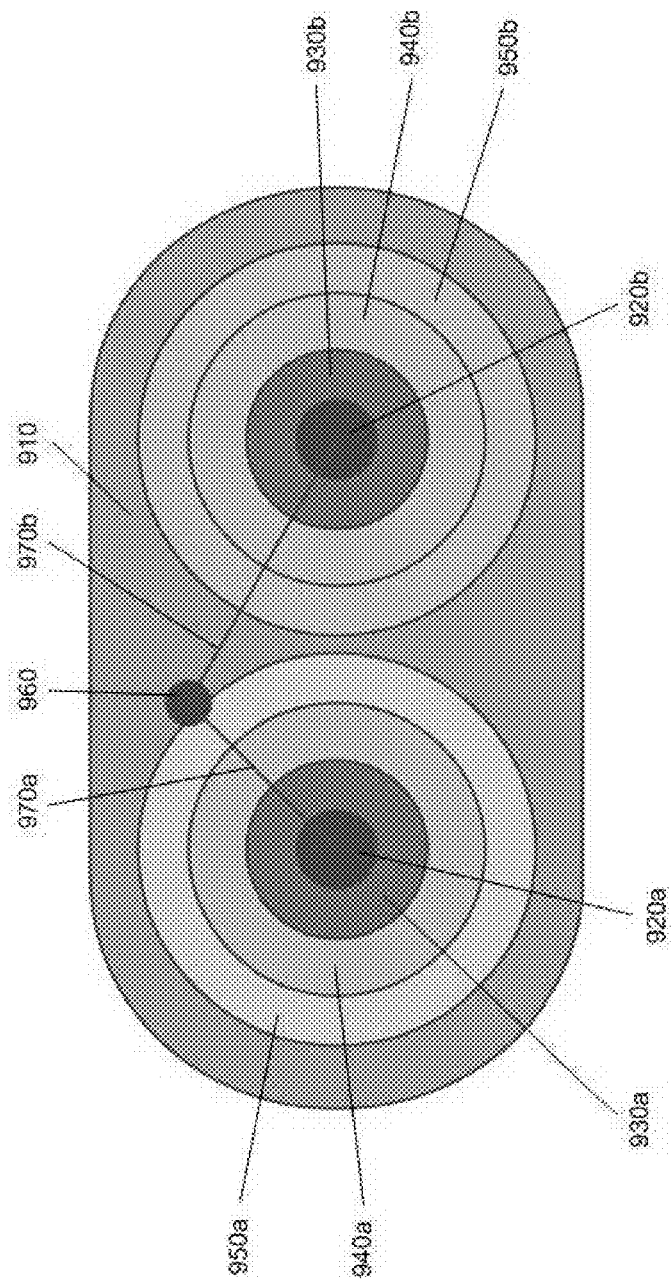
FIG. 9 shows an example of multiple sensors on a sensing shell that may detect a projectile hit, in accordance with embodiments of the invention.

FIG. 9 shows an example of multiple sensors on a sensing shell that may detect a projectile hit, in accordance with embodiments of the invention. In some instances, multiple sensors may be provided on a side of a sensing shell. Surfaces may be operably coupled to the sensors. The surfaces for multiple sensors may form a single integral piece, or may be separate pieces. The sensing surfaces may be integrated into the shell surface or may be separate or separable from the shell surface.

FIG. 9 shows an example where two sensors are installed side by side. Any number of sensors may be provided on a side. The sensors may have any arrangement relative to one another. The sensors may be any distance from one another. For example, the sensors may be less than or equal to about 1 mm, 3 mm, 5 mm, 7 mm, 1 cm, 1.5 cm, 2 cm, 2.5 cm, 3 cm, 4 cm, 5 cm, 6 cm, 7 cm, 8 cm, 9 cm, 10 cm, 12 cm, 15 cm, 20 cm, 25 cm, 30 cm, 40 cm, 50 cm, 75 cm, or 1 m away from one another. The sensors may be greater than or equal to about any of the distances measured herein. The sensors may have a distance falling within a range defined by two of the values descried herein. The distance between the sensors may be less than or equal to one or more of the following ratios relative to a length of the side: 1:100, 1:50, 1:40, 1:30, 1:20, 1:10, 1:8, 1:6, 1:5, 1:4, 1:3, 1:2, 1:1.

The central regions 920a and 920b proximate to each of the sensors may be shown. The central region may most easily permit the sensors to detect a projectile. The regions getting progressively further from the central regions may be provided 930a, 930b, 940a, 940b, 950a, 950b. A projectile that hits one of the further regions may cause the sensor to register less acceleration than if the same projectile were to hit the central region. The relationship between distance from the center/central region to the amount of acceleration detected may be substantially linear.

In some embodiments, signals from multiple sensors may be considered. For example, if two sensors are provided as illustrated in FIG. 9, accelerations detected by both sensors may be considered. A projectile may strike a location 960. The location may be anywhere relative to the multiple sensors. The location may be anywhere on one or more surfaces that may be capable of detecting a hit. In some instances, multiple sensing spots may be provided, each of which may include a surface or portion of a surface that may be hit by a projectile, where the hit may be detectable by a sensor. In some instances, the projectile may strike a location between the two sensors. The projectile may strike a location closer to one sensor than another.

The accelerations from multiple sensors may be considered in determining whether a detected event is a projectile hit. In some instances, an acceleration reading that if detected by a single sensor may not be determined to be a projectile hit may be determined to be a projectile hit when signals from both sensors are considered in combination. For example, multiple sensors may detect an acceleration that is less than 5 g but greater than 3 g. In some instances, if a single sensor detected an acceleration less than 5 g, a projectile hit event may not be established. However, since multiple sensors detected an acceleration, it may be determined that a hit occurred. Thus, if multiple sensors detect an acceleration below a first threshold value (e.g., acceleration value) that would be needed to establish a hit for a single sensor, but above a second threshold value, a hit may still be established. The second threshold value may be less than the first threshold value. The first and/or second threshold values may have any value, such as acceleration threshold values described elsewhere herein. A detection range of multiple sensors may be increased relative to a detection range of a single sensor. By using multiple sensors, if an increased number of sensors register the acceleration, the threshold value to establish a projectile hit may be decreased.

Using multiple accelerations may also aid in determining where a projectile has hit a side. For example, if two sensors show a comparable acceleration value, the projectile may hit between both sensors. The projectile may hit a location substantially equidistant to both sensors if the acceleration values are the substantially the same. If the acceleration value for one of the sensors is stronger than the other, the projectile may be closer to the sensor than the other sensor. Depending on the difference between the accelerations sensed and/or the overall amount of acceleration, the relative location of the projectile hit compared to the multiple sensors may be determined. The timing of the accelerations may be considered. The accelerations may need to occur within a predetermined time window (such as those described elsewhere herein) in order to belong to the same projectile hit. Alternatively, they may be determined to belong to different projectile hits. Providing a larger number of sensors may help pinpoint the location of the projectile hit with a greater degree of specificity.

In some instances, triangulation techniques may be used to determine a relative location of the projectile hit. In one example, an amount of acceleration may be correlated to a distance 970a and 970b. The distances may be used to determine a region around a center where the projectile may have hit. The distances may or may not be different for different sensors, which may or may not result in different sized regions. The overlap of the regions may be considered as an area where the projectile may have hit. In some instances, the accelerations may be correlated with distances that may roughly form a circle around each sensor that detected the acceleration, and the intersection of the circles may be used to detect a likely location of the hit. Any other techniques may be used to determine a likely relative location of the projectile hit on the surface. Alternatively, the information may be used in a binary fashion just to determine whether a projectile hit occurred or not.

Figure 10:
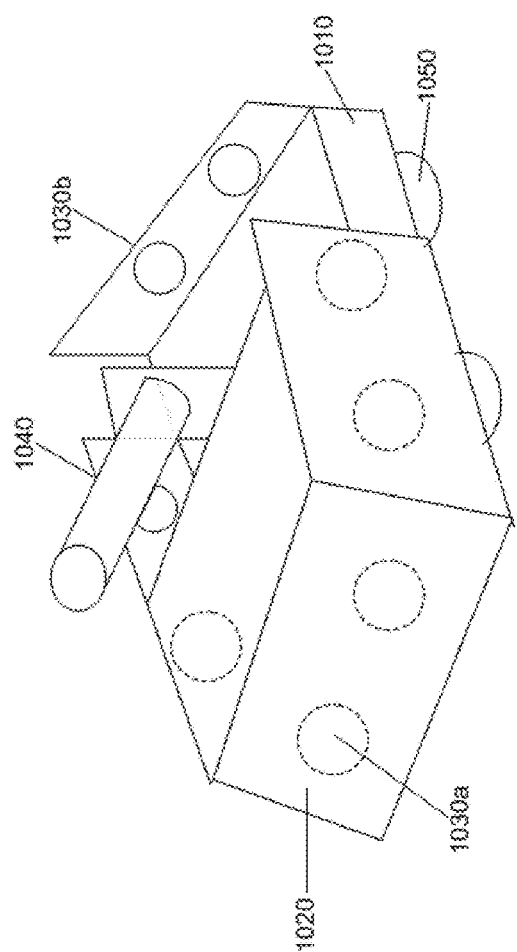
FIG. 10 shows an example of a vehicle with a sensing shell in accordance with embodiments of the invention.

FIG. 10 shows an example of a vehicle with a sensing shell in accordance with embodiments of the invention. A vehicle body 1010 may be provided. The vehicle body may include a platform or support. The vehicle body may be a substrate upon or within which one or more components are provided. A sensing shell 1020 may be provided on the vehicle body. One or more sensors 1030a, 1030b may be provided on the sensing shell. The vehicle may optionally include a shooting apparatus 1040. One or more propulsion units 1050 may also be provided on the vehicle which may permit the vehicle to move in its environment.

The vehicle body may be any size. The vehicle body may support and/or enclose a main control. The main control may be used to control the propulsion of the vehicle. The main control may also make an assessment of whether the vehicle has been hit by a projectile. The main control may receive information from one or more sensors of the vehicle. These may include sensors on the sensing shell 1020 or any other part of the vehicle. The vehicle body may support and/or enclose a power source. The power source may be used to power one or more systems of the vehicle. For instance, a power source may power one or more of the propulsion units of the vehicle, a motor, a sensing apparatus, a shooting apparatus, an image capturing device, a communication unit, a sensor, or any other component of the device. The power source may include a battery or other energy storage device. In some instances, the power source may include an energy generation device. The energy generation device may generate energy from one or more renewable energy sources (e.g., solar, wind, thermal, etc.). The power source may receive energy from another source. In some instances, energy may be provided via a wired connection or may be provided by wireless means. The vehicle body may also support and/or enclose a communication unit. The communication unit may permit communication between the vehicle and one or more external devices. The one or more external devices may include a remote control device of the vehicle, a display device relating to the vehicle, or other vehicles. Communications may occur wirelessly or over a wired connection. Examples of communication systems are provided further elsewhere herein.

A sensing shell 1020 may be provided for the vehicle. The sensing shell may be supported by the vehicle body. In some instances, the sensing shell may be part of a housing of the vehicle. In other instances, a sensing shell may be attached to a housing of a vehicle or may be provided on any other part of the vehicle. The sensing shell may include multiple sides. For example, the sensing shell may cover a front, side, top, and/or rear of the vehicle. The sensing shell may be formed from a single integral piece that may be molded to a desired shape. In other instances, the sensing shell may be formed from multiple pieces that may or may not be connected together. As illustrated a front portion of a sensing shell that covers the front, a portion of the sides and/or top of the vehicle may be separated from a rear portion of the sensing shell. Alternatively, they may all be continuously connected. The sensing shell may have any shape or configuration. The sensing shell may have a three-dimensional shape.

The sensing shell 1020 may surround and/or at least partially enclose one or more components of the vehicle. The sensing shell may at least partially surround electrical components of the vehicle. The sensing shell may at least partially surround a controller, power source, and/or communication unit. In some instances, the sensing shell may completely enclose one or more components of the vehicle. The sensing shell may have a surface that may have any material properties as described previously herein. The sensing shell may include one or more sensors 1030a, 1030b that may be distributed on the sensing shell. In some instances, the sensors may be provided on an interior surface of the sensing shell. The sensors may be capable of detecting acceleration of a surface of the sensing shell. The sensors may also be capable of detecting a collision by the vehicle. In some instances, sensors on opposing surfaces (e.g., 1030a, 1030b) may be used to differentiate a collision from a projectile hit. The sensors may all be capable of communicating with a main control. The sensors may communicate with the main control simultaneously. The main control may use the sensor data to detect whether a hit has occurred, whether a collision has occurred, where a hit has occurred on the vehicle, and/or a virtual status of the vehicle in response to the detected condition. The sensing shell and/or sensors may have one or more characteristics as described elsewhere herein.

The vehicle may have a shooting apparatus 1040. The shooting apparatus may expel a projectile. The projectile may be a BB pellet, or any other type of projectile as described elsewhere herein. The projectile may be used to strike another vehicle. The shooting apparatus may use any shooting method to expel the projectile. In some instances, the shooting apparatus may operate pneumatically. For example, pressurized air or other gas may be used to expel the pellet. In some instances, water, steam, or other media may be used to propel the pellet. In other instances, a form of combustion, controlled explosion (e.g., low explosion), or heat may be used to expel a projectile. The shooting apparatus may be a firearm. In other examples, mechanical components such as springs, elastics, slingshots may be used to expel the projectile. The shooting apparatus may have a form factor of a gun, cannon, mortar, slingshot, crossbow, bow and arrow, or any other form factor. The shooting apparatus may include a hollow tube that may aid in guiding or aiming the projectile. The shooting apparatus may include a support. For instance, a hollow tube may be mounted on the support and may be movable relative to the support.

The shooting apparatus may be controllable. An operator of the vehicle may operate the shooting apparatus. Alternatively, a separate individual may operate the shooting apparatus. In some embodiments, an operator of the vehicle may be controlling the vehicle remotely. The remote operator of the vehicle may also remotely control the shooting apparatus. In some instances, another individual may remotely control the shooting apparatus. Alternatively, a local operator on-board the vehicle may control the shooting apparatus. In another example, the operator of the vehicle may be on-board the vehicle. A remote operator may control the shooting apparatus, or a local on-board operator may control the shooting apparatus. In some instances, the same on-board individual may both operate the vehicle and the shooting apparatus. The operator of the vehicle may control propulsion of the vehicle. For instance, the operator of the vehicle may control where the vehicle goes. The operator of the vehicle may control directly and/or speed of the vehicle.

Any type of remote controller or terminal as described elsewhere herein may be used to control the shooting apparatus. For example, the remote controller can include a smartphone, tablet, laptop, computer, glasses, gloves, helmet, microphone, or suitable combinations thereof. The remote controller can include a user interface, such as a keyboard, mouse, joystick, touchscreen, or display. Any suitable user input can be used to interact with the remote controller, such as manually entered commands, voice control, gesture control, or position control (e.g., via a movement, location or tilt of the terminal). A remote controller may be used to aim the shooting apparatus. The remote controller may be used to fire the projectiles from the shooting apparatus.

In some instances, an operator may directly control the shooting apparatus. Alternatively, autonomous controls of the shooting apparatus may be provided. In some instances, an operator may switch between a direct control and autonomous control mode for the shooting apparatus. The shooting apparatus may be autonomously controlled in accordance with pre-programmed instructions. In some instances, some functions of the shooting apparatus may be directly controlled while others may be autonomously controlled. For example, the shooting apparatus may be aimed autonomously while a user may directly control when the projectiles are fired. Any description herein of control by an operator may also apply to autonomous control.

The operator of the shooting apparatus may control the direction of the shooting apparatus. The shooting apparatus may be capable of being oriented to a desired orientation. The shooting apparatus may change orientation relative to the rest of the vehicle. The shooting apparatus may be capable of swiveling laterally (e.g., left and right). In some instances, the shooting apparatus may laterally swivel over a limited angular range. Alternatively, the shooting apparatus may swivel completely around 360 degrees. In some instances, the shooting apparatus may laterally swivel about a range less than or equal to about 15 degrees, 30 degrees, 45 degrees, 60 degrees, 75 degrees, 90 degrees, 120 degrees, 150 degrees, 180 degrees, 210 degrees, 240 degrees, 270 degrees, 300 degrees, 330 degrees, or 360 degrees. The shooting apparatus may laterally swivel about a range that is greater than any of the values described herein, or in a range falling between any two of the values described herein.

The shooting apparatus may also be to adjust inclination relative to the vehicle. The shooting apparatus may be angled straight laterally, may be angled upwards, or may be angled downwards relative to the vehicle. In some instances, the shooting apparatus may be able to swivel to adjust inclination over a limited angular range. Alternatively, the shooting apparatus may swivel completely up and down 180 degrees. In some instances, the shooting apparatus may laterally swivel up and down about a range less than or equal to about 15 degrees, 30 degrees, 45 degrees, 60 degrees, 75 degrees, 90 degrees, 120 degrees, 150 degrees, or 180 degrees. The shooting apparatus may laterally swivel about a range that is greater than any of the values described herein, or in a range falling between any two of the values described herein.

An operator may be able to control lateral orientation and/or up and down inclination of the shooting apparatus. In some instances, the operator may only be able to control orientation of the shooting apparatus in one direction. In other instances, the operator may be able to control orientation of the shooting apparatus in multiple directions.

The shooting apparatus may or may not be able to move relative to the vehicle. For example, a base of a shooting apparatus may or may not be translatable relative to the vehicle. In one example, the shooting apparatus may slide laterally on a base of a vehicle. In other instances, the shooting apparatus may slide up and down along a base. In some examples, a portion of the shooting apparatus that expels the projectile and aims the projectile may be mounted on a base. The base may or may not be movable. The portion may or may not be able to change orientation relative to the base and/or move relative to the base.

An operator of the shooting apparatus may be able to control when a projectile is expelled. For example, the operator may provide a command for the shooting apparatus to expel a projectile. In some instances, a single projectile may be shot upon command. In other instances, a command to fire a projectile may result in multiple projectiles being shot in sequence or simultaneously. In some instances, the shooting apparatus may be automatic, or semi-automatic. In some instances, a stream of projectiles may be fired until an instruction is provided to stop shooting.

In some embodiments, the same controller may be used to control movement of the vehicle and/or the shooting apparatus. Alternatively different controllers may be used to control movement of the vehicle and the shooting apparatus. In some instances, the controller may include a mouse. In other instances, the controller may include a joystick or any other interface described elsewhere herein.

In one example, a mouse may be used to control the shooting apparatus. The mouse may be used to control a position of the shooting apparatus, such as an orientation of the shooting apparatus. The shooting apparatus may have a support system that may permit adjustment of an orientation of a shooting apparatus. The shooting apparatus may be capable of rotating about one or more axes, two or more axes, or three or more axes. The axes may or may not be orthogonal to one another. The shooting apparatus may be capable of rotating about two orthogonal axes or three orthogonal axes. The shooting apparatus may be capable of rotating about a pitch axis and/or a yaw axis. A shooting apparatus may or may not be capable of rotating about a roll axis. In some instances, a gimbal system may be provided that may permit the shooting apparatus to rotate about the one, two, three or more axes.

Figure 19:
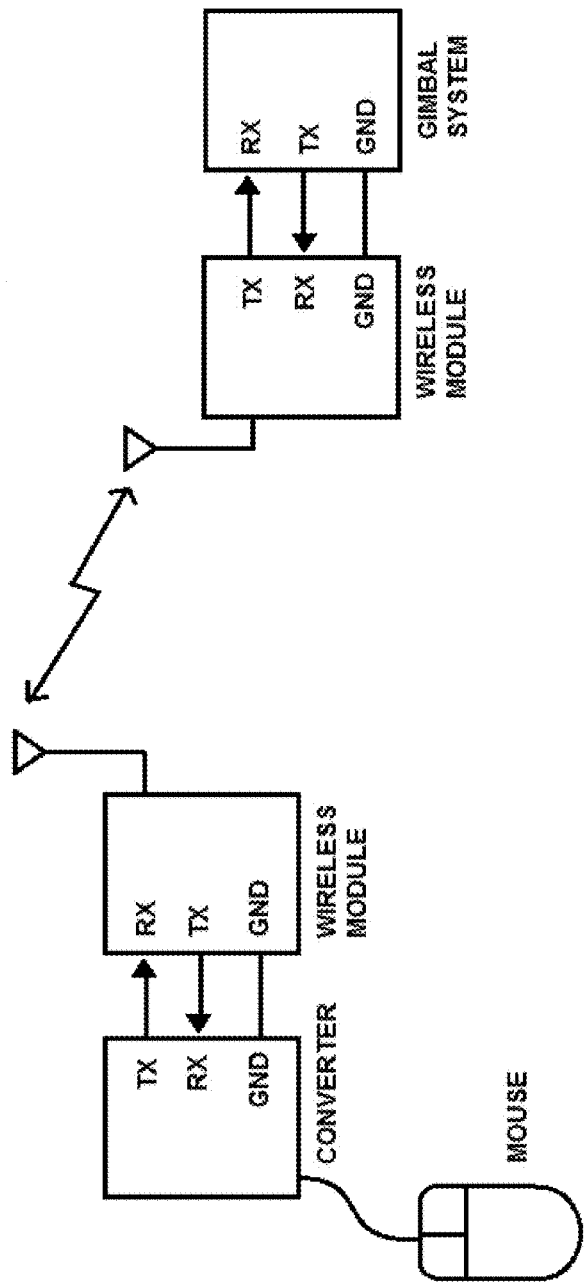
FIG. 19 shows an example of a system employing a mouse to control the positioning of the shooting apparatus.

FIG. 19 shows an example of a system employing a mouse to control the positioning of the shooting apparatus. A mouse may communicate with a converter which may communicate with a first wireless module. The first wireless module may communicate with a second wireless module. The second wireless module may communicate with a gimbal system.

A user may interact with a mouse to control the shooting apparatus. The mouse may be a wired mouse or a wireless mouse. The mouse may communicate with the converter via a hard wired connection or via a wireless connection. The mouse may provide an output in response to user input. The mouse may output positional information and one or more button output. In some instances, the mouse may also have a roller or trackball that may also provide an output. The positional information of the mouse may include x, y coordinate information for the mouse. Moving the mouse sideways from left to right may cause a change in the x coordinate output of the mouse. Moving the mouse from front to back may cause a change in the y coordinate output of the mouse. The button information may include information relating to the depression of one or more buttons of the mouse. The mouse may have a single button, two buttons, or more buttons. In some instances, a right button and left button may be provided. When a use clicks on a button, a signal may be provided indicating the user clicked on the button. When the user holds down the button for an extended period of time, a signal may be provided indicative of the button hold. When a user holds the button while moving a mouse, a signal indicative of a drag may be provided. A mouse may or may not include a trackball or roller. A user may scroll up or down using a roller. Outputs indicative of the scrolling may be provided.

Outputs from a mouse may be provided to a converter. The converter may convert mouse output information to one or more digital signals. The mouse output information may include mouse position/movement information, interaction with buttons, or any other features of the mouse.

The converter may be in communication with a first wireless module. The wireless module may modulate the converter data into wireless electromagnetic waves, which may be transmitted through the air. The converter may communicate with the wireless module via one or more hardwired connection and/or a wireless connection. A ground connection may be provided between the converter and wireless module. A transmitter (TX) may transmit data to a receiver (RX) from the converter to the wireless module, and another transmitter (TX) may transmit data to a receiver (RX) from the wireless module to the converter.

The first wireless module may communicate with a second wireless module. Wireless electromagnetic waves may pass between the first wireless module and the second wireless module. The waves may be transmitted through the air or any other media. In some instances, one-way communications may be provided. Commands from the mouse may be transmitted from the first wireless module to the second wireless module. In some instances, two-way communications may be provided. Data from the second wireless module may optionally be transmitted to the first wireless module. Transmission may occur with aid of one or more antenna or any other wireless communication device. The second wireless module may digitally demodulate the electromagnetic waves and transmit the data to a gimbal system. Similarly, the second wireless system may transmit the data to the gimbal system via a transmitter (TX) which may be received by a receiver (RX) of the gimbal system. Optionally, the gimbal system may have a transmitter (TX) that may transmit data to a receiver of the wireless module (RX). A ground connection may be provided.

The gimbal system may be provided that may permit movement of the shooting apparatus. The gimbal system may permit the shooting apparatus to change orientation in order to aim the shooting apparatus at a target. The shooting apparatus may change orientation about one axis, two axes, or three axes of rotation. A support system for the shooting apparatus may or may not permit the shooting apparatus to translate about one, two, or three directions.

The mouse output may translate to a movement of the shooting apparatus. For example, moving the mouse may cause changes in the x and y coordinates of the mouse, which may correlate to movements of the shooting apparatus. In one example, changing the x coordinate of the mouse may correspond to causing a rotation of the shooting apparatus about a yaw axis while changing the y coordinate of the mouse may correspond to causing a rotation of the shooting apparatus about a pitch axis. In another example, changing the x coordinate of the mouse may correspond to causing a rotation of the shooting apparatus about a pitch axis while changing the y coordinate of the mouse may correspond to causing a rotation of the shooting apparatus about a yaw axis. In some instances, changing a coordinate of a mouse may result in causing a rotation of the shooting apparatus about a roll axis. In some examples, changing the x coordinate of the mouse may correspond to causing a rotation of the shooting apparatus about a pitch axis, a yaw axis, or a roll axis. Changing the y coordinate of the mouse may correspond to causing a rotation of the shooting apparatus about a pitch axis, a yaw axis, or a roll axis, optionally wherein the rotation is about a different axis than caused by changing the x coordinate of the mouse. The direction of movement of mouse may correspond to an axis of rotation for the shooting apparatus. The mouse may be moved in two perpendicular directions (e.g., along X axis, Y axis), which may correspond to two orthogonal axes of rotation for the shooting apparatus. Moving the mouse to simultaneously affect the two perpendicular directions (e.g., changing the x and y coordinates simultaneously) may cause the shooting apparatus to simultaneously rotate about two axes of rotation.

In some instances, a mouse output may include pressing and/or releasing a button of a mouse. In some instances, clicking on the mouse may correspond to causing the shooting apparatus to expel a projectile. For example, a single click may correspond to a single expelled projectile. Each click may correspond to an individual projectile that is fired. In other instances, a single click may correspond to multiple projectiles being fired or multiple clicks (e.g., a double click) may be required to fire a single projectile.

Optionally, clicking, holding, or dragging the mouse may correspond to controlling the position of the shooting apparatus. For example, moving the mouse in a particular direction may cause the shooting apparatus to rotate about a first axis of rotation while moving the mouse in the same direction while holding the mouse button down (e.g., dragging) may cause the shooting apparatus to rotate about a second axis of rotation.

The movement of the mouse may directly correlate to the movement of the shooting apparatus. For example, moving the mouse by a particular amount may cause the shooting apparatus to move by a correlating amount. A linear relationship may be provided between movement of the mouse and the shooting apparatus. Alternatively, other relationships may be provided, such as exponential relationships, or reverse relationships. In some instances, moving the mouse by a particular amount may cause the shooting apparatus to move by a correlating speed (e.g., angular velocity). In some instances, moving the mouse at a particular speed may cause the shooting apparatus to move by a correlating amount (e.g., angle of rotation). In some instances, a distance-to-angle, distance-to-angular velocity, distance-to-angular acceleration, speed-to-angle, speed-to-angular velocity, speed-to-angular acceleration, acceleration-to-angle, acceleration-to-angular velocity, or acceleration-to-angular acceleration relationship may be provided between the mouse and the shooting apparatus respectively.

In some implementations, clicking, holding, or dragging the mouse may change the relationship between the mouse movement and the shooting apparatus movement. For example, normally moving the mouse may create a linear relationship between the distance moved by the mouse and the angle that the shooting apparatus may rotate. Moving the mouse while holding the mouse button (e.g., dragging) may create an exponential relationship between the distance moved by the mouse and the angle the shooting apparatus may rotate.

Figure 20:
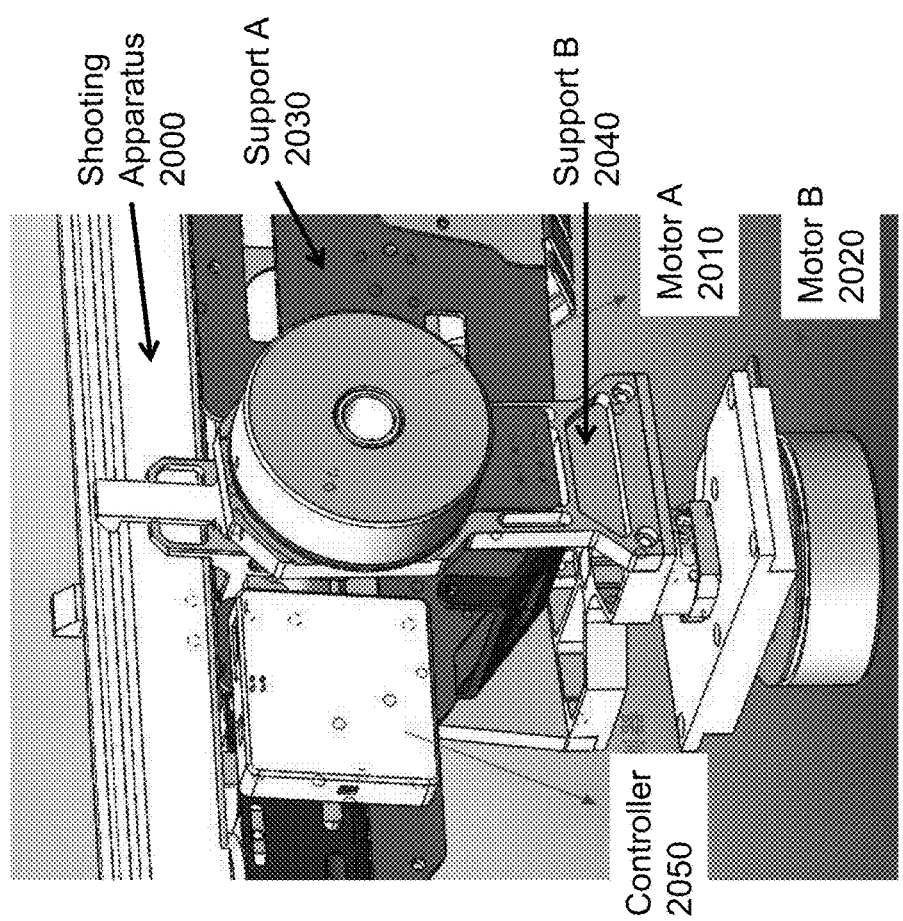
FIG. 20 shows an example of a gimbal system supporting a shooting apparatus in accordance with an embodiment of the invention.

FIG. 20 shows an example of a gimbal system in accordance with an embodiment of the invention. A shooting apparatus 2000 may be provided. The shooting apparatus may be supported by a support apparatus, such as a gimbal arrangement. The support apparatus may include a first support 2030 and a second support 2040. The first support may be a first frame assembly and the second support may be a second frame assembly. The first support may contact the shooting apparatus. The first support may rotate relative to the second support about an axis of rotation. A first motor 2010 may drive the rotation between the first support and the second support. A second motor 2020 may drive the motion of the second support relative to the rest of the vehicle, or a surface of the vehicle. A controller 2050 may send one or more command signals that control the actuation of the motors 2010, 2020.

Mouse commands may be transmitted wirelessly to the gimbal system. The mouse commands may be transmitted to the controller 2050. The controller may receive the mouse commands and generate one or more corresponding command signals that may drive the actuation of the motors 2010, 2020 of the gimbal system. The motors may be brushless motors, or any other type of motor. The degree, speed, or acceleration of the motors may be provided in response to the command signals from the controller and may correlate to one or more mouse commands. The actuation of the motors may result in movement of the shooting apparatus 2000.

In one example, actuation of the first motor 2010 may result in rotation of the shooting apparatus 2000 and a first support 2030 about a first axis. In some instances, the first axis may be a pitch axis. In other examples, the first axis may be a yaw axis or roll axis. Actuation of the second motor 2020 may result in the rotation of the shooting apparatus and the second support about a second axis. In some instances, the second axis may be a yaw axis. In other examples, the second axis may be a pitch axis or roll axis. The second axis may be a different axis from the first axis. The first and second axes may be orthogonal to one another. The first and second axes may remain orthogonal to one another throughout the course of the movement of the shooting apparatus.

Using a mouse to control the movement of the shooting apparatus may advantageously result in accurate coordinate position control of the gimbal. The control user's experience may be improved over other interfaces, and may be more convenient and flexible. In other implementations, other control devices may be used. For example, a touchscreen, joystick, inertial sensors, or other control devices may be used. For example, on a touchscreen, positional information may be determined by a position of a user's hand or other object on the touchscreen. For example, the x and y coordinates of the user's finger or other object may function in a similar manner to the x and y coordinates of the mouse. In another example, the angle of the joystick may correspond to x and y coordinates of the mouse, or may have similar functionality.

A single shooting apparatus may be provided on a vehicle. Alternatively, multiple shooting apparatuses may be on a vehicle. The multiple shooting apparatuses may have the same characteristics or different characteristics. They may shoot out the same types of projectiles or different types of projectiles. Each shooting apparatus may be operated by the same user. Alternatively, different users may control different apparatuses. In some instances, multiple users may control multiple shooting apparatuses simultaneously. In some instances, the multiple shooting apparatuses may be controlled autonomously. Optionally, one or more shooting apparatus may be controlled directly while one or more others may be controlled autonomously. A user may be able to switch between which apparatuses are controlled directly or autonomously.

One or more projectiles may be pre-loaded into or on the shooting apparatus. Multiple projectiles may be pre-loaded so that they can be shot without manual intervention. Multiple projectiles may be stored on the vehicle and may be accessed by the shooting apparatus. In some instances, during a course of the use of a robot (e.g., during a robot game), a robot may only be able to access a limited number of projectiles. For example, 100 pellets may be pre-loaded on but the robot may only be able to shoot 20 pellets. In some instances, events may occur which may increase or decrease the number of pellets that a robot may be able to shoot. For example, a robot may be allowed to shoot an additional 10 pellets from the pre-stored pellets if it survives a certain amount of time. In another example, a robot may be allowed to shoot an additional 5 pellets every time it successfully shoots another robot.

The vehicle may include one or more propulsion units 1050. In some embodiments, the propulsion units may include wheels. The propulsions may include any other components, as described elsewhere herein. The propulsion units may enable the vehicle to move freely about an environment. For example, the vehicle may move freely about over land, in the water, on the water surface, underground, in the air, or in space. The vehicle may move freely along one dimension, two dimensions, or three dimensions. The vehicle may optionally move along a fixed track.

Figure 11:
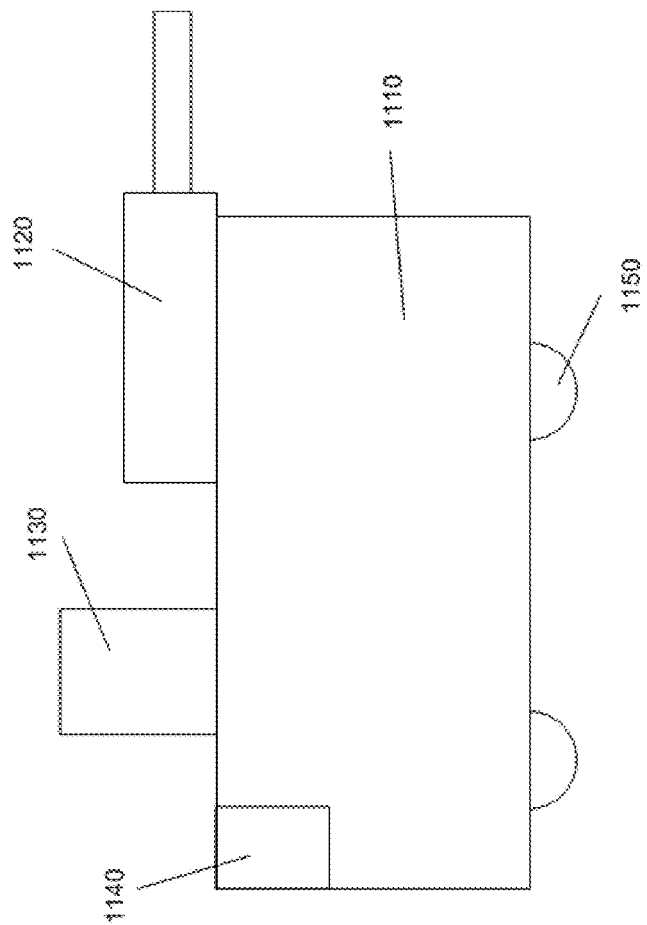
FIG. 11 shows an additional example of a vehicle with a sensing shell in accordance with embodiments of the invention.

FIG. 11 shows an additional example of a vehicle with a sensing shell in accordance with embodiments of the invention. The vehicle may include a housing 1110 that may include a sensing apparatus. The vehicle may also include one or more shooting apparatuses 1120, as described elsewhere herein. A camera or other sensing device may be mounted on the vehicle 1130. One or more communication unit may be provided 1140. A propulsion unit 1150 may permit the vehicle to move about freely.

In some embodiments, a vehicle may include a sensing unit. The sensing unit may be an image capturing device, such as a camera. The image capturing device may capture images from a visible spectrum, or any other electromagnetic spectrum (e.g., infrared, ultraviolet, etc.). The camera may be capable of capturing still images and/or video images. The camera may be directed toward a front of a vehicle. The camera may capture images from a perspective of the vehicle. The camera may be angled to show the direction that a shooting apparatus is pointed. The camera may have a sufficiently wide field of view to view the entire range of the shooting apparatus orientation. The camera may or may not include an optical element such as a lens, mirror, or plate. The camera may include an image sensor.

In some embodiments, a single camera may be on the vehicle. Alternatively, multiple cameras may be provided. Multiple cameras may be aimed in the same direction or in multiple directions. Optionally, multiple cameras may be aimed in opposing direction. For example, one may be aimed toward the front of the vehicle while another may be aimed toward the rear of the vehicle. In some instances, one camera may be aimed to the left while another may be aimed to the right. A camera may or may not be angled upward. The cameras may be angled at any angles relative to one another, such as any angle values described elsewhere herein.

The cameras may be provided at fixed angles relative to the vehicle. For example, a front-facing camera may remain front-facing. In other instances, the orientation of the camera may be changed relative to the vehicle. For example, the camera may be rotated about one, two and/or three axes. The camera may be able to pan, tilt, and/or zoom in or out. The camera may or may not be able to translate along one or more axes. The cameras may adjust in response to a command from an operator. The operator may be an operator of a vehicle, of a shooting apparatus, or any other individual. In some instances, the operator may control the camera angle remotely. Alternatively, the operator may be on-board the vehicle and may directly control the camera angle. In some instances, the camera angle may be altered manually.

Other types of sensors may be provided on the vehicle. The sensors may include inertial sensors, such as those provided in an inertial measurement unit (IMU). An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the vehicle such that the motion of the vehicle corresponds to motion of the IMU. Alternatively the IMU can be permitted to move relative to the vehicle with respect to up to six degrees of freedom. The IMU can be directly mounted onto the vehicle, or coupled to a support structure mounted onto the vehicle. The IMU may be provided exterior to or within a housing of the vehicle. The IMU may be permanently or removably attached to the vehicle. In some embodiments, the IMU can be an element of a payload of the vehicle. The IMU can provide a signal indicative of the motion of the vehicle, such as a position, orientation, velocity, and/or acceleration of the vehicle (e.g., with respect to one, two, or three axes of translation, and/or one, two, or three axes of rotation). For example, the IMU can sense a signal representative of the acceleration of the vehicle, and the signal can be integrated once to provide velocity information, and twice to provide location and/or orientation information. The IMU may be able to determine the acceleration, velocity, and/or location/orientation of the vehicle without interacting with any external environmental factors or receiving any signals from outside the vehicle.

In other implementations, the sensors may include ultrasonic sensors, acoustic sensors, infrared sensors, lidar, GPS receivers, motion sensors, proximity sensors, or visual sensors.

A communication unit 1140 may be provided on the vehicle. The communication unit may permit communication between a vehicle and an external device. The communications may be wireless communication. In some embodiments, the communications may include direct communications between the vehicle and the external device. Direct communications may include the formation of a direct communication link between transceivers of the vehicle and the external device. Examples of direct communication may include Wifi, WiMAX, COFDM Bluetooth, or infrared communications. In other instances, the communications may include indirect communications between the vehicle and the external device. Optionally, indirect communications may include one or more intermediary device between the vehicle and the external device. In some examples the intermediary device may be a satellite, router, tower, relay device, or any other type of device. In some embodiments, indirect communications may occur over a network, such as a telecommunications network (e.g., 4G, 3G, or any other type), or the Internet.

Examples of the external device may include a controller of the vehicle, or one or more component of the vehicle. For example the external device may control a propulsion unit, a shooting apparatus, a camera, or any other component of the vehicle. The external device may display information received from the vehicle. For example, the external device may display an image captured by a camera of the vehicle. In some instances, the external device may display images captured from multiple cameras of the vehicle. The external device may display a location of the vehicle. The external device may display data about a virtual status of the vehicle. For example, the external device may display data about the current number of life points of a vehicle. The life points may be displayed as the amount of remaining life points from a total value. The data may display information about virtual damage sustained by the vehicle.

The external device may communicate with the vehicle and/or one or more components of the vehicle directly. In other instances, indirect communications may occur. A communication unit of the external device may communicate with the communication of the vehicle. Two-way communications may be employed between the vehicle and the external device.

Any description herein of a vehicle may apply to any other type of object. This may include stationary objects. Vehicles may be dynamic and/or capable of being self-propelled. In some instances, stationary objects need not have propulsion units. The stationary objects may be placed at a location, built into a location, or affixed to a location. An example of a stationary object may be a tower or turret. The stationary object may be any other structure such as a wall, building, pole, fence, ditch, box, dome, or any other type of structure.

The stationary object may have a sensing apparatus, such as a sensing shell. The stationary object may be capable of detecting when the stationary object is hit by a projectile. The stationary object may detect a hit based on a change in acceleration of a surface of the stationary object or sensing shell of the stationary object. The sensing shell may cover an entirety of the stationary object, or a portion of the stationary object. For example, a turret may be provided with a sensing shell encasing at least a portion of the turret.

The stationary object may optionally have a shooting apparatus. The shooting apparatus may be aimed. Alternatively, the shooting apparatus may have a fixed orientation relative to the stationary object. The shooting apparatus may expel one or more projectiles. In one example, a turret may have a gun that may be aimed and fired. The turret may aim the gun at vehicles or other stationary objects. The turret may aim the gun at live beings. In some instances, a user may directly control the shooting apparatus of the stationary object. Alternatively, the shooting apparatus may operate in an autonomous mode in accordance with pre-programmed instructions and not requiring human interaction. In some instances, a user may switch between a directly control and autonomous mode for the shooting apparatus of the stationary object. In some instances, some portions of the shooting apparatus control may be direct while some may be autonomous. For example, a user may directly control the aim of the shooting apparatus while the firing of the projectiles may occur autonomously.

The stationary object may have a communication unit. The stationary object may be capable of communicating with one or more external device, as provided in other embodiments elsewhere herein. The stationary object may have any characteristic of a vehicle as described elsewhere herein, without moving.

A virtual status may be determined for the stationary object. For example, a virtual damage assessment may be made, which may be independent of any physical damage. In some instances, life points may be deducted from the turret when the turret is hit by a projectile. When the turret no longer has any life points left, it may no longer be able to shoot or participate in an activity.

Any description herein of a vehicle and/or stationary object may apply to any other type of object, such as a living being. A live being may be a human or animal. Examples of live beings are described in greater detail elsewhere herein. A live being may be capable of locomotion, and of moving about an environment. The live being may or may not be riding on a machine, or may be moving about on its own power.

The live being may wear a sensing apparatus, such as a sensing shell. The sensing apparatus may be capable of detecting when the live being is hit by a projectile. The sensing apparatus may detect a hit based on a change in acceleration of a surface of the sensing apparatus of the live being. The sensing shell may cover an entirety of the live being, or a portion of the live being. For example, a human may be provided with a wearable sensing shell encasing at least a portion of the human. The sensing shell may or may not be rigid. In some instances, a portion of the sensing shell may be rigid while a portion may be flexible. In other instances, an entirety of the wearable sensing shell may be flexible.

The sensing shell may be worn by a live being and may cover any portion of a live being. For example, the sensing shell may cover one or more portions of the live being: head, face, neck, arm, hands, torso, legs, and/or feet. The sensing shell may be worn as a helmet, face mask, neck support, body armor, armbands, wrist bands, sleeves, gloves, pants, leggings, and/or shoes. The sensing shell may wrap around a portion of the live being's body. The sensing shell may remain on the live being, even when the live being is moving about, such as running, walking, jumping, or climbing.

The live being may optionally have a shooting apparatus. The live being may aim the shooting apparatus. The shooting apparatus may expel one or more projectiles. In one example, a human may have a gun that may be aimed and fired. The human may aim the gun at other humans, vehicles or stationary objects. The human may fire the projectiles. In one example, a shooting apparatus may have a trigger that may be contacted by the human to fire the projectile.

The live being may move about while trying to avoid being shot and while trying to shoot other objects. The sensing apparatus on the live being may detect when the live being is shot. A virtual status may be determined for the live being. For example, a virtual damage assessment may be made, which may be independent of any physical damage. In some instances, life points may be deducted from the live being when the live being is hit by a projectile. When the live being no longer has any life points left, it may no longer be able to shoot or participate in an activity.

Vehicle Communication Systems

Communication systems may be provided in accordance with an aspect of the invention. Any description herein relating to a vehicle communication system may include any communication system that includes a sensing apparatus as described elsewhere herein, and vice versa. Any description herein of any vehicle communication system may include any communication system that includes a sensing shell, as described elsewhere herein, and vice versa. Similarly, any reference to a vehicle may include an object (such as a movable object), robot, or live being. For instance, a vehicle may be a robot. Descriptions of sensor apparatuses on vehicles may refer to any sensor apparatuses on robots or worn by live beings.

Figure 12:
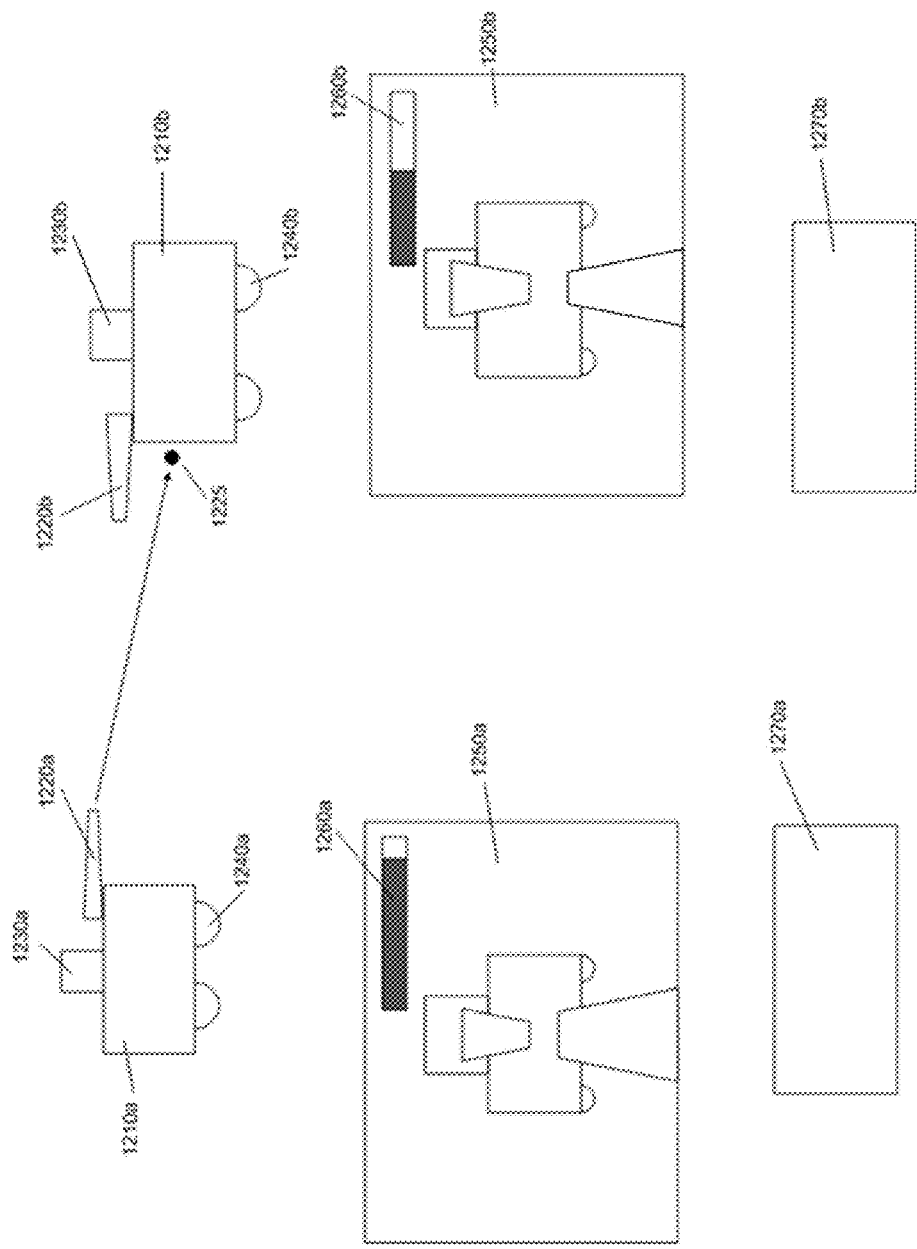
FIG. 12 shows an example of a plurality of vehicles that may be interacting with a vehicle communication system in accordance with embodiments of the invention.

FIG. 12 shows an example of a plurality of vehicles that may be interacting with a vehicle communication system in accordance with embodiments of the invention. A first vehicle may be provided having a sensing shell 1210a, shooting apparatus 1220a, camera 1230a, and/or propulsion mechanism 1240a. A second vehicle may be provided, having a sensing shell 1210b, shooting apparatus 1220b, camera 1230b, and/or propulsion mechanism 1240b. The vehicles may have any characteristics or features as described elsewhere herein. One or more display units 1250a, 1250b may be in communication with the vehicles. The displays may show information, such as images captured by a camera and/or a life level 1260a, 1260b for the vehicles. Optionally, one or more control units 1270a, 1270b may be provided. The control units may be used to control the vehicles.

Any number of vehicles may be provided over the communication system. In some instances, a single vehicle is provided. Alternatively, two, three, four, five, six, seven, eight, nine, 10, 11, 12, 13, 14, 15, or more vehicles may participate in the communication system. The vehicles may be self-propelled and may move within their environment. The vehicle may have a sensing shell 1210a, 1210b in accordance with an embodiment of the invention. The sensing shell may be capable of detecting when a vehicle is hit by a projectile. The sensing shell may detect a change of acceleration on a surface of the shell. A processor may determine whether the sensed signals, such as the changes in acceleration are indicative of a projectile hit. The sensing shell may have any characteristics of sensing shells as described elsewhere herein.

Optionally, the vehicles may include a shooting apparatus 1220a, 1220b. In some instances, all vehicles in the communication system have one or more shooting apparatuses. Alternatively, some vehicles may not have shooting apparatuses. The shooting apparatuses of a vehicle may be capable of expelling a projectile. FIG. 12 shows an example where a projectile 1225 is expelled from a shooting apparatus 1220a of a first vehicle, toward the sensing shell 1220b of the second vehicle. The sensing shell of the second vehicle may be capable of detecting a change in acceleration on a surface of the sensing shell. The change in acceleration may be analyzed to determine whether the projectile hit the sensing shell. Any other types of signals may be considered in determining whether the projectile has hit the sensing shell, in the place of or in addition to the change in acceleration. The projectile may have any characteristic as described elsewhere herein.

In addition to detecting that a hit has occurred, the sensing shell may be used to determine the location on the sensing shell where the hit occurred. In some instances, a vehicle may be capable of determining which side of a vehicle was hit by the projectile. The vehicle may be capable of determining which side of a sensing shell hit by the projectile. In some instances, a sensing shell may have one or more zone or region. A single sensing zone may be provided on a side of the sensing shell. Alternatively, multiple sensing zones may be provided on a side of the sensing shell. A determination may be made which sensing zone(s) was hit by the projectile. The sensing zone may correspond to the presence of a sensor. For example, each sensor may have its own sensing zone. The sensing zone may include a region surrounding the sensor. The sensing zone may be within a predetermined proximity threshold of the sensor. The sensing zones may divide the surface of the sensor shell. The sensing zones may or may not overlap. Optionally, having a larger number of sensing zones and/or smaller sized sensing zones may increase the precision of the location of the detected projectile hit. For example, if a greater density of sensing zones are provided (larger number of sensing zones per given area), the location of the projectile hit may be pinpointed with a greater degree of accuracy and/or precision.

Information about the source of the hit may be determined with aid of the sensing shell. For example, the sensing shell may be used to determine the relative direction from which the projectile originated. In some instances, acceleration may be measured along multiple directions. The relative amount of acceleration along the multiple directions may be analyzed to calculate a direction of origination for the projectile. In some instances, the acceleration along three orthogonal axes may be detected and/or analyzed. Additionally or alternatively, the side that was hit may be analyzed to determine a rough direction.

For example, if a front side of the vehicle was hit, it may be deemed likely that the projectile originated from in front of the vehicle. For example, the second vehicle may analyze that the projectile 1225 originated from the front. The second vehicle may make this determination by detecting that the front side of the sensing shell 1210b was hit, and/or that the amount of acceleration in a direction orthogonal to the front surface was greater than the amount of acceleration in a direction parallel to the front surface. Thus a determination may be made that the first vehicle and its shooting apparatus 1220a are located in front of the second vehicle. Optionally, it may be detected that the projectile was making a downward trajectory. For instance, an amount of acceleration in a downward direction may be detected.

The sensing shell may be capable of estimating the proximity of the origination point of the projectile. In some instances, the amount of detected acceleration may be analyzed. For example, a greater acceleration may correspond to a closer proximity of a shooting apparatus from which the projectile originated. In situations where the projectiles and/or shooting apparatuses are standardized, the correlation between the amount of acceleration and the proximity of the shooting apparatus may be easily calculated. The shooting apparatuses may be standardized to shoot the same type of projectiles with a standard amount of force. For example, in certain robot game scenarios, the robots may use the same shooting apparatuses and/or projectiles.

In other instances, different projectiles and/or shooting apparatuses may be provided. In some instances, information about the different projectiles and/or shooting apparatuses may be accessible. The information may be used to estimate a proximity of the origination point of the projectile. In some instances, vehicles may self-identify information about their shooting apparatus and/or projectiles. For example, a first vehicle may communicate information about the vehicle shooting apparatus 1220a over the communication system. This may include a model of the shooting apparatus, information about the size or mass of the projectile, information about the degree of force with which the projectiles are typically fired, or any other information. In some instances, information about a model of a shooting apparatus may provide access to other information about the shooting apparatus, such as size or mass of projectile, or information about the degree of force with which the projectiles are typically fired. The information about the model of shooting apparatus may be stored in a look up table or other any other form of memory. The information may be stored in a memory on-board the first vehicle, on-board the second vehicle, on a central server, or on the cloud or any other type of distributed infrastructure. The information about the shooting apparatus and/or projectile may be considered along with the information gathered from sensors of the sensing shell to estimate a distance to the shooting apparatus. The information gathered from the sensors may include an amount acceleration of a surface of the sensing shell of the second vehicle. In one example, if it is known that a first type of shooting apparatus shoots a projectile with a greater amount of force than a second type of shooting apparatus, such information may be used to compensate in the calculation. If the same amount of acceleration was detected for both types of shooting apparatus, it may be determined that the first type of shooting apparatus is likely further away than the second type of shooting apparatus.

The sensing shell may be capable of differentiating different types of projectiles and/or shooting apparatuses. In some instances, other techniques may be used to approximate a distance between the vehicles. For example, geolocation sensors, such as GPS receivers may be provided on the vehicles and used to calculate relative distances and/or locations between the vehicles. The distances between the vehicles may be considered along with information gathered from the sensors of the sensing shell to determine information about the shooting apparatus and/or projectile. The information gathered from the sensors may include an amount acceleration of a surface of the sensing shell of the second vehicle. In one example, if it the amount of distance is known, such information may be used to compensate in the calculation. In one example, it is known that a first shooting vehicle is further from a sensing vehicle than a second shooting vehicle. If the same amount of acceleration was detected for both shooting vehicles, it may be determined that the first type of shooting apparatus is likely exerting more force or shooting projectiles with greater mass than the second type of shooting apparatus.

Any information relating to the source of the projectile may be stored in memory and/or displayed to a user. For example, a user controlling a vehicle may be able to view information about the vehicle on a display 1250a, 1250b. In some instances, when a vehicle is hit by a projectile, the fact that the hit occurred may be displayed on the display. In some instances, the location on the sensing vehicle where the hit occurred may be displayed. For example, words may be displayed that indicate the portion or side of the sensing vehicle that was hit. In another example, an image, such as a diagram may be displayed to indicate the portion or side of the sensing vehicle that was hit. For example, a diagram showing various portions of the sensing vehicle may be presented, with the portion that was hit highlighted or flashing. The image may be a static image or moving image (e.g., video). In some instances, an audio cue may be provided about the portion of the sensing vehicle that was hit. Optionally, the display device may indicate information about an origination point of the projectile. For example, the display device may include words, images, or audio cues about an estimated origination direction and/or distance. In one example, a diagram may be presented showing an estimated position of a source of the projectile relative to the sensing vehicle. The display may or may not include information about a type of projectile or shooting apparatus. For example, the display device may include words, images, or audio relating to the type of projectile or shooting apparatus. For example, the display device may include a description of the type of projectile and/or shooting apparatus that the sensing vehicle was hit with, and a corresponding amount of damage.

A vehicle may have an image capturing device 1230a, 1230b. As previously described, the image capturing device may be located on any portion of the vehicle. The image capturing device may be oriented in any direction. The image capturing device may be aimed toward a shooting apparatus. The image capturing device may be aimed to provide a user with a perspective from the shooting apparatus. Multiple image capturing devices may be provided.

The display device 1250a, 1250b may display images captured by the image capturing device. In some instances, each vehicle may have a dedicated display device. For example, a first vehicle may communicate with a first display device 1250a and a second vehicle may communicate with a second display device 1250b. The individualized displays may permit a user associated with a first vehicle to view information relating to the first vehicle and not the second vehicle, and a user associated with a second vehicle to view information relating to the second vehicle and not the first vehicle. In some instances, the display device may include still images captured by the image capturing device. In other instances, the display device may include video images captured by the image capturing device. The video may be streaming on the display device in real-time. The display device may show live video from the perspective of the vehicle. In some instances, the device may show video that includes a portion of the vehicle within it. Optionally, images from multiple image capturing devices may be shown on a display device. In one instance, multiple image capturing devices may be provided on a vehicle. These images capturing devices may capture images from multiple angles or perspectives. In some instances, one or more of these image capturing devices may show a portion of the vehicle. In another instances, one or more camera may be provided off-board the vehicle. For example, the vehicle may be in an environment that may include one or more image capturing devices. The multiple images may be displayed simultaneously on the display device. For example, the display device may include a row, column, and/or array of images shown simultaneously. The images may be displayed sequentially. For example, the display device may loop through different video feeds. In some instances, a combination of simultaneous and sequential feeds may be provided. For example, a row, column, and/or array of images may be presented, one or more which may loop through different feeds.

In some instances, a single display device may be provided for a single vehicle. In other examples, multiple display devices may be provided for a single vehicle. In one example, a vehicle may have multiple image capturing devices, and the multiple display devices may be dedicated to the different image capturing devices. In another example, a vehicle may have a single image capturing device, and one of the displays may be devoted to images captured from the image capturing device. One or more other display devices may be provided to show other information relating to the vehicle. For example, the relative position of the vehicle compared to other vehicles or an environment may be presented. In another example, a virtual status of the vehicle, or information about a projectile hit on the vehicle, may be presented.

In some instances, the display devices 1250a, 1250b may show information relating to a virtual status 1260a, 1260b of the vehicle. In one example, the virtual status may refer to an amount of life points that the vehicle has. In one example, an absolute number of life points may be displayed. In another example, a relative number of life points may be displayed. For example, the number of life points relative to a total possible number of life points, or initial number of life points may be provided. In one example, the information may be displayed as text, such as numerical values (e.g., XX points total, or XX/YY points). In another example, the information may be displayed graphically. For example, a bar may be displayed, showing the amount of life points left relative to a total possible amount, or initial amount. For instance, having a larger dark region as illustrated may be indicative of a greater virtual health for the vehicle. The graphical representation may have any other form, such as a pie chart, line, number of icons, size of vehicle, color, flashing, or any other type of graphical representation. For instance, a yellow flashing image may appear when the vehicle is beneath a certain threshold of life points, and a red flashing may appear when the vehicle is even further beneath another threshold of life points (e.g., in a critical state, close to zero points).

The display devices 1250a, 1250b may be remote from the vehicles. The display devices and the vehicles may communicate wirelessly. In some instances, no physical connection is provided between the display devices and the vehicles.

In some embodiments, one or more controlling device 1270a, 1270b may be provided. In some instances, each vehicle may have a corresponding controlling device. A first vehicle may have a first controlling device 1270a and a second vehicle may have a second controlling device 1270b. The controlling device may control one or more components of the vehicle. For example, the controlling device may control a propulsion unit of the vehicle. The controlling device may be used to determine positioning of the vehicle and/or control motion of the vehicle. The controlling device may be used to control steering, velocity, and/or acceleration of the vehicle.

Optionally, the controlling device may be used to control a shooting apparatus 1220a, 1220b of the vehicle. The controlling device may aim one or more shooting apparatuses of a vehicle. The controlling device may provide a command to file a projectile and/or multiple projectiles.

The controlling device may be used to control an image capturing device 1230a, 1230b of the vehicle. The controlling device may be used to aim an image capturing device. The controlling device may be used for pan, tilt, zoom, or other controls of the image capturing device. The controlling device may be used to turn an image capturing device on or off. The controlling device may be used to change modes of the image capturing device (e.g., different lighting modes, exposure modes, still vs. video modes).

The controlling device may be used to control a sensing shell 1210a, 1210b of the device. In some instances, the sensitivity settings of the sensing shell may be increased or decreased in response to a command from the controller. The sensitivity settings may be altered by changing threshold values of detected acceleration that are determined to be a projectile hit.

In some instances, separate controlling devices may be used to control different components or functions of the vehicle. For example separate controlling devices may be used to control movement, shooting apparatus, camera, sensing shell, and/or any other component of the vehicle. Alternatively, a single controlling device may be able control multiple components or functions of the vehicle. For example, a single controlling device may be used to control movement, shooting apparatus, camera, sensing shell, and/or any other component of the vehicle.

The controlling may have any user interactive device that may permit the user to interact with the controlling device. For example, the controlling device may have one or more touchscreen, button, keys, knobs, switches, joystick, trackball, pointing device, camera, motion sensor, infrared sensor, microphone, inertial sensor, or any other user interactive device that may accept an input from a user of the controlling device. For example, a user may touch a touchscreen of a controlling device to control functions of the vehicle. A user may depress a button to control functions of the vehicle. In another example, a user may move a joystick. In another example, a user may issue a verbal command that may be received by one or more microphones. In another example, the user may make a gesture which may be captured by a camera of the device. In another example, the user may tilt or move the controlling device, which may be captured by an inertial sensor of the device. In some instances, multiple user interactive devices may be controlled by a user to control one or more functions. In some instances, multiple types of user interactive devices may be controlled by a user to control one or more functions. For example, a user may use one or more joysticks to control movement of the vehicle while issuing verbal commands to the shooting apparatus to aim (e.g., "pan left, pan right, tilt up, tilt down") and/or fire (e.g., "fire").

The display devices 1270a, 1270b may be remote from the vehicles. The controlling devices and the vehicles may communicate wirelessly. In some instances, no physical connection is provided between the controlling devices and the vehicles.

The display devices 1250a, 1250b may be separate devices from the controlling devices 1270a, 1270b. Alternatively, the display devices and controlling devices may be integrated into a single device. Functionality of the display devices and the controlling device may be combined into a single device.

Figure 13:
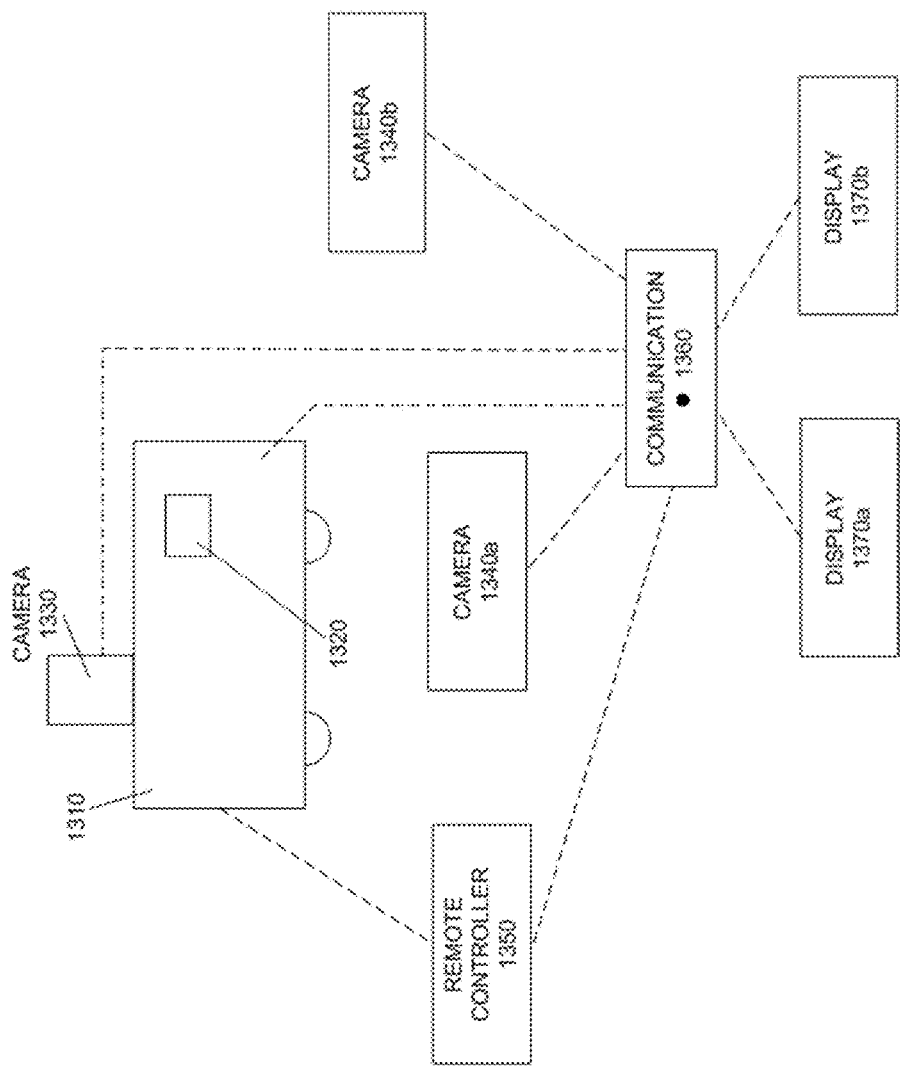
FIG. 13 shows an example of a vehicle communication system in accordance with embodiments of the invention.

FIG. 13 shows an example of a vehicle communication system in accordance with embodiments of the invention. A vehicle may be provided with a sensing shell 1310, additional sensing unit 1320, and/or an image capturing device 1330. One or more external cameras 1340a, 1340b may be provided. A remote controller 1350 may control one or more functions of the vehicle. The various devices may be in communication over a communication system 1360. One or more display devices 1370a, 1370b may be in communication with the communication system.

The vehicle may have a sensing shell 1310. The sensing shell may include one or more sensors that may provide a signal reflecting a sensed condition. For example, an acceleration of a sensing shell surface may be detected. Information from the sensor signals may be used to determine whether the sensing shell was hit by a projectile. Information from the sensor signals may also be used to determine whether the vehicle was involved in a collision. Other scenarios may be gleaned from the sensor signals. In some instances, further details of the projectile hit or collision may be determined (e.g., side or portion of the sensing shell that is hit by the projectile or was involved in the collision, direction of collision, direction from which the projectile came, distance from which the projectile came, the type of shooting apparatus and/or projectile that were used). In some embodiments, the determinations may be performed on-board the vehicle. For example, the vehicle may have one or more on-board processors that may be used to determine whether a projectile hit and/or collision occurred. The on-board processors may optionally determine additional details. In other examples, the calculations may occur off-board the vehicle. For instance, calculations may occur on one or more external device. The external device may be a remote controller 1350, display device 1370a, 1370b, computer, server, cloud-computing infrastructure, smartphone, tablet, or any other type of device.

Calculations relating to a virtual status of the vehicle may be made in accordance with the signals from the sensors. For example, information pertaining to a detected projectile hit may be used to calculate a virtual status of the vehicle. Further examples relating to virtual status of a vehicle and/or virtual feedback regarding the vehicle are described elsewhere herein. This calculation may occur on-board the vehicle. Alternatively, it may occur off-board the vehicle, such as at a central game server.

The vehicle may have other sensors 1320. In some instances, the other sensors may be used to detect positioning of the vehicle. The other sensors may include inertial sensors, ultrasonic sensors, GPS receivers, vision sensors, lidar, motion sensors, or any other sensors, such as those described elsewhere herein. In some instances, the sensors may detect an absolute position of the vehicle, or relative position of the vehicle. The sensors may detect spatial location and/or orientation. In some instances, sensors of the first vehicle may be used alone or in combination with information from a sensing shell of the second vehicle to determine whether the second vehicle was hit by a projectile, details about the projectile hit, or whether a collision occurred. One or more calculations may be made on-board the vehicle. For example, calculations relating to location of the vehicle may be made on-board the vehicle. One or more calculations may be done off-board the vehicle, such as at any external device illustrated or described elsewhere herein. For instance, an external device may receive information from the first vehicle and the second vehicle, and use the information separately or in combination to determine a virtual state for the second vehicle (e.g., whether a projectile hit has occurred, whether a collision has occurred, how life points for either vehicle may be affected). Information captured from sensors may be sent at discrete times or streamed over a communication system 1360.

The vehicle may include a camera 1330. The camera may be used to capture images from the perspective of the vehicle. The camera may be directed to a front of the vehicle so that a user can see where the camera is going. The camera may be directed to be in-line with a shooting apparatus so a user can see where the shooting apparatus is aiming. In some optional implementations, information from the camera may be used to aid in communicating with the system to determine whether a hit has occurred. For example, information from a camera of a first vehicle may be used alone or in combination with information from a sensing shell of a second vehicle to determine whether the second vehicle was hit by a projectile, such as a projectile from the first vehicle, or whether a collision occurred. In some instances, information from the camera of the first vehicle may be used alone or in combination with information from a sensing shell of a second vehicle to determine details of a projectile hit (e.g., which portion of the second vehicle was hit, how far the vehicles are from one another, direction of origination of the hit, type of shooting apparatus, and/or type of projectile). Information from the camera of the first vehicle may be used alone or in combination with information from a sensing shell of a second vehicle to determine life status of the second vehicle and/or first vehicle (e.g., whether projectile hit occurred, whether collision occurred, how life points of either vehicle may be affected). One or more calculations may be done on-board the first vehicle or the second vehicle. One or more calculations may be done off-board the first vehicle or second vehicle, such as at any external device illustrated or described elsewhere herein. For instance, an external device may receive information from the first vehicle and the second vehicle, and use the information separately or in combination to determine a virtual state for the second vehicle. Image processing may occur for various applications. Image processing may occur on-board the vehicle or off-board the vehicle. Captured images may be streamed over a communication system 1360.

One or more external camera 1340*a*, 1340*b* may be provided within a communication system. Alternatively, no separate external cameras may be needed. The external cameras may capture images of the vehicle or an environment within which the vehicle moves about. In some instances, multiple external cameras may provide different perspectives of the environment. They may have different viewpoints and/or angles. Their fields of view may vary. The external cameras may be mounted onto a stationary support or a movable support. The external cameras may be mounted on structures or other vehicles.

Images from the external cameras may optionally be used to track locations of various vehicles within an environment. In some instances, the images can be used to aid in communicating with the system to determine whether a hit has occurred. For example, information from an external camera may be used alone or in combination with information from a sensing shell of a second vehicle to determine whether the second vehicle was hit by a projectile, such as a projectile from the first vehicle, or whether a collision occurred. In some instances, information from the camera may be used alone or in combination with information from a sensing shell of a second vehicle to determine details of a projectile hit (e.g., which portion of the second vehicle was hit, how far the vehicles are from one another, direction of origination of the hit, type of shooting apparatus, and/or type of projectile). Information from the external camera may be used alone or in combination with information from a sensing shell of a second vehicle to determine life status of the second vehicle and/or first vehicle (e.g., whether projectile hit occurred, whether collision occurred, how life points of either vehicle may be affected). One or more calculations may be done on-board the second vehicle. One or more calculations may be done off-board the second vehicle, such as at any external device illustrated or described elsewhere herein. For instance, an external device may receive information from the first vehicle and the second vehicle, and use the information separately or in combination to determine a virtual state for the second vehicle. Image processing may occur for various applications. Image processing may occur on-board the vehicle or off-board the vehicle. Captured images may be streamed over a communication system 1360.

One or more display devices 1370*a*, 1370*b* may display information pertaining to the vehicle and/or information captured from the system. Information from a sensing shell, sensor, vehicle camera, external camera, remote sensors, or any other type of sensing system, alone or in combination, may be used to determine a virtual state of one or more vehicle, real physical state of a vehicle, any information about an environment. Data from any sensing system alone or in combination may be analyzed, streamed, and/or displayed.

For example, one or more of the display devices may show images streamed from a vehicle camera. One or more of the display devices may show images streamed from an external camera. One or more of the display devices may show information about a virtual status of the vehicle (e.g., information about life points of a vehicle, when a projectile hit occurs, when a collision occurs, details of the projectile hit, details of the collision). One or more display device may show information about a physical state of the vehicle (e.g., location of the vehicle, location of a vehicle within a defined environment, location of a vehicle relative to other vehicles, orientation of the vehicle, any physical damage or error relating to the vehicle). Each display device may show different types of information, or may show similar types of information. In some instances a single display device may only show a single type of information, or multiple types of information. Multiple types of information may be displayed simultaneously or sequentially. Multiple types of information may be displayed on different portions of the display device or may be overlaid on the same portion of the display device.

The one or more display devices may receive information over a communication system 1360. The display devices may receive information over the communication from the system from a source device of the information or from an intermediary device. The source device may be a device that originates a signal. For example, a source device of a sensing shell data may be a vehicle upon which the sensing shell is mounted, or may be the sensing shell itself without going through the vehicle processor. In another example, a source device may be an on-board sensor of the vehicle, directly from the sensor or the vehicle to which the sensor is attached. In another example, a source device may be a camera on-board the vehicle, directly from the camera or the vehicle to which the camera is mounted. In another example, a source device may be an external camera. An intermediary device may be a device comprising a processor that may process information from a source device. For example, a server, computer, tablet, smartphone, or any distributed devices (e.g., having a cloud computing infrastructure) may receive information from a source device and perform one or more calculation relating to information from a source device. In some instances, a source device may analyze data from a sensor of the source device. Alternatively, raw data may be output by the source device. Optionally, an intermediary device may receive information from a source device pertaining to a sensor of a source device, and analyze data from the source device.

A communication system 1360 may be any type of communication system permitting communication between different devices. In some instances, a communication system permits direct communication between different devices. For example, direct communications may occur via WiFi, WiMAX, COFDM, Bluetooth, infrared communications, or other forms of communications that occur directly between two objects. In some instances, direct communications may be limited by distance. In some instances, direct communications may be limited by line of sight, or obstructions. Direct communications may permit fast transfer of data, or a large bandwidth of data than indirect communications.

In other implementations, communication systems may permit indirect communications between different devices. In some instances, indirect communications may occur over a network, such as a local area network (LAN) or wide area network (WAN), such as the Internet. In some instances, indirect communications may occur over a cellular network, data network, or any type of telecommunications network (e.g., 3G, 4G). In some instances, indirect communications may be unlimited by distance, or may provide a larger distance range than direct communications. Indirect communications may be unlimited or less limited by line of sight or obstructions. In some instances, indirect communications may use one or more relay device to aid in direct communications. Examples of relay devices may include, but are not limited to satellites, routers, towers, relay stations, or any other type of relay device.

The communications occurring over the communication may be wireless communications. In some instances, wired communications may occur for certain components or devices.

Any combination of direct and/or indirect communications may occur between different devices, or sensors on-board devices. In one example, all communications within the communication system may be direct communications. In another example, all communications within the communication system may be indirect communications. Any of the communication links described and/or illustrated may direct communication links or indirect communication links. In some implementations, switching between direct and indirect communications may occur. For example, communication between a vehicle and a remote controller may be direct communication, indirect communication, or switching between different communication modes may occur. In another example, communication between a vehicle and a display device may be direct communication, indirect communication, or switching between different communication modes may occur. Communication between a sensing shell of a vehicle and a display device may be direct communication, indirect communication, or switching between different communication modes may occur. Communication between any sensor on-board the vehicle and a display device may be direct communication, indirect communication, or switching between different communication modes may occur. Communication between a camera on-board the vehicle and a display device may be direct communication, indirect communication, or switching between different communication modes may occur. Communication between an external camera and a display device may be direct communication, indirect communication, or switching between different communication modes may occur. Communication between any of the devices described (e.g., vehicle, sensing shell of vehicle, sensor on-board vehicle, camera on-board vehicle, external camera, remote sensor, display device) and an intermediary device (e.g., central server, computer, tablet, smartphone, or any other device having a processor and memory) may be direct communication, indirect communication, or switching between different communication modes may occur.

Any communications may be two-way communications. For example, a vehicle may send data to a remote controller and may receive data from the remote controller. Two-way communications may occur simultaneously along a single channel or multiple channels. Two-way communications may occur using time-division multiplexing. In another example, communications may be one-way communications. For example, a vehicle or intermediary device may send data to a display device and not receive data back from the display device.

A display device may be remote from a source device (e.g., vehicle, components such as cameras/sensors of the vehicle, and/or external camera/sensor). In some instances, a display device and a source device may be within the same room or facility. Alternatively, they may not be within the same room or facility. A display device and a source device may or may not be within a viewable distance from one another. One or more obstructions, walls, geographic features may or may not be provided between the source device and a display device. The display device and source device may or may not be within the same room, building, site, property, city, state, county, province, or country. The display device and source device may be less than or equal to about 1 m, 3 m, 5 m, 10 m, 15 m, 20 m, 25 m, 30 m, 40 m, 50 m, 60 m, 70 m, 80 m, 90 m, 100 m, 120 m, 150 m, 175 m, 200 m, 250 m, 300 m, 350 m, 400 m, 450 m, 500 m, 600 m, 700 m, 800 m, 900 m, 1000 m, 1200 m, 1500 m, 1750 m, 2000 m, 2500 m, 3 km, 5 km, 10 km, 20 km, 50 km, 100 km, 500 km, or 1000 km away from one another. The display device and source device may be greater than or equal to about 1 m, 3 m, 5 m, 10 m, 15 m, 20 m, 25 m, 30 m, 40 m, 50 m, 60 m, 70 m, 80 m, 90 m, 100 m, 120 m, 150 m, 175 m, 200 m, 250 m, 300 m, 350 m, 400 m, 450 m, 500 m, 600 m, 700 m, 800 m, 900 m, 1000 m, 1200 m, 1500 m, 1750 m, 2000 m, 2500 m, 3 km, 5 km, 10 km, 20 km, or 50 km away from one another. The display device and source device may be capable of communicating at any distance falling within a range defined by two of the distances described herein. A viewer of a display device may or may not be able to see the source device.

Similarly, a remote controller may be remote from a source device (e.g., vehicle, components such as cameras/sensors of the vehicle, and/or external camera/sensor). In some instances, a remote controller and a source device may be within the same room or facility. Alternatively, they may not be within the same room or facility. A remote controller and a source device may or may not be within a viewable distance from one another. One or more obstructions, walls, geographic features may or may not be provided between the source device and a remote controller. The remote controller and source device may or may not be within the same room, building, site, property, city, state, county, province, or country. The remote controller and source device may be less than or equal to about 1 m, 3 m, 5 m, 10 m, 15 m, 20 m, 25 m, 30 m, 40 m, 50 m, 60 m, 70 m, 80 m, 90 m, 100 m, 120 m, 150 m, 175 m, 200 m, 250 m, 300 m, 350 m, 400 m, 450 m, 500 m, 600 m, 700 m, 800 m, 900 m, 1000 m, 1200 m, 1500 m, 1750 m, 2000 m, 2500 m, 3 km, 5 km, 10 km, 20 km, 50 km, 100 km, 500 km, or 1000 km away from one another. The remote controller and source device may be greater than or equal to about 1 m, 3 m, 5 m, 10 m, 15 m, 20 m, 25 m, 30 m, 40 m, 50 m, 60 m, 70 m, 80 m, 90 m, 100 m, 120 m, 150 m, 175 m, 200 m, 250 m, 300 m, 350 m, 400 m, 450 m, 500 m, 600 m, 700 m, 800 m, 900 m, 1000 m, 1200 m, 1500 m, 1750 m, 2000 m, 2500 m, 3 km, 5 km, 10 km, 20 km, or 50 km away from one another. The remote controller and source device may be capable of communicating at any distance falling within a range defined by two of the distances described herein. A user of the remote controller may or may not be able to see the source device.

Although a single vehicle is shown in the illustration, any number of vehicles may communicate with a communication system simultaneously. For example, one or more, two or more, three or more, four or more, five or more, six or more, seven or more, eight or more, ten or more, fifteen or more, twenty or more, thirty or more, or fifty or more vehicles may be simultaneously communicating over a communication system. These may include multiple vehicles that may be participating in a robot game.

Robot Games and Facilities

One or more of the vehicle and/or systems as described herein may be used in a game. The vehicle may be a robot which may be capable of sensing when a projectile hit has occurred. In some instances one or more robots may be provided that may be capable of physically interacting with an environment around it. The robot may be a self-propelled vehicle. In some instances, the robot may be remotely controlled by a user. In other examples, the robot may be controlled by an on-board user. In some instances, the robots may be autonomous and may not require the interaction of a human controller. The robot may interact with the environment in accordance with pre-programmed instructions. Any description herein of a robot may also apply to a stationary object, such as a turret or any other structure.

Similarly, any description herein may also apply to a living being wearing a sensing apparatus.

In some embodiments, a game may include tracking a virtual status of the robot. For example, the virtual status may include keeping track of life points or life level of a robot. A life level may be representative of a virtual "life" or "energy" level. While the robot has a higher life level it may be able to function. In some instances, when the robot has run out of a life level (e.g., when life points are down to zero), the robot may not be able to function. The robot may be deemed to be "dead" for the purposes of the game. While dead, the robot may not interact with its environment or affect the life level of other robots. Similarly, when dead, a live being may not further interact with its environment or shoot projectiles. When dead, any action by a live being may not further affect an outcome of a game.

A robot's performance may or may not be affected by its life level. In some instances, a binary performance condition may be provided. While the robot has any "life" points, the robot may be able to function normally. When robot has "zero" or less life points left (e.g., negative life points), the robot may not be able to function. In other instances, a gradient may be provided. For example, as the robot's life points decrease, the robot may be less responsive or may not function as effectively. This may be indicative of a robot's weakening state as the number of life points decreases. In some instances, a proportional relationship may be provided between the number of life points and the responsiveness of the robot. In other instances, as the life points near zero, the robot may become very responsive, similar to a last bout of energy. Factors of responsiveness may include motions of the vehicle in response to commands by the user, aiming of the shooting apparatus in response to the user, quickness in shooting out projectiles or the frequency at which projectiles can be shot, clarity of images provided by a camera and/or aiming of the camera.

A robot's life level may be decreased when it is hit by a projectile. A virtual status of the robot may change when it is hit by a projectile. For example, virtual damage may be caused by the projectile hit. This may or may not be independent of any physical damage that may occur on the vehicle. Virtual damage may occur without physically affecting or altering the vehicle. Virtual damage may occur without creating any permanent damage on the vehicle. For example, the virtual damage may refer to the subtraction of life points from the existing number of life points when the hit occurs.

In some embodiments, the same amount of life points or degree of life may be detracted from the robot every time it is hit by a projectile. This may occur regardless of the amount of acceleration or location on the robot where the hit occurs. In other instances, the amount of acceleration and/or location where the robot is hit may affect the amount of virtual damage (e.g., deduction of life points) that may occur. For instance, if the robot is hit harder by a projectile (e.g., a greater acceleration is detected), a greater degree of virtual damage may be sustained. When greater damage is sustained, a larger number of life points may be subtracted. In another example, certain regions of the vehicle may be designated as increased "sensitive" regions, where a greater degree of virtual damage may occur than other regions of the vehicle. For example, certain portions of the surface of the vehicle may receive different deduction for virtual life points than other regions when a hit occurs.

A vehicle may be able to sustain several hits before it is "dead." In one example, a vehicle may start off with a pre-set number of life points (e.g., 100 points, or any other number). Each detected hit by a projectile may result in a deduction of points (e.g., 10 points). This may permit a vehicle to be hit 10 times before being dead. In some instances, the number of point deductions may vary depending on the characteristics of the hit (e.g., degree of acceleration, location of the hit). For example, a 15 point deduction may be provided for a "severe" hit, a 10 point deduction may be provided for a "moderate" hit, and a 5 point deduction may be made for a "light" hit. Any number of points may be deducted for different types of hits, and any variation in different damage degrees may be provided.

Optionally, a projectile hit may add life points or degree of life to a robot. In some instances, a projectile may be deemed a "healing" projectile which may add life points to a robot. In some instances, a designated source (e.g., other vehicle, or structure) may provide projectiles which may heal a robot. For example, in a team robot game, being hit by a member of the opposite team may cause "harm" while being hit by a member of the vehicle's own team may cause "healing." Optionally, a type of shooting apparatus and/or projectile may be designated as healing projectiles. For instance, a regular pellet made from a first material may "harm" the robot, while special pellet made from a second material may "heal" the robot. In other instances, certain time periods may be provided, where hits may heal the robot. In other options, certain locations may be provided, where hits may heal the robot. The amount of life points added may or may not depend on the severity or strength of the hit.

In some embodiments, each robot participating in a game may start off with the same number of maximum life points. Alternatively, different robots participating in the game may start off with different numbers of maximum life points. The robots may start the game with their life points being "full" (having the maximum number of life points)—e.g., 100/100 life points, or 250/250 life points. In other instances, robots may start off the game with their life points only being partially full (having less than the maximum number of life points)—e.g., 70/100 life points, or 100/200 points. In some instances, during a game, life points may only be subtracted. Alternatively, in some games, life points may be added during the course of the game. The robot's life points out of the maximum life points may be subtracted or added in response to one or more detected events. The detected events may include physical interactions of the robots (e.g., being hit by a projectile, being in a collision, being at a certain location, being within a certain timeframe, picking up objects, running over objects, passing through objects, moving objects, etc.).

During a course of the game, a robot's maximum life points may be fixed. For example, if a robot's maximum life points during a game is 100, this may not vary during a course of the game. In another embodiment, a robot's maximum life points may be changed during a game. The robot's maximum life points may be reduced (e.g., temporarily or permanently during the game) or may be increased (e.g., temporarily or permanently during the game). Such reductions or increases may occur in response to events (e.g., robot being hit by a particular type of projectile or a projectile from a certain source, a robot entering a particular location, certain periods of time, certain other physical interactions of the robot). For example, if a robot is detected to have entered a "bad zone", the robot's maximum life points may be decreased (e.g., decreased by 10 points). This decrease may be temporary for a predetermined period of time (e.g., the robot's maximum life points may be decreased from 100 to 90 for 10 minutes), or may be reduced for the remainder of the game. In another example, if a robot picks up a "life increasing" object, the robot's maximum life points may be increased (e.g., by 5 points). The increase may be temporary for a predetermined period of time (e.g., the robot's maximum life points may be increased from 100 to 105 for 20 minutes), or may be increased for the remainder of the game. In some instances, maximum life point reductions and increases may be additive. For example, a robot may start off with 100 max points, may be increased to 110 life points when the robot passes through a "good zone", and later may be decreased to 105 when the robot runs over a "bad object" and so forth. In some instances, after a robot has passed a predetermined threshold of time since the start of the game, the robot maximum life points may be increased or decreased. In one example, if a robot is still active 15 minutes into the game, it may be rewarded for having survived by having its maximum life increased. In another example, if a robot it still active 20 minutes into the game, it may be desirable to speed up the outcome of the game by reducing maximum life points of remaining robots.

Optionally, one or more robots may accumulate experience points during the course of a game. In some instances, experience points may only be added during a course of a game. Alternatively, experience points may be subtracted. A robot may receive experience points by performing one or more tasks or by certain circumstances. For example, when a robot is detected to have successfully shot another robot, the robot may receive an increase in experience points. When a robot is detected to have shot a particular target or object (which may or may not be another robot), the robot may receive experience points. The number of experience points may remain the same regardless of the type of object shot, size of the object was shot, portion of the object shot, distance at which the object was shot, when the shot occurred, whether the object was moving, etc. In other instances, such factors may make a difference in the number of experience points received. For example, if the object shot by the robot is further away, it may be deemed more difficult, and the shooting robot may be rewarded with more experience points. In another example, if the object shot by the robot is a movable object (such as another robot), it may be deemed more difficult, and the shooting robot may be rewarded with more experience points. If the shooting robot hits a particular part of another robot (e.g., a "weak point" or "vulnerable point" of the robot), the robot may be rewarded with more experience points. In some instances, if a robot hits multiple objects within a short predetermined period times (e.g., shoot 3 vehicles within 1 minute), the robot may receive additional experience points as a bonus. In another if a robot makes multiple hits without missing (e.g., each shot by the robot hits a target), the robot may receive additional experience points as a bonus. In some instances, the number of experience points awarded to the shooting robot may correlate to the amount of virtual damage that was sustained by the robot that was shot.

A robot may accumulate experience points doing other tasks. For example, a robot may accumulate experience points by going to particular locations within its environment. A robot may accumulate experience points by picking up certain objects. A robot may accumulate experience points by running over certain objects. A robot may accumulate experience points by moving certain objects. A robot may accumulate experience points by passing through certain objects. A robot may accumulate experience points by avoiding collisions for a predetermined period of time. A robot may accumulate experience points by avoiding being shot for a predetermined period of time. Additional tasks may be performed by robots to earn experience points.

In some embodiments, a robot may perform a task that may result in an increase of essential supplies. For example, the task may be going to a location in an environment. For example, the robot may go to a station that is designated for providing essential supplies. The station may be any location and may or may not have any physical indicator that the station is designated for providing essential supplies. In other examples, tasks may include shooting certain target (e.g., stationary or moving), shooting a certain number of adversary robots, moving in a particular sequence, picking up an item, running over an item, passing through an item or structure, or any other action.

Essential supplies may include any item, virtual or physical, that may aid in furthering a goal of the robot. Virtual supplies need not include physical objects. Virtual supplies may still affect an outcome of a robot game and may provide a beneficial effect to a robot. Examples of virtual items may include increased number of life points (e.g., "healing"), increased number of maximum life points (e.g., "building up robustness"), increased number of experience points, increased number of experience points for certain subsequent activities (e.g., future "bonus points"), increasing speed or responsiveness of robot, increasing speed or responsiveness of aiming a shooting apparatus, increasing a number of projectiles that may be fired by the robot, increasing the speed at which the bullets may be fired, increasing an amount of strategic information that may be accessed by the robot or viewed by a user of the robot (e.g., viewing a map of the location of adversaries, viewing vulnerable or sensitive spots of adversaries, viewing where additional essential supplies may be located), reducing the amount of damage that may be taken by the robot when shot (e.g., "force field" or "damage reduction").

Physical essential supplies may include tangible objects. Physical essential supplies may affect an outcome of a robot game and may provide a beneficial effect to a robot. Examples of physical essential supplies may include projectiles that may be physically loaded onto the robot (e.g., if a robot runs out of bullets it may need to re-supply, or loading in new types of projectiles that may cause increased damage), additional power sources that may added or swapped out for drained power sources, fuel, new propulsion unit components (e.g., new tires when the tires of the robot get worn), replacement parts for damaged components, replacement cameras or other sensors for damaged cameras or other sensors, upgrades of certain items (e.g., adding a new shooting apparatus that may have greater distance, accuracy, or responsiveness), a protective covering that may reduce the acceleration caused by projectile hits (e.g., a physical type of force field or damage reduction).

The station may be at a location which may only have a virtual presence, or may have an actual physical presence. A live being may be provided to aid in providing physical essential supplies. Alternatively, physical essential supplies may be provided autonomously without requiring any human presence or intervention.

In some embodiments, a robot may perform a task that may result in a decrease of essential supplies. For example, the task may be going to a location in an environment. For example, the robot may go to a station that may be a "trap" that may reduce essential supplies. The trap may be any location and may or may not have any physical indicator that the trap is designated for reducing essential supplies. In other examples, tasks may include shooting certain target (e.g., stationary or moving), shooting below a certain number of adversary robots, moving in a particular sequence, picking up an item, running over an item, passing through an item or structure, or any other action. When a robot falls into a "trap", the robot may lose virtual essential supplies and/or physical essential supplies. In one example, robot may be paralyzed for a limited period of time or for the remainder of a game. In another example, a robot may lose the ability to aim the robot's shooting apparatus.

In one example, projectile supplies may be an aspect of a robot game. In some embodiments, robots may be pre-loaded with projectiles at a beginning of the game. The robots may be capable of shooting the projectiles. In some instances, no limits may be provided to the shooting of the projectiles. As long as the robot has physical projectiles available on-board, the robot may be capable of shooting. In some instances, limits may be provided on the number of projectiles that may be shot and/or the rate at which they may be shot. For example, even if more projectiles are provided on-board the robot, the robot may only be able of shooting a limited number of projectiles. In another example, even if more projectiles are provided on-board the robot, the robot may only be able to shoot a limited number of projectiles for given period of time. For example, a robot may require a predetermined amount of time between shots (e.g., 0.1 seconds, 0.5 seconds, 1 second, 2 seconds, 3 seconds, 5 seconds, 10 seconds, 15 seconds, 20 seconds, 30 seconds, 50 seconds). In another example a robot may fire the shots with as little time between them as possible but only be able to shoot a certain amount of shots for a period of time (e.g., only be allowed to shoot 15 shots for every 30 seconds, only be allowed to shoot 20 shots for every minute), or for the duration or stage of the game (e.g., only be allowed to shoot 100 shots for the duration of the game, or only be allowed to shoot 50 shots during a first stage of a game and 50 shots during a second stage of the game). Such limits may be provided in accordance with rules of the game and may vary from game to game. Such limits may not be provided by physical restrictions, but may be part of game rules.

In some instances, "shooting boosts" or "shooting penalties" may be provided to a robot. A shooting boost may provide a beneficial effect on the shooting ability of the robot. For example, the shooting boost may permit the robot to fire projectiles without limit for a period of time or for the remainder of the game. Another example of a shooting boost may be an increase in the number of projectiles that may be shot, or an increase in the rate at which the projectiles may be shot. Another example of a shooting boost may be the ability to load more physical projectiles on the robot. Another example of a shooting boost may be an increase in responsiveness of the shooting apparatus (e.g., quicker aiming, quicker response of firing a projectile when a command is issued to fire, increased distance/range, increased accuracy). Other examples of shooting boosts may include an upgrade in the type of projectile used and/or the shooting apparatus used.

A shooting penalty may provide a detrimental effect on the shooting ability of the robot. For example, the shooting penalty may further limit the robot's ability to fire projectiles for a period of time or for the remainder of the game. Another example of a shooting penalty may be a decrease in the number of projectiles that may be shot, or a decrease in the rate at which the projectiles may be shot. Another example of a shooting penalty may be a decrease in responsiveness of the shooting apparatus (e.g., slower aiming, longer response of firing a projectile when a command is issued to fire, decreased distance/range, decreased accuracy). Other examples of shooting penalties may include a downgrade in the type of projectile used and/or the shooting apparatus used.

A shooting boost or shooting penalty may occur when a robot performs a certain action or task. For example, a shooting boost may occur when a robot goes to a station for providing essential supplies. A shooting boost may occur when a robot shoots a certain number of targets (e.g., stationary or moving). In another example, a shooting penalty may occur when a robot reaches a location of a trap. In another example, a shooting penalty may occur when a robot's life points fall beneath a predetermined level.

Different types of games may occur. These may include individual player games, team games, competitive games, cooperative games, direct combat games, or games that incorporate autonomous vehicles (e.g., vehicles not operated by another player). Various games may pit one robot vs another robot, one robot vs many robots, many robots vs many robots, one robot vs autonomous robot, many robots vs. many autonomous robots, or autonomous robot vs autonomous robot, many autonomous robots vs many autonomous robots, or any combinations thereof. Alternatively, a cooperative game may be established where robots may try to perform different tasks. The robots may individually perform difference tasks, or perform different tasks in teams. In some variations of games, robot vs. human aspects may be provided. For example, a human or other live being may wear a sensing shell and interact in a real-life environment with robots.

Different games may have different types of goals. In some instances, an outcome of the game (e.g., winner of a game) may be determined by the number of life points for one or more robots. In another instance, an outcome of the game may be determined by a number of experience points by one or more robots. In another instance, an outcome of the game may be determined by any other action of a robot (e.g., capturing an object, reaching a certain location, performing one or more tasks).

Game Example 1

One example of a robot game may be a melee-style robot shooting game. A plurality of robots may be provided within an environment. Examples of possible environments are described in greater detail elsewhere herein. The plurality of robots may be operated by users. The users may use one or more remote controller to control operation of the robots. Each robot may have a shooting apparatus and/or sensing shell.

A goal of the game may be to shoot the other robots and be the last robot that remains alive. Every shot decrease the life points of the robot that is hit. When a robot's life points reaches zero or below, that robot may be 'dead' and may no longer be a candidate to win the game. The robot that survives the longest, when all the other robots are 'dead' may be deemed to be the winner of the game.

In some variations of the game, when a robot successfully shoots another robot, no change may be made to the life points of the robot. In another variation of the game, when a robot successfully shoots another robot, some life points may be added to the shooting robot.

In some variations of the game, the robot that remains standing with positive life points may be deemed the winner of the game. In other variations, one or more robots may accumulate experience points. For example, the robots may accumulate experience points for successful hits to other robots. The robot that remains standing at the end of the game may receive a bonus number of experience points. Having one last robot remaining alive may end the game, but the winner of the game may be the robot that has accumulated the most experience points. Any description elsewhere herein of how life points may be added or subtracted, or experience points may be added or subtracted may apply.

In some embodiments, every robot participating in the game may be controlled by a user. In other variations, some robots may be provided that may be autonomous (e.g., not controlled by a user). The autonomous robots may participate in response to a command generated by a processor on-board or off-board the autonomous robot. Pre-programmed conditions may be provided in the robot. Projectile hits may be detected by the autonomous robots. The autonomous robots may or may not have shooting apparatuses. In some instances, it may be possible for an autonomous robot to win the game. Alternatively, a winner of a game may be a robot controlled by a human player of the game.

In an additional variation of the game, all participating robots may be autonomous. They may be pre-programmed. An autonomous robot may be deemed a winner of the competition. The winner of the game may be an individual that programmed the autonomous robot.

Game Example 2

One example of a robot game may be a tournament-style robot shooting game. A tournament-style robot shooting game may have one or more characteristics similar to a melee-style robot game as previously described. A plurality of robots may be provided within an environment. Examples of possible environments are described in greater detail elsewhere herein. The plurality of robots may be operated by users, or one or more robots may be autonomous. The users may use one or more remote controller to control operation of the robots. Each robot may have a shooting apparatus and/or sensing shell.

In a tournament style-game, a limited number of robots may face off against one another at a time. For example, two robots may face off simultaneously. Alternatively, three, four, five, six, seven, eight, nine, or ten robots may face on in a round. The winner of the round may advance to future rounds. In some instances, a single robot may advance to the next round. Alternatively, any other limited number, such as two, three, or four robots may advance to the next round. A winner of the tournament may be the robot that wins the final round of the competition. The robot may win by "surviving" the longest, or by having the most experience points.

Game Example 3

Another example of a robot game may be a team-style robot shooting game. A team-style robot shooting game may have one or more characteristics similar to a melee-style or tournament-style robot game as previously described. A plurality of robots may be provided within an environment. Examples of possible environments are described in greater detail elsewhere herein. The plurality of robots may be operated by users, or one or more robots may be autonomous. The users may use one or more remote controller to control operation of the robots. Each robot may have a shooting apparatus and/or sensing shell.

Multiple robots may belong to a team. Multiple teams of robots may be provided. For example, one or more, two or more, three or more, four or more, five or more, six or more, seven or more, eight or more, nine or more, ten or more, twelve or more, fifteen or more, twenty or more, or thirty or more robots may belong to a team. A game may start with any number of teams. For example, two or more, three or more, four or more, six or more, eight or more, ten or more, twelve or more, sixteen or more, twenty or more, thirty or more, forty or more, or fifty or more teams may be provided. The multiple teams may be provided all together in a melee-style team game. Alternatively, a tournament-style team game may be provided where two, three, four, or some other limited number of teams face off against each other at a time.

In some examples, a team may be deemed to have won a round when the last surviving robot or robots belongs to that team. A team may be deemed to have won after only one or more robots belonging to a single team remains, and the team has accumulated the most experience points together.

In some variations each of the participating teams may have each robot controlled by a user. In other instances, within a team, there may be one or more robots controlled by a user and one or more autonomous robots. In other instances, all robots within a team may be autonomous.

Game Example 4

Some robot games may be an individual melee-style, individual tournament-style, or team-style capture-the-flag type game. A capture-the-flag style game may have one or more characteristics similar to a shooting game as previously described. A plurality of robots may be provided within an environment. Examples of possible environments are described in greater detail elsewhere herein. The plurality of robots may be operated by users, or one or more robots may be autonomous. The users may use one or more remote controller to control operation of the robots. Each robot may have a shooting apparatus and/or sensing shell.

In some instances, rather than shooting one another, a goal of a game may be to reach a certain location or pick up a certain object. It may or may not be required to move the object to another location. Shooting may be part of the game to prevent the other team from reaching the goal. For example, once a robot is "dead" it may no longer be able to function.

For example, one or more "flag" may be provided per team. The "flag" may be any object, or may even be a location. A team may have one or more robots. In some instances, a team of an individual robot may be provided. This may permit individualized competition. The individual robot may be controlled by a user or may be autonomous. Alternatively, a team of multiple robots may be provided. This may permit traditional team-base competition. The multiple robots may be controlled by users, may be autonomous, or any combination thereof.

In one variation of the game, a goal of the game may be for a member of a first team to reach a flag of a second team. Any number of teams may be simultaneously participating. In some instances, the flag may be in a territory controlled by a second team. The territory may be any designated geo-fence. In other instances, a territory of the second team may be a region where team members of the second team may be located at the beginning of the game.

A flag may be a location or physical object. When a member of the first team reaches the flag of the second team, the first team may be deemed to have won. The member of the first team may have to reach the flag without being shot to "death" (e.g., may need to have remaining life points). In some instances, members of the second team may be located near the flag or en route to the flag to defend the flag. Members of the second team may try to shoot members of the first team that are approaching the flag. Simultaneously the reverse may be occurring. The first team may have its own flag that it needs to defend. Members of the second team may be attempting to reach the flag of the first team, while members of the first team may optionally be trying to defend their flag. In some implementations, the team that reaches the other team's flag first may be automatically deemed the winner. In other instances, the team that reaches the other team's flag first may receive additional experience points as a bonus and the game may end. The team with the most experience points at the end of the game may be deemed the winner.

In some variations, reaching the flag may be sufficient to end the game. In other instances, the robot may need to further "move" the flag. For example, the robot may need to move the flag to another location, or outside the territory of the team to which the flag belongs. In some instances, the flag may be a physical object that the robot may move (e.g., a traditional flag, fabric, ribbon, rope, ball, cube, weight, ring, or any other type of object). In another example, the flag may be a virtual object. For example, a robot may reach a location and be deemed to have "picked up" the flag. When the robot moves from that location, the robot may be deemed to be "carrying" the flag. If a robot is shot to "death" before it finishes carrying the flag to its target location, the flag may be deemed to remain with the "dead" robot. A teammate robot may reach the location of the "dead" robot and be deemed to have "picked up" the flag, and "carry" it as it moves. When the flag is moved to a target location or outside an originating territory, the game may be deemed to have ended. In some implementations, the team that successfully moves the other team's flag to a desired location first may be automatically deemed to be the winner. In other instances, the team that moves the other team's flag to a desired location first may receive additional experience points as a bonus and the game may end. The team with the most experience points at the end of the game may be deemed the winner. Any number of teams may be simultaneously participating and attempting to reach and/or move the other team's flag, and/or defend their own flag.

In some instances, when more than two teams are simultaneously participating, the game may end when a flag is reached or moved as described. In other instances, the game may end when multiple flags have been reached and/or moved. A single winner may be declared. Alternatively, places may be designated (e.g., first place, second place, third place, etc.). For example, the first team to reach or successfully move another team's flag may receive first place. The second team may reach or successfully move another team's flag may receive second place, and so forth. In another example, the first place team may be the team with the most experience points when the game ends, the second place team may be the team with the next most experience points when the game ends, etc.

Game Example 5

Another example of a robot game may be a robot racing game. For example, it may be desirable for a robot to travel a certain distance. It may be desirable for a robot to travel from a first point to a second point. The path between the first point and the second point may or may not be defined. For example, the path may be defined when the robots that are racing against one another need to travel along a fixed path. The path may not be defined when the robots that are racing against one another may travel along any path to get to their destination (e.g., need not travel together).

In some instances, the robots may have shooting apparatuses. They may be able to shoot one another while racing. The number of life points may be decreased for robots that are shot, as described elsewhere herein. A robot that is considered "dead" may not be able to move further or participate in the race further, or may be paralyzed for a predetermined period of time. A robot may or may not be slowed down, depending on whether they were shot, or the number of life points they have left. If a robot successfully shoots another robot, it may or may not receive a boost in its life points, experience points, and/or speed.

In some variations of the game, the only shooting interaction may occur between the racing robots. In other variations of the game, shooting interactions may occur with other objects. For example, on the way to the destination, one or more structures may be provided, that may shoot projectiles at the racing robots. In other instances, moving objects, such as moving robots may shoot projectiles at the racing robots. Optionally, one or more shooting targets may be provided on the way to the destination. The racing robots may shoot at the targets. Successfully shooting the targets may result in the robots gaining experience points, life points, and/or speed.

Depending on the environment, the racing game may include one or more obstacles. The racing game may require the robots to navigate an obstacle course. The racing game may or may not require that the robots perform one or more task on the way to their destination. Robots may receive additional experience points, life points, or speed for tasks completed.

A winner of the racing game may be the first robot to reach the destination. In some instances, additional places may be provided based on the order that the robots reach their destination. In some instances, racing robots may receive bonus experience points depending on their order of finishing the race. The winner at the end of the race may be the robot with the most experience points.

The racing game may be an individual game or a team game. In some instances, aggregate performance of members of a team may be compared to aggregate performance of members of other teams. For example, the team with the most experience points overall may win.

The racing game may occur all within one round, or may occur over multiple rounds. In some instances, tournament-style play may occur.

Game Example 6

Games may be provided that may have any other goals. For example, a game may follow a storyline. A goal of a game may be to find an object, hit certain targets, or play a sports-style game. In some instances, different tasks may be provided for the robots. Different rounds may have different tasks. In some instances certain robots may be designated for different tasks within a team (e.g., similar to the Olympics). For example, a robot on a team may be designated to participate in a long-distance shooting game, another robot on a team may be designated to participate in a racing game, another robot on a team may be designated to participate in a combat shooting game (e.g., robots shooting each other), another robot on a team may be designated to participate on in a combat bumper game (e.g., robots colliding with one another), etc.

In some instances, the games may be cooperative. The various robots may face off against a "zombie robot" army, or may face off against a single large robot. Other permutations of games and/or goals may be provided.

Any descriptions herein of robot games, which may include remotely controlled robots, and/or autonomous robots may also be applied to games where human interaction may occur. For example, a human participant may wear a sensing shell. The sensing shell may have any wearable configuration as described elsewhere herein. The human participant may be in the same environment as the robots. For example, during a robot shooting game, a human participant may be shot by the robot and/or may shoot at robots. In a capture-the-flag style game, a human participant may be a team member and may attempt to capture a flag and/or defend a flag. The human participant may shoot projectiles using a weapon (e.g., shooting apparatus), and/or may be shot by projectiles (e.g., from other humans or from robots). In a racing game, a human may shoot at racing robots, or be shot by racing robots. Humans themselves may or may not be racing. In some instances, the humans may be racing while robots or other shooting structures may shoot at them, or they may shoot at targets. In some instances, any descriptions of robot games may apply to all-human participants. The human participants may wearing sensing shells as described herein and partake in any of the types of games described herein.

Such games are provided by way of example only and are not limiting. Additional games may be performed using the robots. The additional games may or may not use features from the game examples, alone or in combination. Any additional games may or may not include shooting by robots. Any additional games may or may not include robots detecting hits from projectiles. Any additional games may detect hits using one or more sensing shell as described herein.

A game may occur within an environment. In some instances, the environment may be a controlled environment. The game may occur within an arena.

Figure 14A:
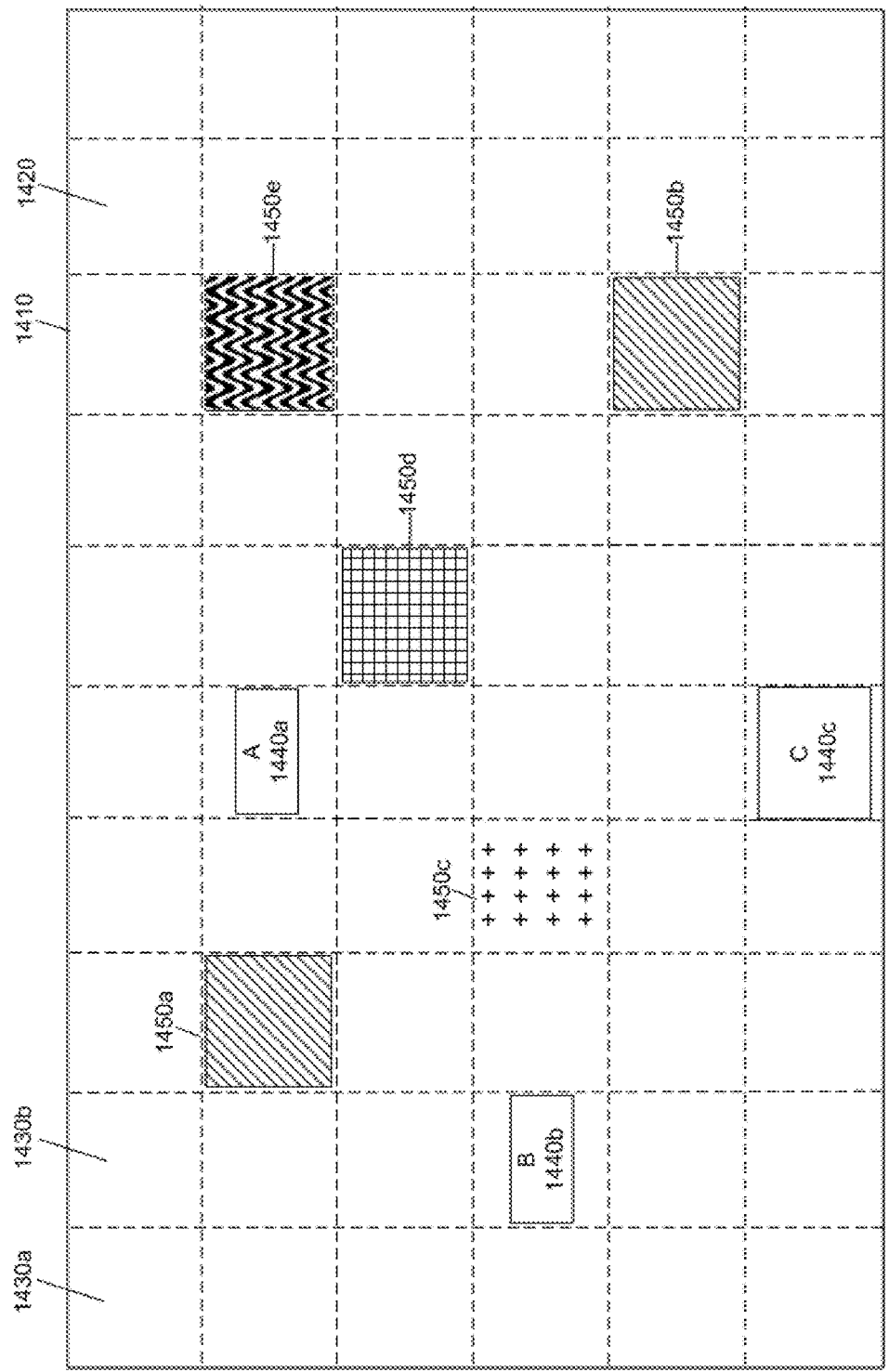
FIG. 14A shows a top view of an arena for robots with sensing apparatuses in accordance with embodiments of the invention.

FIG. 14A shows a top view of an arena for robots with sensing apparatuses in accordance with embodiments of the invention. An arena may have a boundary 1410. The arena may provide a type of environment 1420 that a robot may traverse. Optionally, the arena may be broken into virtual regions 1430a, 1430b. One or more robots 1440a, 1440b, 1440c may be within the arena. One or more environmental features 1450a-e may be provided in the arena.

An arena boundary 1410 may or may not include a physical boundary. In some instances, the boundary may be a geo-fence, which may be a virtual perimeter for a real-world geographic area. Alternatively, the boundary may be a physical boundary. For example, the boundary may be provided by one or more wall (e.g., opaque, transparent, and/or clear), one or more physical fence, one or more moat or indentation, or any form of barrier. The boundary may be capable of keeping objects within the arena. The boundaries may prevent projectiles within the arena from exiting the arena. The boundary may optionally be bullet-proof or incapable of being broken by any type of projectile fired within the arena. The boundary may be incapable of being broken by any type of robot ramming the barrier. The boundary may prevent robots from exiting the area while a game is in progress. In some instances, a boundary may have a door or other feature that may be opened when the game is not in progress. This may permit the robots to enter and/or exit the arena. This may permit human beings to enter and/or exit the arena.

In some instances, the boundary may form a perimeter around the arena. The boundary may or may not be interrupted. The boundary may have a specified height. In some instances, the boundary may be higher than a human height. The boundary may be less than or equal to −10 m (e.g., moat or crevasse), −5 m, −1 m, 0.1 m, 0.5 m, 0.7 m, 1 m, 1.2 m, 1.5 m, 1.7 m, 2 m, 2.2 m, 2.5 m, 2.7 m, 3 m, 3.2 m, 3.5 m, 4 m, 5 m, or any other height. Alternatively, the boundary may be greater than or equal to any of the heights described herein. The boundary may fall between a range of heights defined between any two of the heights described herein.

Optionally a boundary may cover a top of an arena. A boundary may prevent a projectile or object from flying upwards and out. For example, the boundary may include a ceiling. Alternatively, a boundary need not be provided at the top of the arena.

The boundary 1410 may define an area 1420 within the arena. The area within an arena may have any size or dimension. For example, the area within the arena may be less than or equal to about 0.1 $m^2$, 0.5 $m^2$, 1 $m^2$, 2 $m^2$, 3 $m^2$, 5 $m^2$, 10 $m^2$, 15 $m^2$, 20 $m^2$, 25 $m^2$, 30 $m^2$, 40 $m^2$, 50 $m^2$, 70 $m^2$, 100 $m^2$, 125 $m^2$, 150 $m^2$, 175 $m^2$, 200 $m^2$, 225 $m^2$, 250 $m^2$, 275 $m^2$, 300 $m^2$, 350 $m^2$, 400 $m^2$, 450 $m^2$, 500 $m^2$, 600 $m^2$, 700 $m^2$, 800 $m^2$, 900 $m^2$, 1,000 $m^2$, 1,200 $m^2$, 1,500 $m^2$, 2,000 $m^2$, 2,500 $m^2$, 3,000 $m^2$, 3,500 $m^2$, 4,000 $m^2$, 5,000 $m^2$, 7,000 $m^2$, 10,000 $m^2$, 15,000 $m^2$, 20,000 $m^2$, 30,000 $m^2$, 40,000 $m^2$, 50,000 $m^2$, 70,000 $m^2$, 100,000 $m^2$, 200,000 $m^2$, 500,000 $m^2$, 1 $km^2$, 1.1 $km^2$, 1.5 $km^2$, 2 $km^2$, 3 $km^2$, 4 $km^2$, 5 $km^2$, 10 $km^2$, 15 $km^2$, 20 $km^2$, 30 $km^2$, 50 $km^2$, 100 $km^2$, or any other size. The area within the arena may be greater or equal to about any of the measurements described herein. The area within the arena may fall within a range of areas defined between any two of the areas described herein. The area within the arena may be entirely viewable from outside the arena. Alternatively, the area within the arena may not be entirely viewable from outside the arena.

The area within the arena may have any type of environment 1420. For example, the type of environment may be ground-based. A ground-based environment may include flat ground, or may include ground with slopes, hills, ravines, holes, ramps, crevasses, or any other features. Ground-based environments may include different types of terrain. For example, different types of soils and/or consistencies of soil, mud, sand, grass, concrete, plastic, stones/stone, gravel, mulch, other plants, glass, foam, sticky materials, and so forth, may be provided. Robots may be capable of moving over different types of terrains. However, responsiveness and/or speed of robots may be affected by the different types of terrain. In some instances, robots may get stuck in certain types of terrains. Robots may move on the surface of ground-based environments. Alternatively, some robots may be capable of digging through ground-based environments and/or moving underground.

In other examples, the environment may be water-based. Water-based environments may include one or more liquids. In some instances, liquids of different consistencies or characteristics may be provided. The liquids may be segregated from one another or may be mixed together. Liquids may be segregated by one or more barriers. Robots may be capable of moving on the surface of liquids. Alternatively, robots may be capable of moving through the liquids (e.g., underwater). In some instances, liquids of different densities may be provided and robots may be capable of on moving on the surfaces of a specific density of liquid (e.g., for example a robot may be capable of moving on a surface of a first density of liquid, but not a second density of liquid and may sink).

The area within the arena may be a mix of ground-based and water-based environment. For example, the environment may be substantially water but may have one or more islands or ground-based features. In another example, the environment may be substantially land and may include features such as ponds, rivers, quick-sand, or other water-based features. In some instances, robots may only be able to traverse a particular type of environment (e.g., ground based robot may not be able to traverse a water feature, or a water-based robot may not be able to traverse a ground-based feature). Alternatively, robots may be able to traverse multiple types of environments (e.g., a robot can traverse both ground and water-based features).

The area within an environment may include air-based features. For example, an open space may be provided. The air-based features may be mixed with land-based features (e.g., structures, trees, mountains, hills, underlying ground) and/or water-based features (e.g., waterfalls, rivers, ponds, etc.). A robot may be capable traversing an environment through the air. For example, the robot may be an aerial vehicle. The robot may be an unmanned aerial vehicle. The robot may have a characteristic of an unmanned aerial vehicle or any other type of movable object as described elsewhere herein.

Optionally, the arena may be broken into virtual regions 1430a, 1430b. Any number of virtual regions may be provided. For example, a single virtual region, two virtual regions, three virtual regions, four virtual regions, five virtual regions, six virtual regions, seven virtual regions, eight virtual regions or more may be provided. In some instances, one or more, two or more, three or more, four or more, five or more, ten or more, fifteen or more, twenty or more, thirty or more, forty or more, fifty or more, sixty or more, seventy or more, 100 or more, 150 or more, 200 or more, 300 or more, 400 or more, 500 or more virtual regions may be provided. The virtual regions may have any size or shape. Each virtual region may have the same size or shape. Alternatively, different virtual regions may have different sizes and/or shapes. The virtual regions may be located adjacent to one another. Virtual regions may or may not overlap. In some instances, virtual regions may be provided as one or more row, one or more columns and/or a grid. The virtual regions may be circular in shape, rectangular in shape, triangular in shape, pentagonal in shape, hexagonal in shape, octagonal in shape, or irregular in shape.

Virtual regions may be geo-fenced areas within the arena. In some instances, no physical boundaries or indications are provided of the virtual areas. Alternatively, physical indicators, such as visual indicators may be provided to delineate virtual regions.

Virtual regions may aid in breaking up the area within the arena. In some instances, virtual regions may be used to specify a location of an object within an arena. For example, a first robot 1440a may be in a different virtual region than a second robot 1440b. In some instances, only a single robot may fit into a virtual region. Alternatively, multiple robots may fit within a virtual region. In one application, a virtual region may delineate a territory of a team of robots during a capture-the-flag type game.

A location of a robot relative to a virtual region may be detected. The virtual region within which the robot falls may be detected. In some instances, the location of the robot may be detected with aid of one or more sensor on-board the robot or off-board the robot. For example, a robot may have a GPS receiver, which may communicate with a GPS satellite. The location of the robot within the arena may be determined from the GPS receiver. In another example, one or more cameras or vision sensors may be provided in the arena to detect objects within the arena. The images captured may be analyzed to detect the location of the robots within the arena. In another example, IR sensors may be located throughout the arena. The IR sensors may interact with a signal emitted by the robots and used to detect the location of the robot. In another example, a robot may have an ultrasonic sensor on-board the robot. The ultrasonic sensor may detect distances between the robot and one or more features, and this may be used to calculate the position of the robot within the arena. The location of the robot in relation to one or more virtual region may be determined based on the location of the robot within the arena, and the location of the virtual regions within the arena.

Alternatively, no virtual locations need to be provided within the arena. The location of the robots may be determined within the arena without any reference or creation of virtual regions.

One or more robots 1440a, 1440b, 1440c may be provided within the arena. Each of the robots may be participating in a robot game. In other instances, one or more of the robots may not be participating on the game but may interact with robots that are participating in the game. One or more robots participating in the game may be controlled by one or more user. One or more robots participating in the game may be autonomous. Alternatively, one or more robots not participating in the game but interacting with the robots that are participating in the game may be autonomous. Any description herein of robots participating in the may also be applied to human participating in the game. The humans may have a wearable object that may have one or more components of a robot. For example, the robots may wear a sensing shell capable of detecting a hit by a projectile, the human may carry a shooting apparatus, the human may carry a sensor that may aid in detecting a hit on the human or a target of the human or may aid in detecting a position of the human, or may carry an image capturing device.

The robots may move about the environment within the arena. The location of the robots may be tracked. Optionally, they may be tracked with the aid of keeping track of virtual regions. In one example, a grid of virtual regions may be provided, with each row and/or column separately labeled. For example, it may be determined that a robot may fall within a 'B4' position on a grid, and another robot is provided on a 'E2' position of a grid. It may be determined when a robot is within a particular virtual area, such as a team territory. The system may track when the robot crosses from one virtual region to another. This may be useful for a robot game.

One or more environmental features 1450a-e may be provided in the arena. The one or more environmental features may include environment-based features. This may include a change in terrain or type of environment. Examples of environment-based features may include, but are not limited to ponds, rivers, islands, quick-sand, sand traps, mud regions, stone regions, steam vents, fire-vents, waterfalls, trees, holes, cracks, hills, cliffs, or other features. The one or more environmental features may also include structural features. Examples of structural features may include, but are not limited to walls, ceilings, spikes, poles, fences, nets, man-made obstructions, towers, buildings, or other structural features. The environmental features may include shooting apparatuses. For example, structural features may have one or more shooting apparatuses installed thereon. The shooting apparatuses may be capable of shooting projectiles. The robots may be hit by the projectiles. In one example, a tower may be provided within a shooting apparatus. In some examples, the environmental features may include targets to be shot by the robots. The targets may include a sensing apparatus as described elsewhere herein. The targets may detect when a projectile hit has occurred.

In some instances, one or more environmental feature may be a virtual feature. The virtual feature may not have a physical presence. The virtual feature may be determined by a virtual region within the arena. In some instances, a virtual feature may not be visually discernible from its surroundings. Alternatively, the virtual region may have a visual indicator provided thereon. In some instances, a virtual feature may be "beneficial" for the robot. For example, if the robot regions a location of a virtual feature, the robot may receive extra life points, maximum life points, or experience points. In some instances, one or more physical characteristics of the robot may be upgraded (e.g., the robot may be able to move faster, aim faster, be permitted to shoot additional projectiles, shoot with more strength, increase vision clarity, have less damage done per projectile hit, etc.). In some instances, a virtual feature may be similar to a "power-up" for the robot. In some instances, a virtual feature may be similar to a "healing zone" for the robot. In some instances, a virtual feature may be "harmful" for the robot. For example, if the robot reaches a location of a virtual feature, the robot may have life points, maximum life points, or experience points taken away. In some instances, one or more physical characteristics of the robot may be downgraded (e.g., the robot may only be able to move slower, suffer temporary paralysis, aim slower, reduce the number of projectiles that the robot can shoot, shoot with less strength, lose vision clarity, etc.). Optionally, a virtual feature may be a "trap" or "poison" for the robot.

In some instances, a virtual feature may be stationary. The virtual feature may remain at the same location for the duration of the game. For example, a "healing region" may remain at the same location throughout the game. Similarly, a "paralysis region" may remain in the same location throughout the game. Alternatively, the virtual location may change. For example, for a first period of time during a game, a "healing region" may be at a first location, while during a second period of time during a game, a "healing region" may be at a second location. For some periods of time no "healing regions" may exist, or multiple healing regions may exist. Virtual features may move around or may come in and out of existence during a game.

A virtual feature may be visually discernible. Alternatively, the virtual feature may not be visually discernible. A user controlling a robot may or may not be made aware of a presence or location of a virtual feature. For example, a user controlling a robot may not be made aware of a virtual feature until the robot reaches the location of the virtual feature. In another example, a map of the arena and/or location of virtual feature may be displayed on a display device of the user, or of the arena. The coordinates for the virtual feature may be presented, or a visual depiction of the location of the virtual feature with respect to the rest of the arena may be provided (e.g., in a geographic map). Any change of positions, or appearance or disappearance of virtual features may be reflected in the map.

In one example, environmental features may be scattered throughout the arena. In some instances, multiple types of environmental features may be provided. In some instances, multiple of the same type of environmental features may be provided. For instance, multiple obstructions 1450a, 1450b may be provided. In another example, a shooting tower 1450c may be provided, capable of shooting at the one or more robots 1440a, 1440b, 1440c. A robot may hide behind an obstruction to prevent being shot. In another example, a sand trap 1450d may be provided. A robot may need to navigate around the sand trap or may risk getting stuck. A "virtual healing zone" (which may also be referred to as a "remedy" zone) may be provided. The virtual healing zone may not be visually discernible.

Figure 14B:
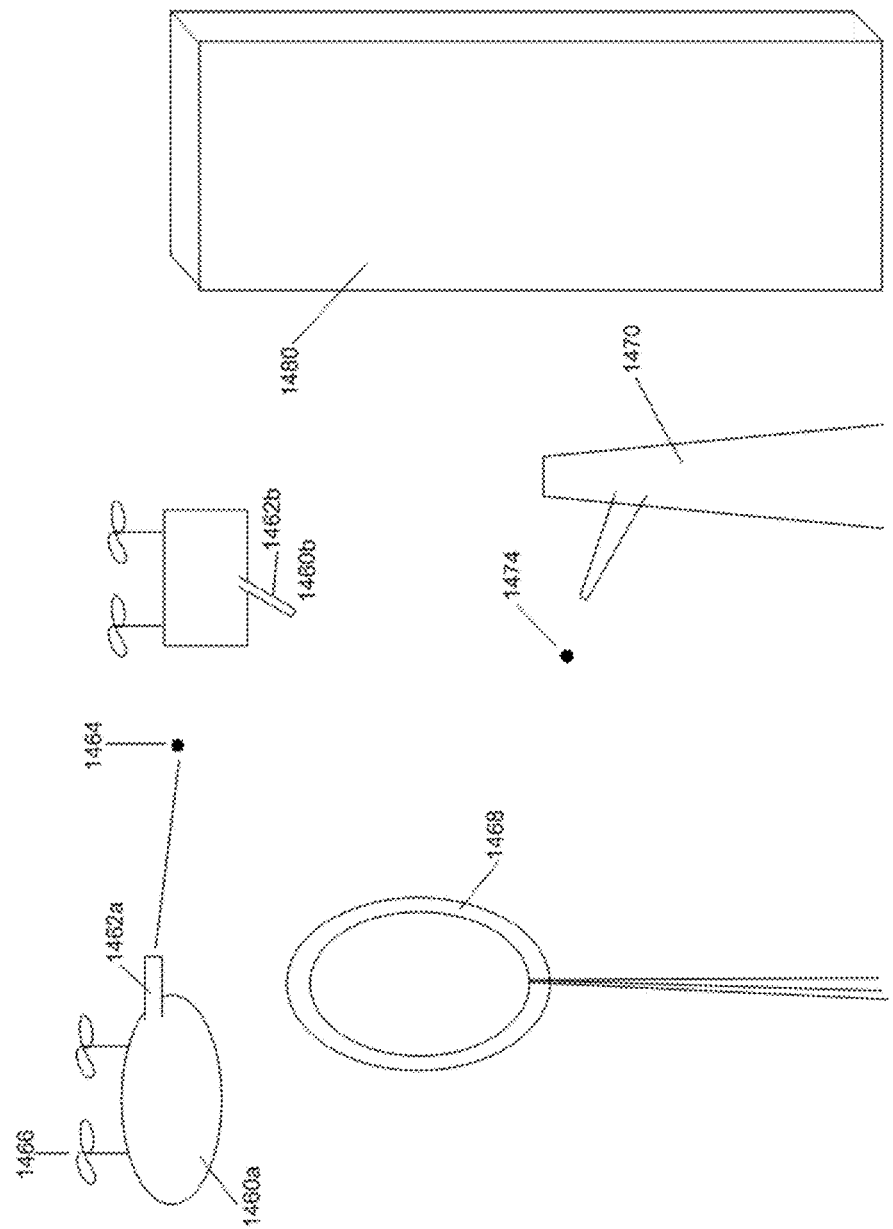
FIG. 14B shows another example of an arena for robots with sensing apparatuses in accordance with embodiments of the invention.

FIG. 14B shows another example of an arena for robots with sensing apparatuses in accordance with embodiments of the invention. In one illustration, the robots may be unmanned aerial vehicles (UAVs). In some instances, a first robot 1460a and a second robot 1460b may be provided. Any number of robots may be provided within the environment. The robots may have a shooting apparatus 1462a, 1462b capable of expelling a projectile 1464. The robots may have a sensing shell provided thereon, that may be capable of detecting a hit by a projectile. A propulsion unit 1466 may be provided on a robot. In one example, the propulsion units may include rotor blades that may be capable of generating lift for the robot. The robot may be a multi-rotor UAV.

Various environmental features 1468, 1470, 1480 may be provided within an arena. In one example, an environmental feature may include a ring 1468. In one example, when a robot flies through the ring, the robot may receive a benefit. For example, the robot may receive additional life points, additional maximum life points, additional experience points, be able to fly faster, be more maneuverable, be able to shoot further, be able to shoot more projectiles, suffer less damage when hit, etc. In other examples, the robot may suffer harmful effects when the robot flies through the ring, which may include any harmful effect as described elsewhere herein.

Another example of an environmental feature may include a tower with a shooting apparatus 1470. The shooting apparatus may be capable of expelling one or more projectile 1474. A robot may be capable of detecting a hit by the projectile.

An additional example of an environmental feature may be a wall 1480 or other obstruction. A robot may fly behind the wall to prevent being hit by the projectile.

Figure 14C:
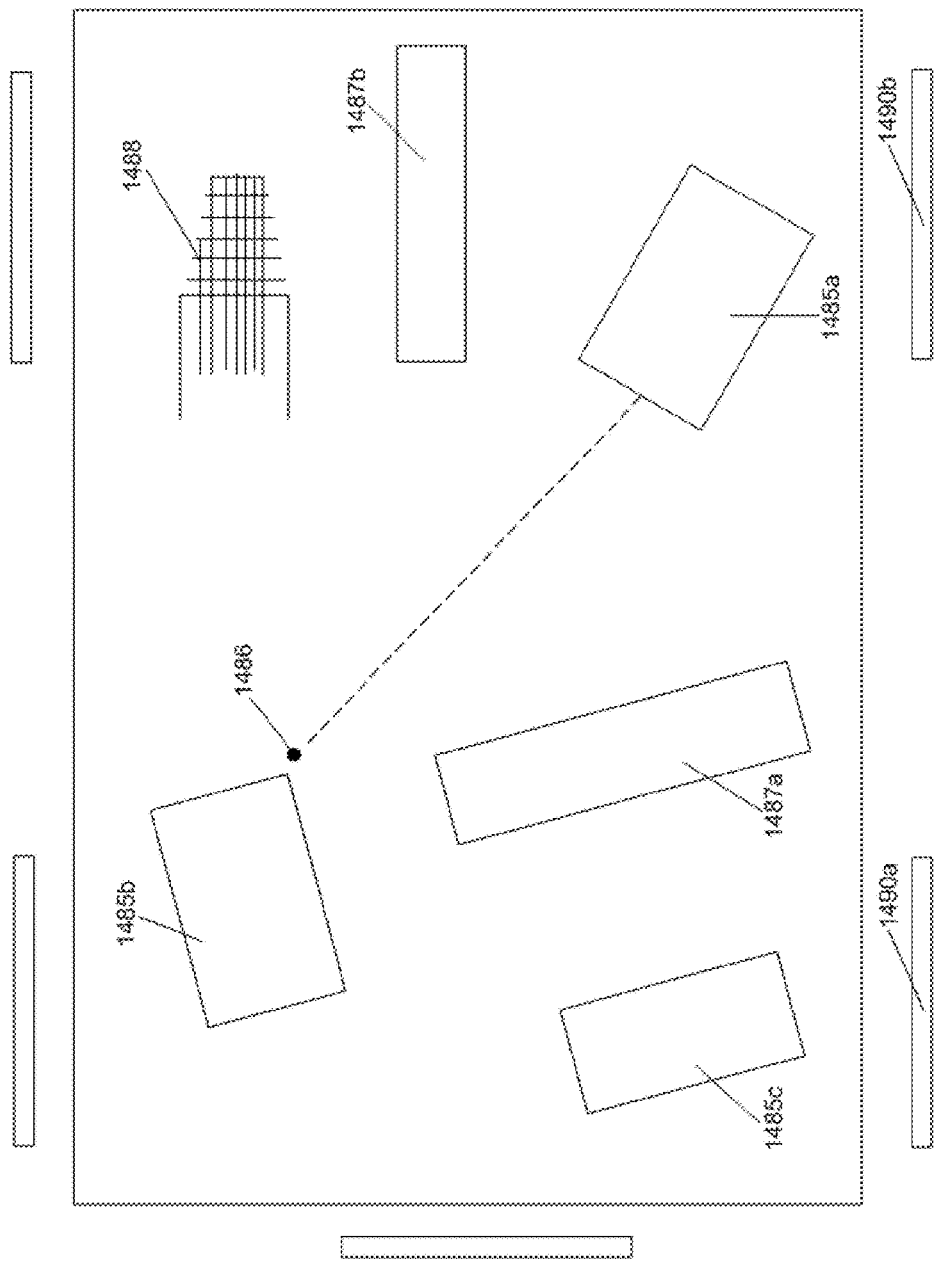
FIG. 14C shows another example of an arena for a robot game in accordance with embodiments of the invention.

FIG. 14C shows another example of an arena for a robot game in accordance with embodiments of the invention. A top view of the arena may be provided.

The arena may include a plurality of robots 1485a, 1485b, 1485c. The robots may be remotely controlled by a user. Alternatively, the robots may be autonomous. Any description of a robot may also apply to a human wearing a sensing shell. The robots may be capable of shooting one another during a game with projectiles 1486. The arena may include environmental features such as obstructions 1487a, 1487b or sand traps 1488.

In some instances, one or more display devices 1490a, 1490b may be located outside the arena. The display devices may show any information as described elsewhere herein. The display devices may optionally be within a viewable distance from the arena. Alternatively, the display devices may not be within a viewable distance from the arena. The display devices may surround the arena.

Users may be controlling the robots. The user may be able to view display devices while controlling the robots. In some instances, the information on the display device may include images captured from the perspective of a robot.

Figure 15:
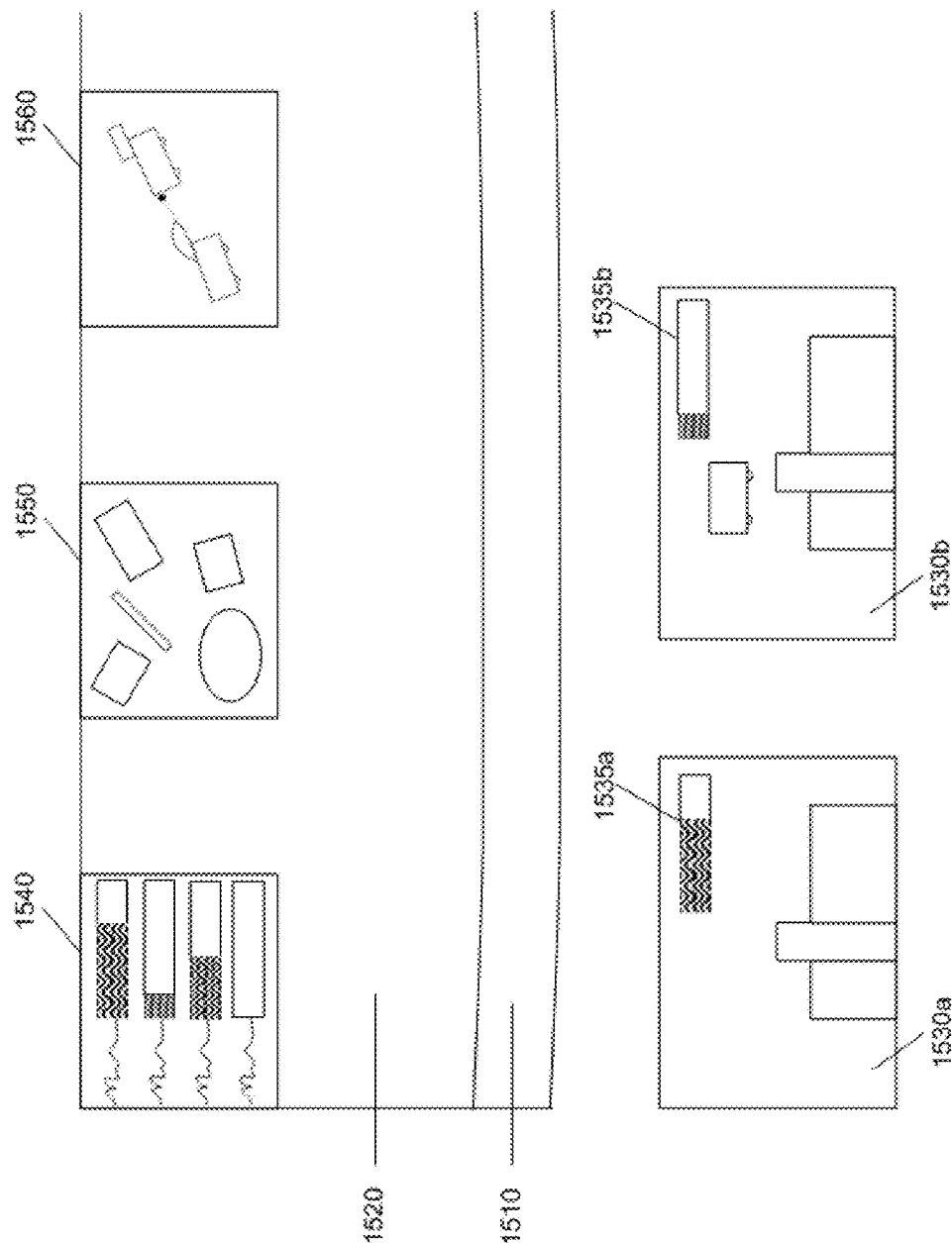
FIG. 15 shows an example of a facility for a robot game in accordance with embodiments of the invention.

FIG. 15 shows an example of a facility for a robot game in accordance with embodiments of the invention. The facility may include an arena. The arena may include a boundary. In some instances, the boundary may include a wall or fence 1510. Optionally, a clear wall 1520 may be provided that may permit viewers to look in, but prevent projectiles or robots from breaking through.

One or more users may control robots within an arena. The users may be able to view display devices 1530a, 1530b that may show information pertaining to robots within the arena. In some instances, one or more of the robots may be operating autonomously or semi-autonomously. User may have pre-programmed autonomous robots or may be updating programming for robots in real-time. The users may be able to simultaneously view the display devices and the interior of the arena. Alternatively, the users may only be able to view information on the display devices without viewing the interior of the arena. Other individuals may be present at the arena and may view action within the arena. For example, spectators may be present. The users controlling the robots may be at the facility or may be located at a different location. In some instances, some users may be present at the facility while other users are located at a different location. The users at a different location may control the robots from over a network, such as the Internet. Users may control robots at the facility from all over the world.

In one example, the display devices for the users may show images from the perspective of the robot that the user is controlling. This may optionally, include a view of the shooting apparatus. In some instances, an indicator of a virtual status 1535a, 1535b of the robot may be provided. For example, the number or amount of life points out of the maximum life points may be displayed. A shown, a user controlling a first vehicle may show on his or her display that the first vehicle has more life points 1535a remaining than a second vehicle 1535b. The display devices for the users may be directed or private for each user. In some instance, each user may not see the other users' display screens from the perspective of their vehicles. Dividers or separate rooms may be provided, or they may be angled away from one another. Alternatively, users may look over and see neighboring users' display devices.

The display devices may be provided at the facility. In some instances, one or more display devices may be provided outside the facility but may be in communication with the same communication system as the display devices within the facility. For example, some users may be present at the facility while others may be located anywhere elsewhere in the world. The off-site users may be viewing their own display devices.

A facility may have one or more communal display devices 1540, 1550, 1560. The communal display devices may be viewable by multiple individuals. They may be viewable by multiple users controlling robots. They may also be viewable by spectators.

A communal display device 1540 may include a comparison of the virtual status of a plurality of robots. For example, the amount of life points and/or comparison between life points and maximum life points may be provided for multiple robots participating in the game. As shown, if a robot has zero life points left, it may be dead.

A communal display device 1550 may include a map that may show activity within the arena. The map may show the location of the robots within the arena. The map may also show one or more environmental features. Optionally, the map may show one or more virtual features. The map may be updated in real-time to reflect the current positioning of the robots within the environment. The map may also be updated in real-time to show the appearance and/or disappearance of virtual features. In some instances, boundaries of virtual regions may or may not be presented. The map may be a top view of the arena.

Optionally, a communication display device 1560 may include an image captured by one or more external camera. One or more external cameras may be provided within an arena or outside the arena including at least a portion of the arena within its field of view. The display device may show real-time streaming video of occurrences within the arena. For example, the display device may show a robot shooting another robot.

The communal display devices may be displayed to individuals at the facility. Optionally, the information on the communal display devices may also be displayed to individuals outside the facility. For example off-site spectators may exist who may wish to view the activity of the facility. The off-site spectators may have access to the communal display device information. In some instances, a website may be provided and one or more individuals may view the contents of the website. The website may include information about the progress of the robot game in real-time. The website may include streaming video, such as video that would be viewable on the communal display devices.

One or more spectators may optionally be provided on-site at the facility. The spectators may be capable of viewing activity within an arena. Seats or standing room may be arranged for the spectators to view the activity within the arena directly. In some examples, stadium-style seating may be provided for spectators to view the activity within the arena. The barrier around the arena may prevent injury to live spectators. The spectators may simultaneously be able to view one or more communal display device. In some instances, the communal display device may be on a jumbotron, or similar type of display device.

A facility may be provided within a structure. For example, the facility may one or more walls and/or a ceiling. In some instances, a facility may include multiple structures or building. A facility may be a site or compound. Alternatively, the facility may be an open-air facility. The facility may be exposed to the outdoors. The facility may be a robot gaming facility.

In some instances, a facility may have a single arena. Alternatively, a facility may have multiple arenas. The same types of robot games may occur simultaneously within multiple arenas. Alternatively, different types of robot games may occur within multiple arenas. Spectators may be able to travel from arena to arena at the facility.

In some instances, entry to a facility may be controlled. For example, individuals may be able to enter the facility after providing a ticket. The ticket may be a purchased ticket. In some instances, access to each individual arena may be open. For example, once an individual has entered a facility, the individual may travel from arena to arena openly and be able to view all the robot games. In other instances, access to individual arenas may be controlled. For example, an individual may be required to have a ticket for an individual arena or event.

The systems, devices, and methods described herein can be applied to a wide variety of robots. Robots may be any movable objects. As previously mentioned, any description herein of a vehicle or robot may apply to and be used for any movable object. Furthermore, as previously mentioned, any description herein of a vehicle, robot, or any type of movable object may be used for any stationary object (e.g., turret, tower, structure). Any features described elsewhere herein for a vehicle or robot having a sensing shell may be applied to any type of movable object, stationary object, or vice versa. Any description herein of a vehicle may apply to unmanned vehicles (e.g., specifically to UAVs, ground-bases unmanned vehicles, water-based unmanned vehicles). A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Optionally, the movable object can be a living subject, such as a human or animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV, ground-based unmanned vehicle, or water-based unmanned vehicle. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 16:
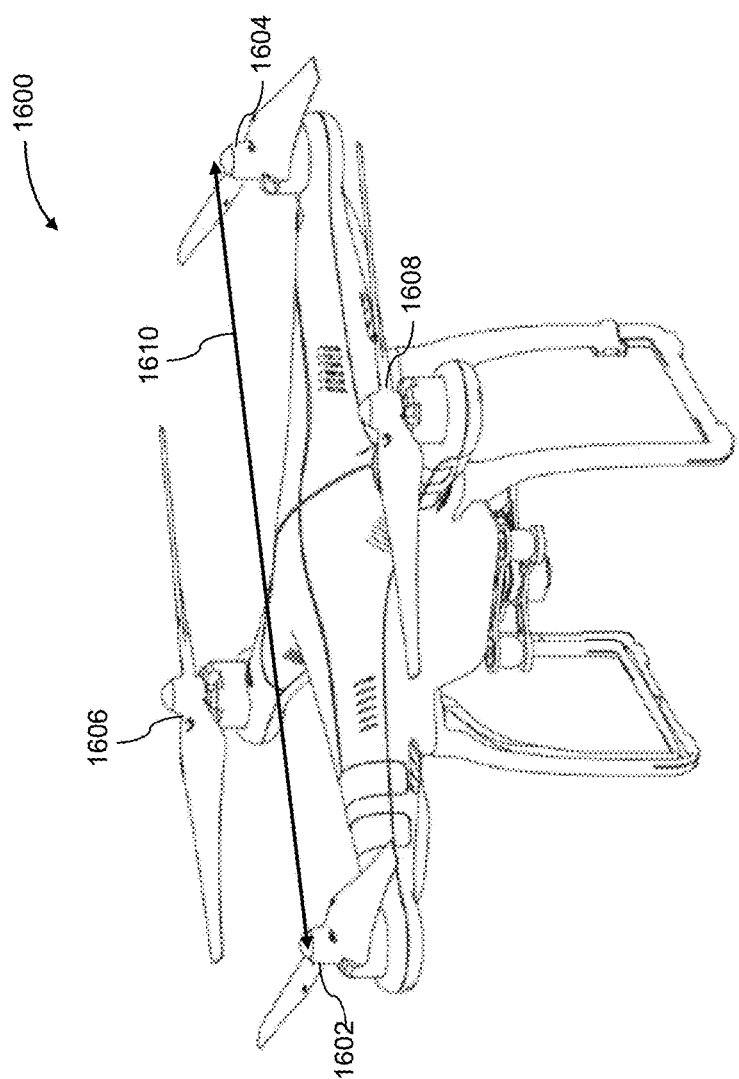
FIG. 16 illustrates another example of a vehicle, in accordance with an embodiment of the invention.

FIG. 16 illustrates a vehicle 1600, in accordance with embodiments of the present invention. The vehicle may be an unmanned vehicle. In some examples, the vehicle may be an unmanned aerial vehicle (UAV). Any description herein of a UAV may be applied to a land-bound vehicle, such as those described and illustrated elsewhere herein, a water-based vehicle, a space vehicle, or vice versa. The UAV may be an example of a movable object as described herein. The UAV 1600 can include a propulsion system having four rotors 1602, 1604, 1606, and 1608. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1610. For example, the length 1610 can be less than or equal to 2 m, or less than equal to 5 m. In some embodiments, the length 1610 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein. In some instances, the load can include a shooting apparatus.

In some embodiments, the movement of the movable object, carrier, and payload relative to a fixed reference frame (e.g., the surrounding environment) and/or to each other, can be controlled by a terminal Any description herein of a controlling device or remote controller may apply to a terminal and vice versa. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 17:
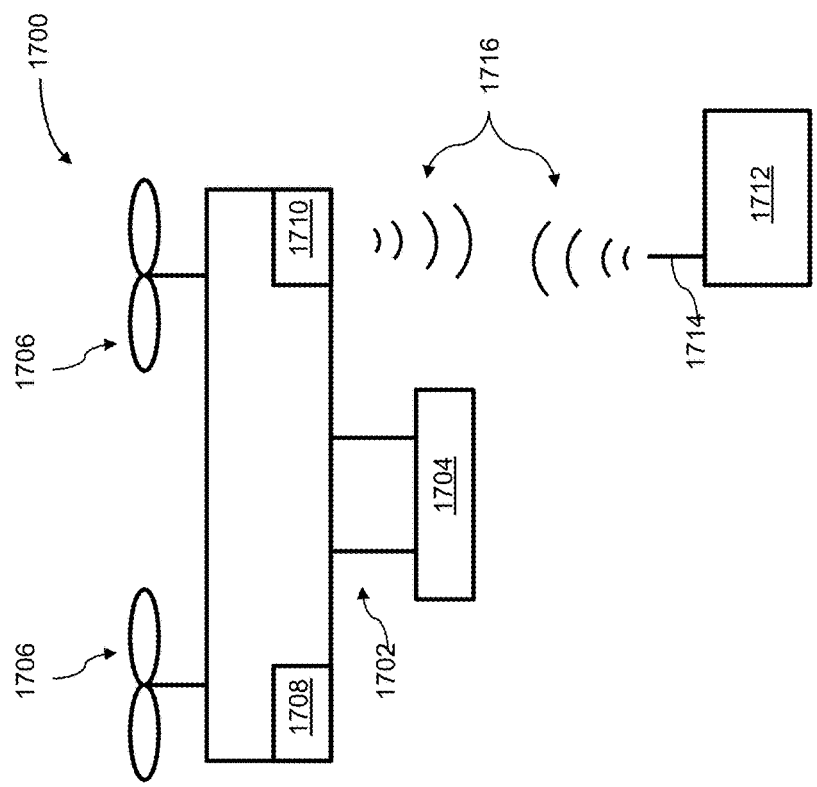
FIG. 17 illustrates a movable object including a carrier and a payload, in accordance with an embodiment of the invention.

FIG. 17 illustrates a movable object 1700 including a carrier 1702 and a payload 1704, in accordance with embodiments. Although the movable object 1700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1704 may be provided on the movable object 1700 without requiring the carrier 1702. The movable object 1700 may include propulsion mechanisms 1706, a sensing system 1708, and a communication system 1710.

The propulsion mechanisms 1706 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1706 can be mounted on the movable object 1700 using any suitable means, such as a support element (e.g., a drive shaft) as described elsewhere herein. The propulsion mechanisms 1706 can be mounted on any suitable portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1700 may be controlled independently of the other propulsion mechanisms. Alternatively, the propulsion mechanisms 1700 can be configured to be controlled simultaneously. For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1708 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below). Alternatively, the sensing system 1708 can be used to provide data regarding the environment surrounding the movable object, such as weather conditions, proximity to potential obstacles, location of geographical features, location of manmade structures, and the like.

A sensor shell may optionally be provided for the movable object. The sensor shell may be a housing of the movable object. The sensor shell may be capable of detecting a projectile hit on the movable object. The sensor shell may aid in detecting one or more characteristics of a projectile hit on the movable object, as described elsewhere herein.

The communication system 1710 enables communication with terminal 1712 having a communication system 1714 via wireless signals 1716. The communication systems 1710, 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1712, or vice-versa. Alternatively, the communication may be two-way communication, such that data can be transmitted in both directions between the movable object 1700 and the terminal 1712. The two-way communication can involve transmitting data from one or more transmitters of the communication system 1710 to one or more receivers of the communication system 1714, and vice-versa.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 1702, or payload 1704. Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

Figure 18:
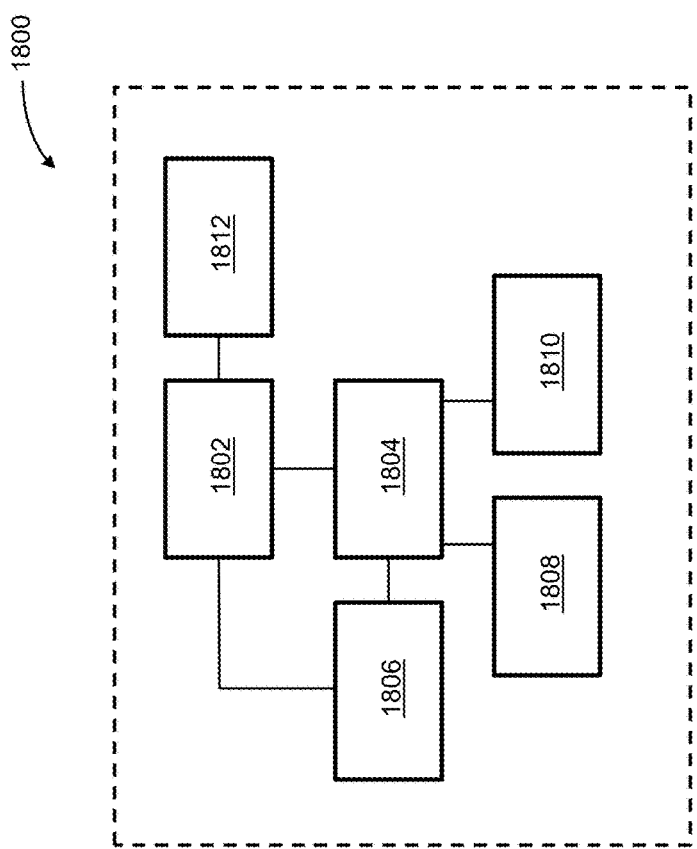
FIG. 18 is a schematic illustration by way of block diagram of a system for controlling a movable object, in accordance with an embodiment of the invention.

FIG. 18 is a schematic illustration by way of block diagram of a system 1800 for controlling a movable object, in accordance with embodiments. The system 1800 can be used in combination with any suitable embodiment of the systems, devices, and methods disclosed herein. The system 1800 can include a sensing module 1802, processing unit 1804, non-transitory computer readable medium 1806, control module 1808, and communication module 1810.

The sensing module 1802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1802 can be operatively coupled to a processing unit 1804 having a plurality of processors. In some embodiments, the sensing module can be operatively coupled to a transmission module 1812 (e.g., a Wi-Fi image transmission module) configured to directly transmit sensing data to a suitable external device or system. For example, the transmission module 1812 can be used to transmit images captured by a camera of the sensing module 1802 to a remote terminal.

The processing unit 1804 can have one or more processors, such as a programmable processor (e.g., a central processing unit (CPU)). The processing unit 1804 can be operatively coupled to a non-transitory computer readable medium 1806. The non-transitory computer readable medium 1806 can store logic, code, and/or program instructions executable by the processing unit 1804 for performing one or more steps. The non-transitory computer readable medium can include one or more memory units (e.g., removable media or external storage such as an SD card or random access memory (RAM)). In some embodiments, data from the sensing module 1802 can be directly conveyed to and stored within the memory units of the non-transitory computer readable medium 1806. The memory units of the non-transitory computer readable medium 1806 can store logic, code and/or program instructions executable by the processing unit 1804 to perform any suitable embodiment of the methods described herein. For example, the processing unit 1804 can be configured to execute instructions causing one or more processors of the processing unit 1804 to analyze sensing data produced by the sensing module. The memory units can store sensing data from the sensing module to be processed by the processing unit 1804. In some embodiments, the memory units of the non-transitory computer readable medium 1806 can be used to store the processing results produced by the processing unit 1804.

In some embodiments, the processing unit 1804 can be operatively coupled to a control module 1808 configured to control a state of the movable object. For example, the control module 1808 can be configured to control the propulsion mechanisms of the movable object to adjust the spatial disposition, velocity, and/or acceleration of the movable object with respect to six degrees of freedom. Alternatively or in combination, the control module 1808 can control one or more of a state of a carrier, payload, or sensing module.

The processing unit 1804 can be operatively coupled to a communication module 1810 configured to transmit and/or receive data from one or more external devices (e.g., a terminal, display device, or other remote controller). Any suitable means of communication can be used, such as wired communication or wireless communication. For example, the communication module 1810 can utilize one or more of local area networks (LAN), wide area networks (WAN), infrared, radio, WiFi, point-to-point (P2P) networks, telecommunication networks, cloud communication, and the like. Any description elsewhere herein of a communication system may be applied herein, and vice versa. Optionally, relay stations, such as towers, satellites, or mobile stations, can be used. Wireless communications can be proximity dependent or proximity independent. In some embodiments, line-of-sight may or may not be required for communications. The communication module 1810 can transmit and/or receive one or more of sensing data from the sensing module 1802, processing results produced by the processing unit 1804, predetermined control data, user commands from a terminal or remote controller, and the like.

The components of the system 1800 can be arranged in any suitable configuration. For example, one or more of the components of the system 1800 can be located on the movable object, carrier, payload, terminal, sensing system, or an additional external device in communication with one or more of the above. Additionally, although FIG. 18 depicts a single processing unit 1804 and a single non-transitory computer readable medium 1806, one of skill in the art would appreciate that this is not intended to be limiting, and that the system 1800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for providing a robot game, said method comprising:

providing a plurality of robots capable of moving from one location to another, each robot comprising two or more sensing apparatus capable of detecting when the robot is hit by an external projectile based on an acceleration of a part of the robot, wherein information generated by each of the two or more sensing apparatus is considered in at least one of (1) determining a characteristic or occurrence of a projectile hit event, or (2) differentiating between projectile hits and other detected events, wherein the projectile hit event is determined to occur when each of the two or more sensing apparatus registers an acceleration higher than a first acceleration, wherein the first acceleration is lower than a second acceleration required for determining occurrence of the projectile hit event by a single sensing apparatus; and detecting signals, from the plurality of robots, generated in response to information from the two or more sensing apparatus, and using said signals to keep track of relative virtual status between the plurality of robots.

2. The method of claim 1, wherein the plurality of robots each comprise a shooting apparatus capable of expelling one or more projectiles.

3. The method of claim 2, wherein the plurality of robots are unmanned vehicles.

4. The method of claim 3, wherein the vehicles are capable of moving over different types of terrain.

5. The method of claim 3, wherein the sensing apparatus comprises a plurality of sensors that are disposed on the front, back and sides of the vehicles.

6. The method of claim 2, wherein a robot of the plurality of robots comprises a receiver capable of receiving a signal from a remote controller used to effect movement of the robot.

7. The method of claim 6, wherein the receiver is capable of receiving a signal from the remote controller to expel the one or more projectiles from the shooting apparatus.

8. The method of claim 7, wherein the remote controller is configured to accept user inputs to attempt to shoot other robots using the shooting apparatus.

9. The method of claim 1, wherein the part of the robot is a surface of the robot.

10. The method of claim 9, wherein the sensing apparatus comprises the surface and an accelerometer configured to detect acceleration of the surface in a direction orthogonal to the surface.

11. The method of claim 10, wherein the accelerometer is positioned on a side of the surface opposing the side that is capable of being hit by the external projectile.

12. The method of claim 10, wherein the signals from the plurality of robots are indicative of the acceleration of the surface of the robot when the acceleration of the surface exceeds a predetermined threshold.

13. The method of claim 1, further comprising operating at least one of the plurality of robots to in an autopilot mode without human control.

14. The method of claim 1, further comprising calculating a virtual damage assessments of each of the plurality of robots as the relative virtual status of each of the plurality of robots.

15. The method of claim 14, wherein keeping track of the relative virtual status between the plurality of robots comprises keeping track of virtual life points for each of the plurality of robots by subtracting virtual life points from the robot based on the virtual damage assessment for the robot.

16. The method of claim 15, further comprising preventing a robot from further participating in the robot game when the virtual life points for the robot is valued at zero or lower.

17. The method of claim 15, further comprising declaring a robot as a winner when other robots of the plurality of robots have virtual life points valued at zero or lower.

18. The method of claim 1, further comprising:
providing a facility with an arena and a plurality of robots within the arena that perform the robot game.

19. The method of claim 18, further comprising providing one or more display terminals configured to display information pertaining to the plurality of robots.

20. The method of claim 1, wherein the two or more sensing apparatus comprise sensing apparatus located on opposite sides of the robot that are considered in differentiating between projectile hits and other detected events.

21. The method of claim 1, wherein the other detected events comprise a collision event between the plurality of robots or a braking event by the plurality of robots.

22. The method of claim 21, wherein a robot of the plurality of robots is determined to experience the collision event or the braking event when each of the two or more sensing apparatus registers a change in acceleration.

23. The method of claim 21, wherein a robot of the plurality of robots is determined to experience the projectile hits when only one of the two or more sensing apparatus registers a change in acceleration.

24. The method of claim 1, wherein the characteristic of the projectile hit event comprises a location of the projectile hit event relative to each of the two or more sensing apparatus.

25. A system configured to be utilized in a robot game, said system comprising:
one or more propulsion units capable of effecting movement of a vehicle;
two or more sensing apparatus capable of detecting when the vehicle is hit by an external projectile based on an acceleration of a part of the vehicle, wherein information generated by each of the two or more sensing apparatus is considered in at least one of (1) determining a characteristic or occurrence of a projectile hit event, or (2) differentiating between projectile hits and other detected events, wherein the projectile hit event is determined to occur when each of the two or more sensing apparatus registers an acceleration higher than a first acceleration, wherein the first acceleration is lower than a second acceleration required for determining occurrence of the projectile hit event by a single sensing apparatus; and
one or more processors, individually or collectively configured to (i) detect signals from the vehicle generated in response to information from the two or more sensing apparatus, and (ii) use said signals to keep track of relative virtual status between a plurality of vehicles.

26. The system of claim 25, wherein the vehicle comprises a shooting apparatus capable of expelling one or more projectiles.

27. The system of claim 26, wherein the vehicle is an unmanned aerial vehicle.

28. The system of claim 25, wherein the vehicle is determined to experience (a) a collision event or a braking event when each of the two or more sensing apparatus registers a change in acceleration, and (b) projectile hits when only one of the two or more sensing apparatus registers a change in acceleration.

29. A vehicle configured to be utilized in a robot game, said system comprising:
one or more propulsion units capable of effecting movement of the vehicle; and
two or more sensing apparatus capable of detecting when the vehicle is hit by an external projectile based on an acceleration of a part of the vehicle, wherein information generated by each of the two or more sensing apparatus is considered in at least one of (1) determining a characteristic or occurrence of a projectile hit event, or (2) differentiating between projectile hits and other detected events, wherein the projectile hit event is determined to occur when each of the two or more sensing apparatus registers an acceleration higher than a first acceleration, wherein the first acceleration is lower than a second acceleration required for determining occurrence of the projectile hit event by a single sensing apparatus.

* * * * *